(12) United States Patent
Lee et al.

(10) Patent No.: US 9,699,487 B2
(45) Date of Patent: Jul. 4, 2017

(54) METHOD FOR TRANSMITTING A BROADCASTING SERVICE, METHOD FOR RECEIVING A BROADCAST SERVICE, AND APPARATUS FOR RECEIVING A BROADCAST SERVICE

(75) Inventors: Joonhui Lee, Seoul (KR); Kwansuk Kim, Seoul (KR); Gomer Thomas, Princeton Junction, NJ (US); Dongwan Seo, Seoul (KR); Sanghyun Kim, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 13/985,474

(22) PCT Filed: Feb. 15, 2012

(86) PCT No.: PCT/KR2012/001141
§ 371 (c)(1),
(2), (4) Date: Aug. 5, 2014

(87) PCT Pub. No.: WO2012/111978
PCT Pub. Date: Aug. 23, 2012

(65) Prior Publication Data
US 2014/0380388 A1    Dec. 25, 2014

Related U.S. Application Data

(60) Provisional application No. 61/442,813, filed on Feb. 15, 2011.

(51) Int. Cl.
*H04N 7/025* (2006.01)
*H04N 21/235* (2011.01)
(Continued)

(52) U.S. Cl.
CPC ..... *H04N 21/2353* (2013.01); *H04N 21/4345* (2013.01); *H04N 21/4349* (2013.01);
(Continued)

(58) Field of Classification Search
CPC ............. H04N 21/812; H04N 21/4331; H04N 21/435; H04N 21/235; H04N 21/2353;
(Continued)

(56) References Cited

U.S. PATENT DOCUMENTS 7,584,491 B2    9/2009   Bruckner et al.
7,908,628 B2 *  3/2011   Swart ................ H04N 7/17318
                                                    725/112
(Continued)

FOREIGN PATENT DOCUMENTS

JP   2009527154       7/2009
KR   1020090021101    2/2009
KR   1020090021111    2/2009

*Primary Examiner* — Michael B Pierorazio
(74) *Attorney, Agent, or Firm* — Dentons US LLP

(57) ABSTRACT

A method for receiving a broadcasting service according to the present invention comprises the steps of: receiving service signaling data for receiving a object; receiving network property information related to the object if the object that is to be received exists; determining whether the object is received according to network connection status of an apparatus for receiving a broadcast and the received network property information; receiving the object based on the service signaling data; receiving a first packetized stream; extracting a trigger including a trigger action and trigger time from a payload of the first packetized stream; and performing the trigger action in response to the object at the predetermined time using the trigger time based on the network property information.

11 Claims, 67 Drawing Sheets

(51) Int. Cl.
*H04N 21/858* (2011.01)
*H04N 21/61* (2011.01)
*H04N 21/434* (2011.01)
*H04N 21/81* (2011.01)

(52) U.S. Cl.
CPC ..... *H04N 21/6125* (2013.01); *H04N 21/8173* (2013.01); *H04N 21/858* (2013.01)

(58) Field of Classification Search
CPC ........... H04N 21/4345; H04N 21/8173; H04N 21/4349; H04N 21/6125; H04N 21/858
USPC .......................................................... 725/110
See application file for complete search history.

(56) References Cited

U.S. PATENT DOCUMENTS

| | | | | |
|---|---|---|---|---|
| 8,312,497 B2* | 11/2012 | Pearson | ............. | H04N 5/44513 725/105 |
| 8,452,571 B2* | 5/2013 | Turpin | ............... | G01R 13/0254 702/187 |
| 8,484,676 B1* | 7/2013 | Narsimhan | ........ | H04N 21/4126 348/734 |
| 2002/0162120 A1* | 10/2002 | Mitchell | ................ | H04N 7/165 725/135 |
| 2003/0229900 A1* | 12/2003 | Reisman | ........... | G06F 17/30873 725/87 |
| 2005/0028195 A1* | 2/2005 | Feinleib | ................. | H04N 7/163 725/32 |
| 2005/0083973 A1* | 4/2005 | Krishnan | ............... | H04J 3/1682 370/468 |
| 2008/0046557 A1* | 2/2008 | Cheng | ................ | H04M 1/72525 709/224 |
| 2009/0276819 A1 | 11/2009 | Kim et al. | | |
| 2010/0186059 A1 | 7/2010 | Suh et al. | | |
| 2010/0299702 A1* | 11/2010 | Lo | ........................ | G06Q 20/123 725/39 |
| 2011/0231156 A1* | 9/2011 | Turpin | ............... | G01R 13/0254 702/187 |
| 2011/0302611 A1* | 12/2011 | Eyer | ..................... | H04N 21/4345 725/46 |
| 2011/0307920 A1* | 12/2011 | Blanchard | ............ | H04N 21/472 725/32 |
| 2012/0047531 A1* | 2/2012 | Eyer | .................... | H04N 21/654 725/37 |
| 2013/0347026 A1* | 12/2013 | Reisman | ............... | G11B 27/034 725/25 |
| 2013/0347038 A1* | 12/2013 | Lee | .................... | H04N 21/4312 725/40 |
| 2014/0013379 A1* | 1/2014 | Kitazato | ............ | H04N 21/4516 725/118 |
| 2014/0201796 A1* | 7/2014 | Moon | .................... | H04H 60/13 725/110 |

\* cited by examiner

FIG.3

| | | NRT Content Items / Files |
| --- | --- | --- |
| | | FLUTE |
| | | ALC / LCT |
| | | UDP |
| Service protection-OMA BCAST DRM | IP layer signaling-SMT + NRT-IT | IP |
| | PSI/PSIP | DSMCC Addressable Sections |
| MPEG2 TS | | |
| 8VSB Physical Layer | | |

FIG.4

| Service protection OMA BCAST DRM | Signaling Channel Service-SMT | OMA BCAST Service Guide | NRT Content Items / Files |
|---|---|---|---|
| | | FLUTE ||
| | | ALC / LCT ||
| UDP ||||
| IP ||||
| RS Frame ||||
| M/H Physical Layer ||||
| 8VSB Physical Layer ||||

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television – The virtual channel carries analog television programming |
| 0x02 | ATSC_digital_television – The virtual channel carries television programming (audio, video and optional associated data) conforming to ATSC standards |
| 0x03 | ATSC_audio – The virtual channel carries audio programming (audio service and optional associated data) conforming to ATSC standard s. |
| 0x04 | ATSC_data_only_service – The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|     table_id | 8 | 0xCF |
|     section_syntax_indicator | 1 | bslbf |
|     private_indicator | 1 | bslbf |
|     reserved | 2 | '11' |
|     private_section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     data_service_table_bytes() | | |
|     CRC_32 | 32 | rpchof |
| } | | |

| Syntax | No. of bits | Format |
|---|---|---|
| data_service_table_bytes() { | | |
|     sdf_protocol_version | 8 | uimsbf |
|     application_count_in_section | 8 | uimsbf |
|     if( application_count_in_section > 0 ) { | | |
|       for(j = 0; j <application_count_in_section; j++) { | | |
|         compatibility_descriptor() | | |
|         app_id_byte_length | 16 | uimsbf |
|         if(app_id_byte_length > 1) { | | |
|           app_id_description | 16 | uimsbf |
|           for(i=0;i< app_id_byte_length-2;i++) { | | |
|             app_id_byte | 8 | bslbf |
|           } | | |
|         } | | |
|         tap_count | 8 | uimsbf |
|         for( i = 0; i < tap_count; i++) { | | |
|           protocol_encapsulation | 8 | uimsbf |
|           action_type | 7 | uimsbf |
|           resource_location | 1 | bslbf |
|           Tap() | | |
|           tap_info_length | 16 | uimsbf |
|           for( k=0; k<N; k++) { | | |
|             descriptor() | | |
|           } | | |
|         } | | |
|         app_info_length | 16 | uimsbf |
|         for( i=0; i< M; i++) { | | |
|           descriptor() | | |
|         } | | |
|         app_data_length | 16 | uimsbf |
|         for( i = 0; i < app_data_length; i++) { | | |
|           app_data_byte | 8 | bslbf |
|         } | | |
|       } | | |
|     } | | |
|     service_info_length | 16 | uimsbf |
|     for(j=0; j<K; j++) { | | |
|       descriptor() | | |
|     } | | |
|     service_private_data_length | 16 | uimsbf |
|     for( j = 0; j < service_private_data_length; j++) { | | |
|       service_private_data_byte | 8 | bslbf |
|     } | | |
| } | | |

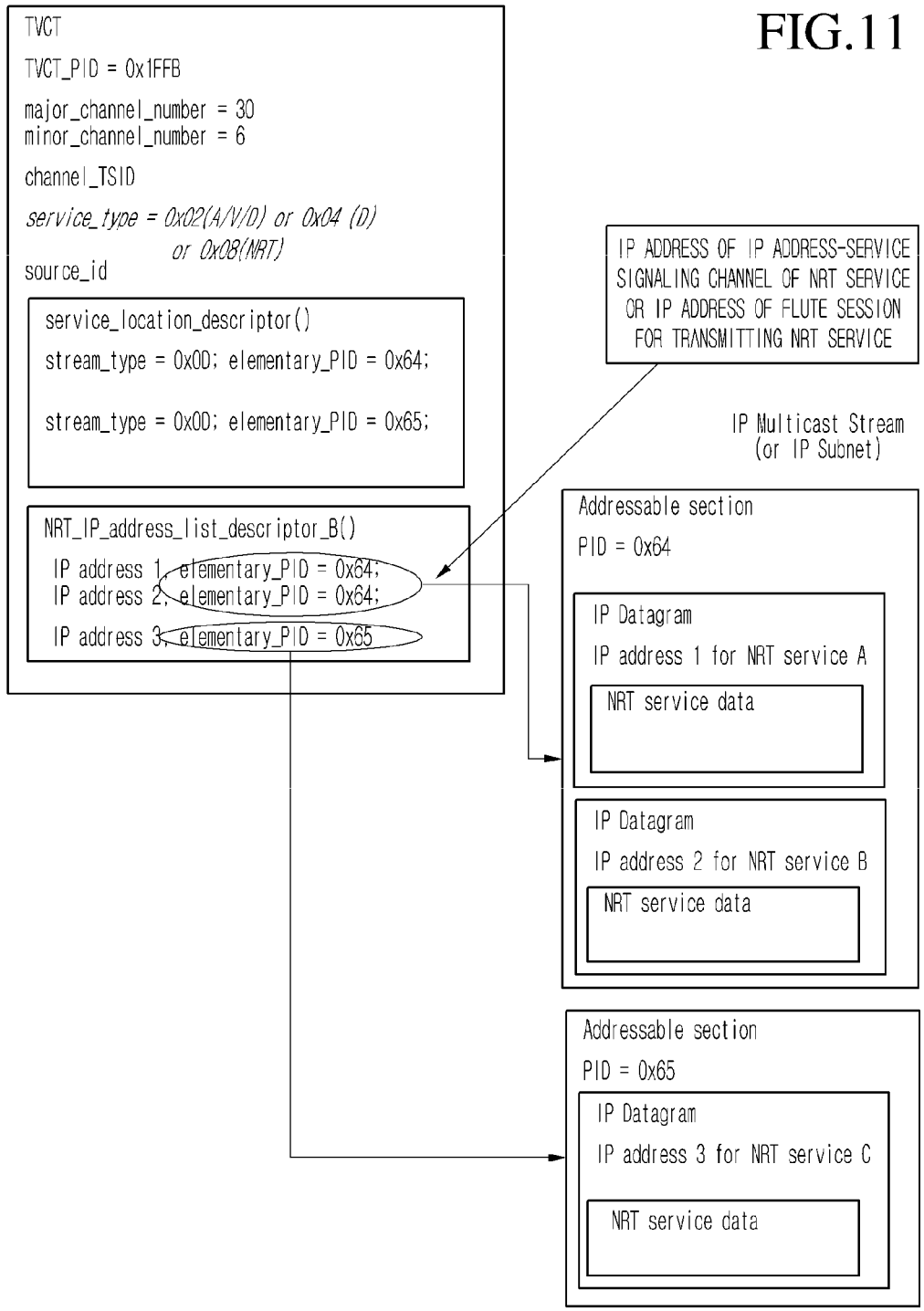

FIG.12

| Syntax | No. of Bits | Format |
|---|---|---|
| NRT_service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   reserved | 4 | '1111' |
|   carrier_frequency | 32 | uimsbf |
|   channel_TSID | 16 | uimsbf |
|   program_number | 16 | uimsbf |
|   source_id | 16 | uimsbf |
|   num_NRT_services | 8 | uimsbf |
|   for (i=0; i<num_NRT_services; i++) | | |
|   { | | |
|     reserved | 4 | '1111' |
|     NRT_service_status | 2 | uimsbf |
|     SP_indicator | 1 | bslbf |
|     CP_indicator | 1 | bslbf |
|     NRT_service_id | 16 | uimsbf |
|     short_NRT_service_name | 8*8 | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0; j<num_components; j++) | | |
|     { | | |
|       reserved | 1 | '1' |
|       essential_component_indicator | 1 | bsblf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       Reserved | 4 | '1111' |

FIG.13

| Syntax | No. of Bits | Format |
|---|---|---|
|         num_component_level_descriptors | 4 | uimsbf |
|         for (k=0; k<num_component_level_descriptors; k++) | | |
|         { | | |
|             component_level_descriptor() | var | |
|         } | | |
|    } | | |
|    reserved | 4 | '1111' |
|    num_NRT_service_level_descriptors | 4 | uimsbf |
|    for (m=0; m<num_MH_service_level_descriptors; m++) | | |
|    { | | |
|         NRT_service_level_descriptor() | var | |
|    } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|    virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x8D |
|     descriptor_length | 8 | uimsbf |
|     compoent_type | 7 | uimsbf |
|     compoent_encryotion_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

FIG.15

| Syntax | No. of Bits | Format |
|---|---|---|
| NRT_component_ data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG.16

| Syntax | No.of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |
|     if(content_length_included=1) { | | |
|       content_length | 40 | uimsbf |
|     } | | |
|     if(playback_delay_included=1) { | | |
|       reserved | 4 | '1111' |
|       playback_delay | 20 | uimsbf |
|     } | | |
|     if(expiration_included=1) { | | |
|       expiration | 32 | uimsbf |
|     } | | |
|     content_name_lingth | 8 | uimsbf |
|     content_name_text() | var | |
|     reserved | 4 | '1111' |
|     content_descriptors_length | 12 | uimsbf |
|     for(i=-;i<N; i++) { | | |
|       content_descriptor() | | |
|     } | | |
|   } | | |
|   reserved | 6 | '111111' |
|   descriptors_length | 10 | uimsbf |
|   for(i=0; i<M; i++) { | | |
|     descriptor() | | |
|   } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | |
|     } | | |
| } | | |

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) | | |
|       source_IP_address | 32 or 128 | uimsbf |
|     if (service_destination_IP_address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) | | |
|     { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="xs:unsignedShort" minOccurs="0" maxOccurs="unbounded"/>  ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>  ②
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>  ③
    <xs:anyAttribute processContents="skip"/>
  </xs:complexType>
</xs:schema>
```

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType ">
    <xs:sequence >
      <xs:element name="File" type="File-Type" maxOccurs ="unbounded"/>
      <xs:element name="FDT-Content-ID" type="FDT-Content-ID-Type" minOccurs="0" maxOccurs="unbounded"/>
      <xs:any namespace='##other" processContents ="skip" minOccurs="0" maxOccurs="unbounded"/>     ①
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="File-Type">
    <xs:sequence>
      <xs:element name="File-Content-ID" type="Content-ID-Type" minOccurs="0" maxOccurs ="unbounded"/>
      <xs:any namespace='##other" processContents="skip" minOccurs="0" maxOccurs="unbounded"/>
    </xs:sequence >
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType >
  <xs:complexType name="FDT-Content-ID-Type">     ②
    <xs:sequence>
      <xs:element name="Entry-Content-Location" type=xs:anyURI" minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>
    <xs:anyAttribute processContents ="skip"/>
  </xs:complexType >
</xs:schema >
```

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor   () | var | |
|         } | | |
|     } | | |
| } | | |

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

```
Syntax                              No. Of bits
TS_program_map_section(){
    table_id                            8
    section_syntax_indicator            1
    '0'                                 1
    reserved                            2
    section_length                      12
    program_number                      16
    reserved                            2
    version_number                      5
    current_next_indicator              1
    section_number                      8
    last_section_number                 8
    reserved                            3
    PCR_PID                             13
    reserved                            4
    program_info_length                 12
    for(i=0;i<N;i++){
            descriptor()
    }
    for(i=0;i<N1;i++){
            steam_type                  8
            reserved                    3
            elementary_PID              13
            reserved                    4
            ES_info_length              12
            for(i=0;i<N2;i++){
                    descriptor()
            }
    }
    CRC_32                              32
}
```

| Syntax | No. of Bits | Format |
|---|---|---|
| service_id_descriptor() { | | |
|     descriptor_tag | 8 | 0xC2 |
|     descriptor_length | 8 | uimsbf |
|     service_count | 8 | uimsbf |
|     for (i=0; i<service_count; i++) | | |
|         service_id | 16 | bslbf |
|     for (j=0; j< N; j++) { | | |
|         reserved | 8 | bslbf |
|     } | | |
| } | | |

FIG.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
| descriptor() | |
| } | |
| for(i=0;i<N1;i++){ | |
| steam_type | 8 |
| reserved | 3 |
| elementary_PID | 13 |
| reserved | 4 |
| ES_info_length | 12 |
| for(i=0;i<N2;i++){ | |
| descriptor() | |
| } | |
| } | |
| CRC_32 | 32 |
| } | |

| Syntax | No. of Bits | Format |
|---|---|---|
| Trigger_stream_descriptor() { | | |
| descriptor_tag | 8 | 0xC2 |
| descriptor_length | 8 | uimsbf |
| target_service_count | 8 | uimsbf |
| for (i=0; i<service_count; i++) { | | |
| target_service_id | 16 | bslbf |
| target_content_item_count | 8 | uimsbf |
| for(k=0; k<target_content_item_count; k++) | | |
| target_content_linkage | 32 | bslbf |
| } | | |
| for (j=0; j< N; j++) { | | |
| reserved | 8 | bslbf |
| } | | |
| } | | |

FIG.31

| | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|         descriptor() | | |
|     } | | |
|     reserved_future_use | 4 | bslbf |
|     application_loop_length | 12 | uimsbf |
|     for(i=0;i<N;i++){ | | |
|         application_identifier() | | |
|         application_control_code | 8 | uimsbf |
|         reserved_future_use | 4 | bslbf |
|         application_descriptors_loop_length | 12 | uimsbf |
|         for(j=0;j<N;j++){ | | |
|             descriptor() | | |
|         } | | |
|     } | | |
|     CRC_32 | 32 | rpchof |
| } | | |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|       descriptor() | | |
|     } | | |
|     CRC_32 | 32 | rpchof |
| } | | |

FIG.43

```
link_descriptor() {
descriptor_tag                      8 0xe8
descriptor_length                   8 uimsbf
number_of_links                     8 uimsbf
for (i=0; i<number_of_links; i++) {
    link_type                       8 uimsbf
    link_media                      8 uimsbf
    mime_type_length                8 uimsbf
    mime_type                       var
    description_length              8 uimsbf
    description                     var
    link_length                     uimsbf
    link_byte                       var
  }
}
```

FIG.44

|             | link_type |
|-------------|-----------|
| Html Portal | 0x01      |
| Thumbnail   | 0x02      |
| Preview Clip| 0x03      |
| EPG         | 0x04      |
| Highlight   | 0x05      |
| MultiView   | 0x06      |
| TDO         | 0x07      |

FIG.45

|  | link_media | link_byte |
|---|---|---|
| NRT service | 0x02 | service_id content_linkage |
| Internet service | 0x03 | URI |

FIG.47

```
virtual_channel_table_section( ) {
 table_id
 ...
 for(i=0;i<num_channels_in_section;i++) {
  major_channel_number
  major_channel_number
  ...
  ETM_location
  ...
  service_type
  source_id
  ...
  descriptors_length
  for (i=0;i<N;i++) {
   descriptor ( )
  }
 }
 CRC_32
}
```

```
event_information_table_section () {
 table_id
 ...
 source_id
 ...
 num_events_in_section
 for (j = 0; j< num_events_in_section;j++) {
  event_id
  start_time
  ETM_location
  length_in_seconds
  title_length
  title_text()
  descriptors_length
  for (i=0;i<N;i++) {
   descriptor()
  }
 }
 CRC_32
}
```

```
link_descriptor() {
 descriptor_tag
 descriptor_length
 number_of_links
 for (i=0; i<number_of_links; i++) {
  link_type
  link_media
  mime_type_length
  mime_type
  description_length
  description
  link_length
  link_byte
 }
}
```

HTTP://tdo_service.com/tdo01.html

FIG.48

```
Event_descriptor() {
    descriptor_tag          8       0xe9
    descriptor_length       8       uimsbf
    ETM_id                  32
}
```

|  | MSB |  |  |  | LSB |
|---|---|---|---|---|---|
| Bit | 31 | ... 16 | 15 | ... 2 | 1 0 |
| Channel ETM_id | source_id |  | 0 | ... 0 | 0 0 |
| Event ETM_id | source_id |  | event_id |  | 1 0 |

FIG.52

| Syntax | No. of Bits | Format |
|---|---|---|
| NRT_service_descriptor() { | | |
|     descriptor_tag | 8 | 0xC4 |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_length_present | 1 | bslbf |
|     reserved | 5 | '11111' |
|     if (storage_reservation_present==1) { | | |
|         storage_reservation | 24 | uimsbf |
|     if (default_content_length_present==1) { | | |
|         default_content_length | 32 | uimsbf |
|     } | | |
|     for (j=0; j< N; j++) { | | bslbf |
|     reserved | 8 | |
|     } | | |
| } | | |

FIG.53

| Consumption_model | Meaning |
|---|---|
| 0x00 | Forbidden. |
| 0x01 | Browse & Download – The NRT service describes content that can be selected for later download. |
| 0x02 | Portal – The NRT service provides an experience similar to a web browser access. Files needed to support text/graphics rendering are available in the associated FLUTE session. |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | TDO – The NRT service offers TDO(Triggered Declarative Object). |
| 0x05 – 0x3F | Reserved for use by ATSC or other SDOs who register the use with ATSC. |

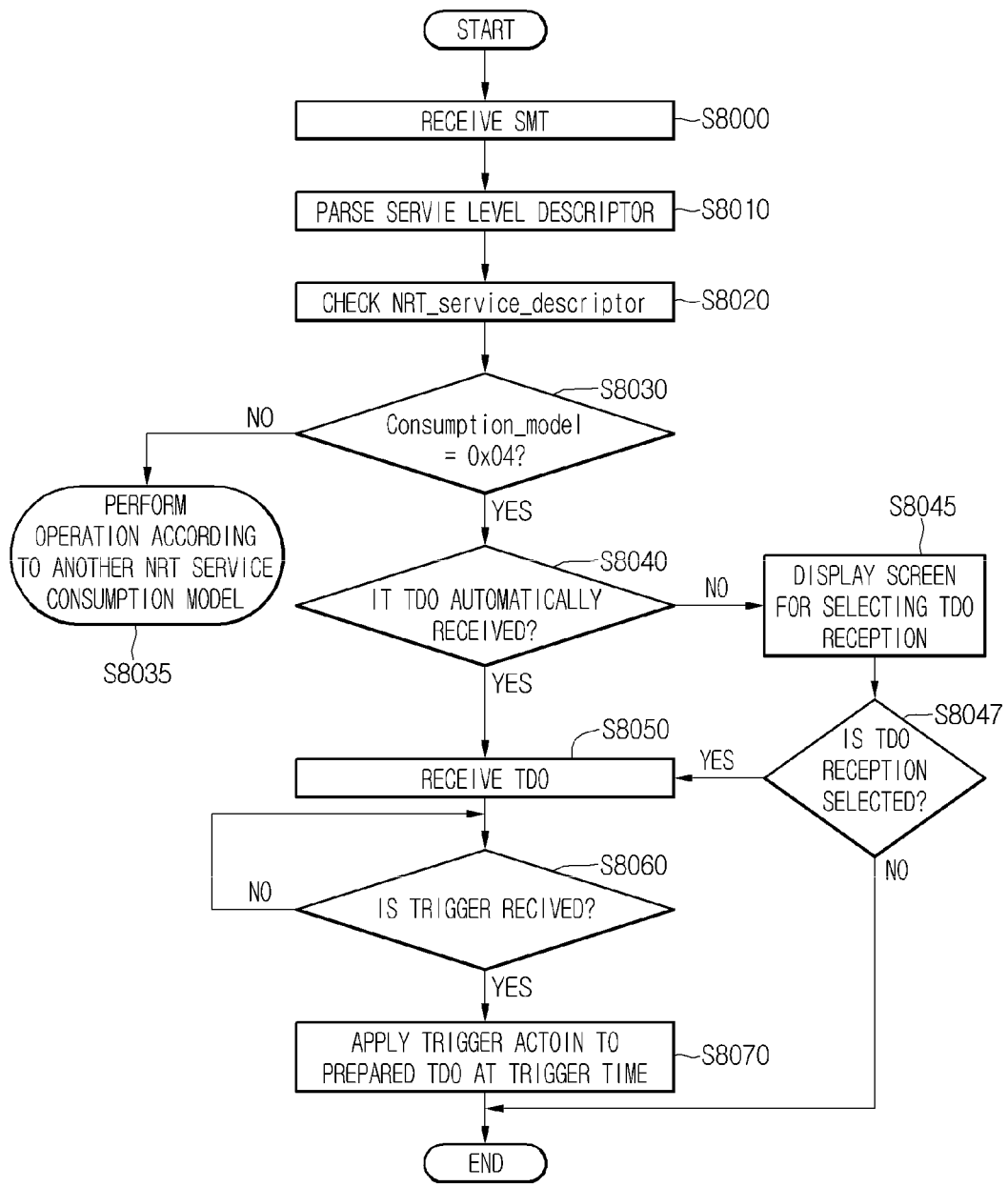

FIG.56

| Syntax | No. of Bits | Format |
|---|---|---|
| TDO_metacata_descriptor() { | | |
| descriptor_tag | 8 | 0xTBD |
| descriptor_length | 8 | Uimsbf |
| scheduled_activation_start_time | 32 | uimsbf |
| scheduled_activation_end_time | 32 | uimsbf |
| priority | 8 | uimsbf |
| activation_repeat_flag | 1 | bslbf |
| reserved | 7 | '11111' |
| if (repeating==1) { | | |
| repeat_interval | 8 | uimsbf |
| } | | |
| for (j=0; j< N; j++) { | | |
| reserved | 8 | bslbf |
| } | | |
| } | | |

FIG.60

| Syntax | No. of Bits | Format |
|---|---|---|
| internet_location_descriptor() { | | |
| descriptor_tag | 8 | 0xC9 |
| descriptor_length | 8 | uimsbf |
| reserved | 3 | '111' |
| URL_count | 5 | uimsbf |
| for (i=0; i<URL_count; i++) { | | |
| URL_length | 8 | uimsbf |
| URL() | var | |
| } | | |
| for (j=0; j< N; j++) { | | |
| reserved | 8 | bslbf |
| } | | |
| } | | |

METHOD FOR TRANSMITTING A BROADCASTING SERVICE, METHOD FOR RECEIVING A BROADCAST SERVICE, AND APPARATUS FOR RECEIVING A BROADCAST SERVICE

This application is a 35 USC §371 National Stage entry of International Application No. PCT/KR2012/001141 filed on Feb. 15, 2012, and claims priority of U.S. Provisional Application No. 61/442,813 filed on Feb. 15, 2011, which are hereby incorporated by reference in its entirety.

TECHNICAL FIELD

The present disclosure relates to a method for transmitting a broadcasting service, a method for receiving the broadcasting service, and an apparatus for receiving the broadcasting service.

BACKGROUND ART

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately are increased.

DISCLOSURE OF THE INVENTION

Technical Problem

Embodiments provide a method for receiving and processing a non-real time service and a method for transmitting the non-real time service.

Embodiments also provide a method for linking a content downloaded through a non-real time service with a broadcasting service, and a receiving device thereof.

Embodiments also provide a transmission method for linking a non-real time service with a real-time broadcasting service without interfering with a typical receiver, and a receiving device thereof.

Technical Solution

In one embodiment, a method of receiving a broadcast service by a broadcast receiving device includes receiving service signaling data for receiving an object; receiving network property information on the object if there is a reception scheduled object; determining whether to receive the object according to the received network property information and a network connectivity state of the broadcast receiving device; receiving the object on a basis of the service signaling data; receiving a first packetized stream; extracting a trigger action and a trigger time from a payload of the first packetized stream; and performing the trigger action on the object at a time designated by the trigger time on a basis of the network property information.

In another embodiment, a device for receiving a broadcast service includes a receiving unit receiving a first packetized stream, wherein the receiving unit receives a list of files corresponding to a reception scheduled object if the object is present; a trigger processing unit extracting presentation time information from a header of the first packeitzed stream, wherein the trigger processing unit extracts, from a payload of the first packetized stream, trigger information including a target object identifier field and a trigger action field; and a service manager extracting, from the received list of files, file reception information for receiving files that configure the object, wherein the service manager receives the object through the receiving unit on a basis of the file reception information and performs the trigger action on the object at a time designated by the trigger time.

In another embodiment, a method of transmitting a broadcast service by a broadcast transmitting device includes creating an object; setting a trigger action and a trigger time for the created object, and network property information on the created object; creating an object descriptor on a basis of the set network property information; transmitting the object descriptor and the object; inserting presentation time information corresponding to the trigger time into a header of a first packetized stream; inserting a target service identifier and trigger information into a payload of the first packetized stream, wherein the target service identifier corresponds to the target service and the trigger information comprises the trigger action; and transmitting the first packetized stream.

In another embodiment, a method of transmitting a broadcast service by a broadcast transmitting device includes creating an object; creating a list of files for receiving the object; setting a trigger action and a trigger time for the created object; transmitting the object; transmitting the list of files through a first network; inserting presentation time information into a header of a first packetized stream, wherein the presentation time information corresponds to the trigger time; inserting a target service identifier and trigger information into a payload of the first packetized stream, wherein the target service identifier corresponds to a target service and the trigger information comprises the trigger action; and transmitting the first packetized stream through a second network.

Advantageous Effects

According to an embodiment, content downloaded through a non-real time service may be associated with a real-time broadcast service.

According to an embodiment, it is possible to associate a real time broadcast service with a non-real-time broadcast service without interfering with a typical receiver.

According to an embodiment, it is possible to provide a broadcast service at an accurate timing.

BRIEF DESCRIPTION OF THE DRAWINGS

FIG. 3 is a view illustrating a protocol stack for NRT service according to an embodiment.

FIG. 4 is view illustrating one example of the protocol stack for mobile NRT service.

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section for identifying an application of NRT service and bit stream syntax of data_service_table_bytes in a DST section.

FIGS. 10 and 11 are views illustrating a method of signaling a DSM-CC addressable section data by using VCT according to another embodiment.

FIG. 11 represents a method of signaling DSM-CC addressable section data by using a VCT according to another embodiment.

FIGS. 12 and 13 are views illustrating bit stream syntax of NST according to an embodiment.

FIG. 14 is a view illustrating bit stream syntax of NRT_component_descriptor (MH_component_descriptor) according to an embodiment.

FIG. 15 is a view illustrating bit stream syntax of NRT component descriptor including NRT_component_data according to an embodiment.

FIG. 16 is a view illustrating bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment FIG. 29 is a view illustrating syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

FIG. 43 is a diagram illustrating syntax of link_descriptor according to an embodiment;

FIGS. 44 and 45 are diagrams illustrating the content of fields that may be included in link_descriptor;

FIG. 45 shows a timing diagram according to another embodiment;

FIGS. 46 and 47 are diagrams illustrating the relation between tables when link_descriptor shown in FIG. 43 belongs to a descriptor of an event information table (EIT) among PSIP tables according to an embodiment;

FIG. 47 explains how to receive a maintenance trigger according to an embodiment;

FIG. 48 is a diagram showing syntax of Event_descriptor and the content of fields capable of being included in Event_descriptor according to an embodiment;

FIG. 52 is a diagram for explaining syntax of NRT_service_descriptor that is a service level descriptor;

FIG. 53 illustrates the meaning of each value of a consumption_model field that is included in NRT_service_descriptor according to an embodiment;

FIG. 54 is a flowchart illustrating the operation of a receiver 300 when a TDO is transmitted by using a TDO consumption model according to an embodiment;

FIG. 56 is a diagram showing a TDO metadata descriptor according to an embodiment;

FIG. 60 shows syntax of an internet location descriptor according to an embodiment;

MODE FOR CARRYING OUT THE INVENTION

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be stored in a storage medium of the broadcast receiver, and then may be displayed on a display device according to a predetermined time or at the user's request. The NRT service is received in a file format, and is stored in a storage medium according an embodiment. The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, store them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
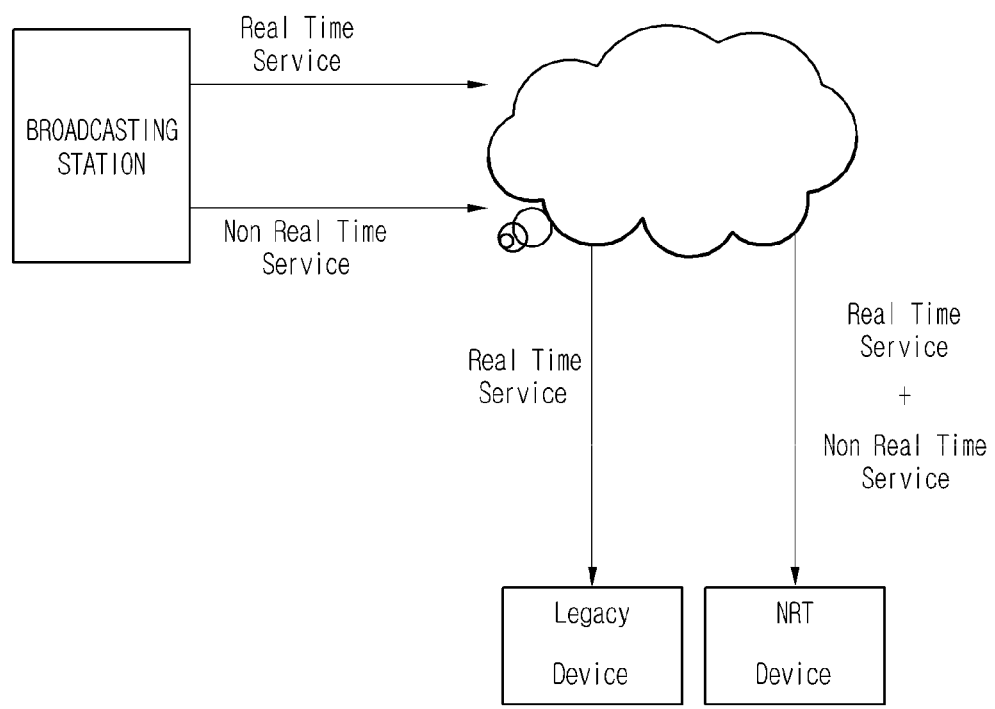
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and store the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
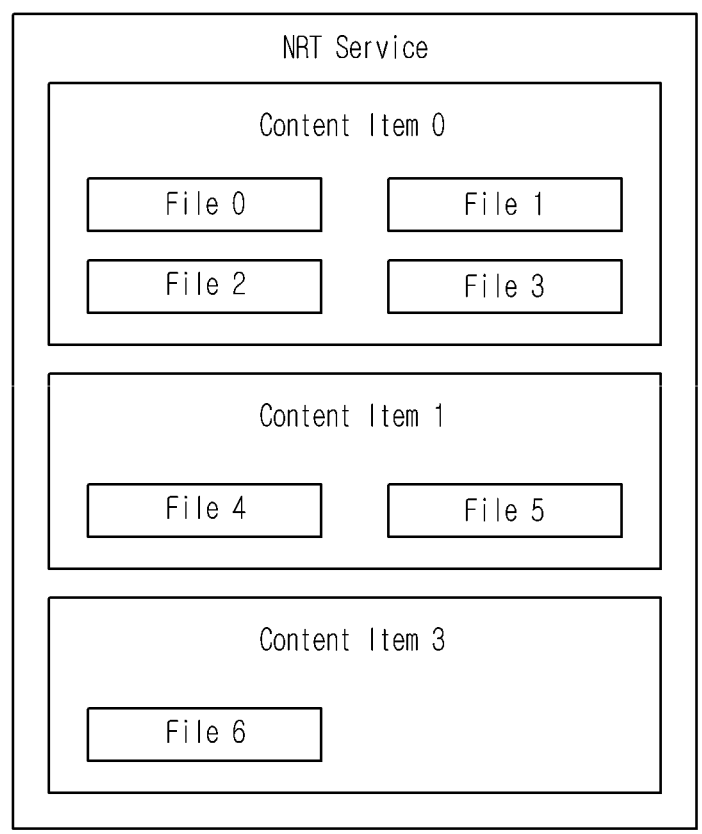
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted.

According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT(or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be stored in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IRNA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MEPG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT). The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MEPG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At this point, the service signaling channel is encapsulated in the IP datagram including Well-known IP destination address and well-known destination UDP port number, and is multi-casted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

First, the header part will be described as follows.

A table_id field (8 bits) is set with 0xC8 and identifies that a corresponding table section is a table section constituting TVCT.

A section_syntax_indicator field (1 bit) is set with 1 and represents that the section follows a general section syntax.

A private_indicator field (1 bit) is set with 1.

A section_length field (12 bits) describes that the number of bits remaining in the section to the last of the section from immediately after the section_length field. The value of the section_length field may not be greater than 1021.

A table_id_extension field (16 bits) may be set with 0x000.

A version_number field (5 bits) may have 0 and means the version number of VCT.

A current_next_indicator field (1 bit) represents that a corresponding table section is applicable currently if set with 1.

A section_number field (8 bits) indicates the number of corresponding table section among TVCT sections. In a first section of TVCT, section_number should be set with 0x00.

A last_section_number field (8 bits) means the table section of the last and highest number among TVCT sections.

A protocol_version field (8 bits) is a function that allows a table type delivering parameters having a different structure than one defined in a current protocol. Today, only one valid value of protocol_version is 0. The protocol_version having other than 0 may be used for the future version of the standard in order to recognize another table having a different structure.

Next, the body part will be described.

A num_channels_in_section field (8 bits) designates the numbers of virtual channels in the VCT section. The numbers are restricted by a table section length.

A short_name field (16 bits) represents the name of the virtual channel using 16 bit code value from 1 to 7 sequentially.

A major_channel_number field (10 bits) represents a major channel number related to a virtual channel defined by repetition in a "for" loop. Each virtual channel should relate to a major channel number and a minor channel number. The major channel number together with the minor channel number serve as a reference number of a virtual channel of a user.

A minor_channel_number field (10 bits) represent minor or sub channel numbers ranging from '0' to '999'. This field together with major_channel_number serves as the second of the number or a channel number of second part representing the right portion. The minor_channel_number is set with 0 if service_type is an analog television. When the service_type is an ATSC_digital_television or an ATSC_audio_only, it uses a minor number ranging from 1 to 99. A value of the minor_channel_number does not overlap that of the major_channel_number in a TVCT.

A modulation_mode field (8 bits) represents a modulation mode for carrier related to a virtual channel.

A carrier_frequency field (32 bits) has a recommendation value of 0. Although the field is used to identify a carrier frequency, it is not recommended.

A channel_TSID field (16 bits) is an unsigned integer field representing an MPEG-2 TS ID related to a TS containing an MPEG-2 program, which is reference by a virtual channel in a range from '0x0000' to '0xFFFF'.

A program_number field (16 bits) identifies an unsigned integer number related to a virtual channel defined in an MPEG-2 program association table (PAT) and a TS program map table (PMT). A virtual channel corresponding to analog service includes program_number of '0xFFFF'.

An ETM_location field (2 bits) describes the existence and location of an extended text message (ETM).

An access_controlled field (1 bit) indicates an access to events related to a virtual channel is controlled once it is set. If the flag is set with 0, an event access is not restricted.

A hidden field (1 bit) indicates that a user by a direct entry of a virtual channel number cannot access a virtual channel once it is set. A hidden virtual channel is omitted when a user surfs a channel, and is shown when the user accesses undefined or direct channel entry. A typical application of a hidden channel is a test signal and NVOD service. The hidden channel and its events may be shown on an EPG display according to a state of a hide_guide bit.

A hidden_guide field allows a virtual channel and its events to be displayed on an EPG display once it is set with 0 for a hidden channel. The bit is not related to a channel having no hidden bit set and thus non-hidden channels and their events are always displayed on an EPG display regardless of a state of a hide_guide bit. A typical application of a hidden channel, in which a hidden_guide bit set is set with 1, is a test signal and service easily obtainable through an application level pointer.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

A source_id field (16 bits) represents the source of a program related to a virtual channel.

A descriptors_length field represents the total length (byte unit) of a descriptor for the following virtual channel.

A descriptor( ) field includes at least zero descriptor.

An additional_descriptors_length field represents a total length (byte unit) of the following VCT descriptor.

Lastly, in relation to the trailer part, a CRC_32 field is a 32 bit field and includes a cyclic redundancy check (CRC) value, which ensures zero output from registers of a decoder defined in an MPEG-2 system after processing an entire STT section.

FIG. 8 is view of data_service_table_section) for identifying an application of NRT service and bit stream syntax of data_service_table_bytes in a DST section. A broadcasting station NRT service data or NRT service signaling data, satisfying ASIC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is 0XCF.

A section_syntax_indicator field (1 bit) is an indicator defining a section format of DST, and the section format may be short-form syntax (0) of MPEG, for example.

A private_indicator field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application_count_in_section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
|---|---|
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) represents attribute of data referenced by a Tap( ).

A resource_location field (1 bit) describes a position of an association_tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
|---|---|---|
| Tap ( ) { | | |
| tap_id | 16 | uimsbf |
| use | 16 | uimsbf |

TABLE 3-continued

| Syntax | No. of bits | Format |
|---|---|---|
| association_tag | 16 | uimsbf |
| selector( ) | | |
| } | | |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association_tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
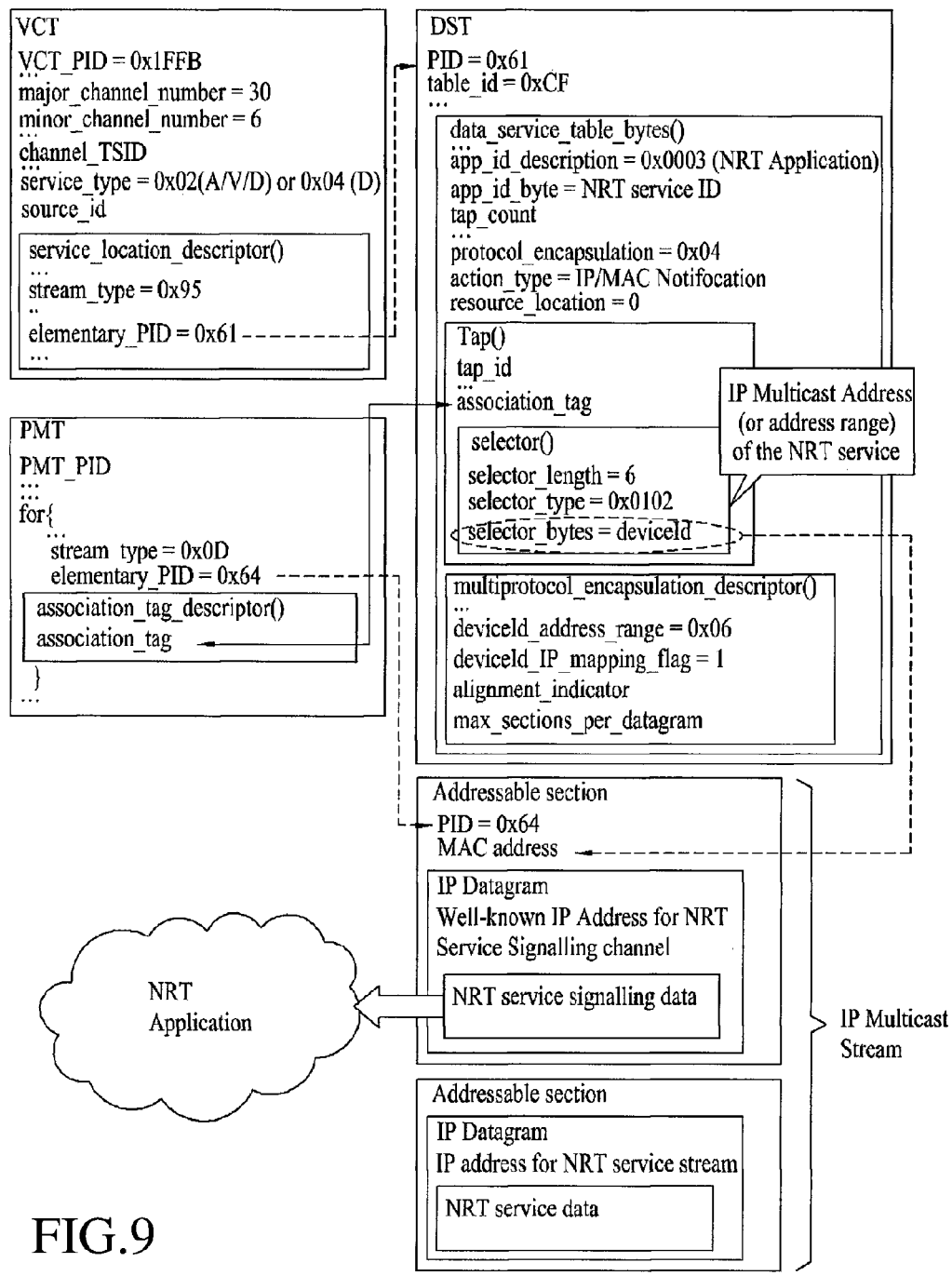
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02(i.e., digital A/V/Data), 0x04(i.e., Data only), or 0x08(i.e., NRT Only service), NRT service stream may be transmitted to the virtual channel. At this point, if 0x95(i.e., DST transmission) is allocated to a stream_type field value in a service location descriptor (or ES loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_description field of DST defines the format and interpretation of the following application identification bytes. According to an embodiment, '0x0003' is allocated to the App_id_description field to identify NRT application. The above numerical value is just one example, and does not restrict the range of the rights of the present invention.

If the App_id_description field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

Then, the receiver receives NRT service data, i.e., NRT content item/files to store them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
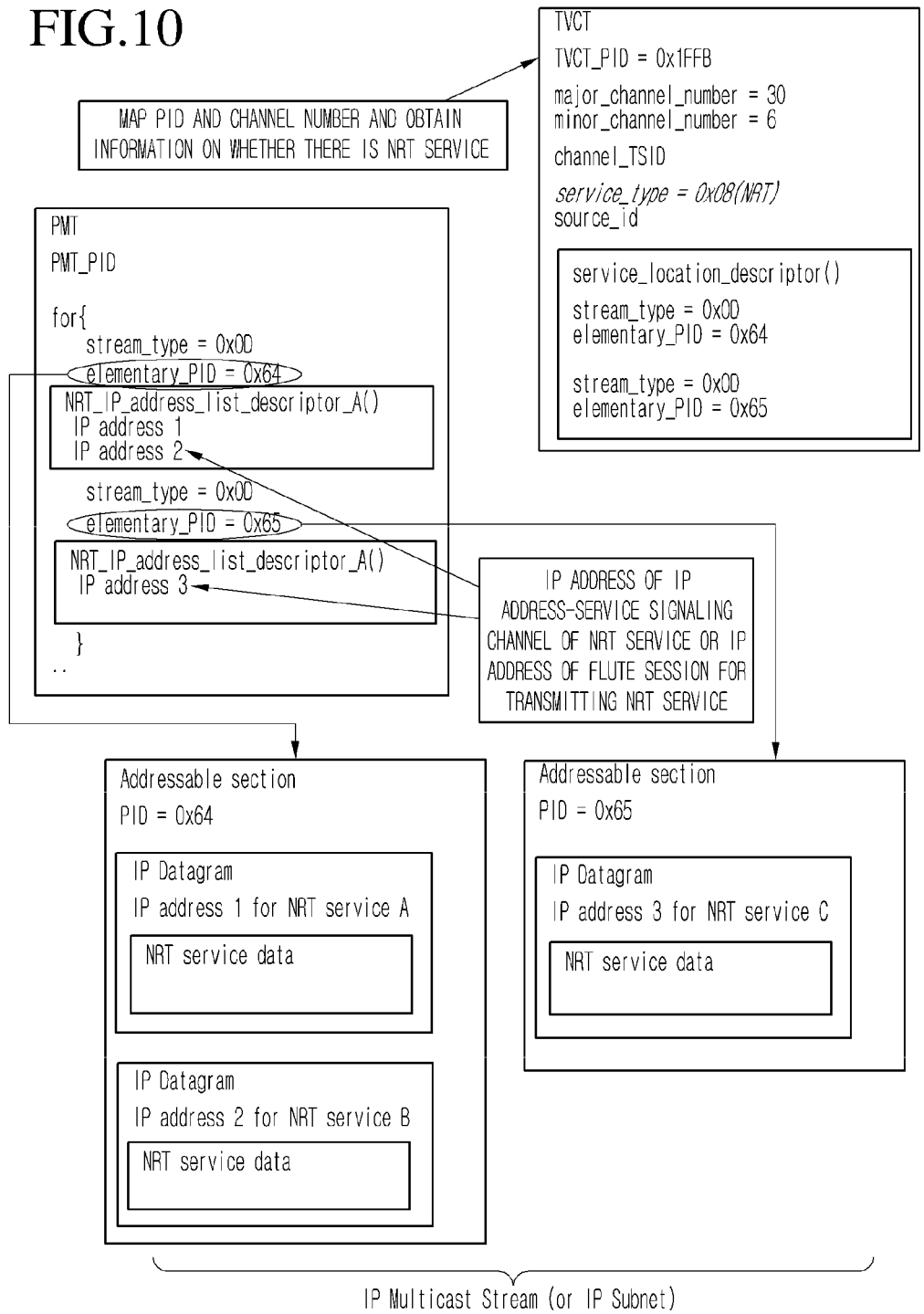

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0X02, 0X04 of 0X08. Also, the receiver may obtain elementary_PID having a stream type of 0X0D from the service_location_descriptor( ) field to receive the DSM-CC stream. Here, the receiver may obtain an NRT_IP_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_description field value.

According to an embodiment, '0x0003' is allocated to the App_id_description field to identify NRT application. The above numerical value is just one example, and does not restrict the range of the rights of the present invention.

If the App_id_description field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to store them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A table_id field (8 bits) as a field for type identification of a corresponding table section is a table section in which a corresponding table section constitutes NST through this field.

A section_syntax_indicator field (1 bit) is an indicator defining a section format of NST, and the section format may be short-form syntax (0) of MPEG, for example.

A private_indicator field (1 bit) represents whether the format of a corresponding section follows a private section format and may be set with 1.

A section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields. Here, a table_id_extension field includes an NST_protocol_version field.

The NST_protocol_version field (8 bits) shows a protocol version for notifying that NST transmits parameters having a different structure than other defined in a current protocol. Currently, this field value is 0. If the field value is designated with other than 0 later, it is for a table having a different structure.

A version_number field (5 bits) represents the version number of NST.

A current_next_indicator field (1 bit) indicates whether a transmitted NST table section is applicable currently. If the field value is 0, it means that there is no table yet and the next table is valid.

A section_number field (8 bits) represents a section number in sections in which a corresponding table section constitutes a NST table.

section_number of the first section of an NRT Service Table (NST) is set with '0x00'. The section_number is increased by one each time a section of the NST is increased.

A last_section_number field (8 bits) represents the last section number constituting a NST table, i.e., the highest section_number. (Highest section_number)

A carrier_frequency field (32 bits) notifies a transmission frequency corresponding to a channel.

A channel_TSID field (16 bits) means a unique channel identifier of broadcast stream in which a corresponding NST section is currently transmitted.

A program_number field (16 bits) represents the number of a program related to a virtual channel.

A source_id field (16 bits) represents the source of a program related to a virtual channel.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_status field (2 bits) identifies a state of a corresponding mobile service. Here, MSB indicates whether a corresponding mobile service is active (1) or inactive (0), and whether the corresponding mobile service is hidden (1) or not (0). Here, if the mobile service is NRT service, a state of the corresponding NRT service is identified. Hidden service is mainly used for exclusive application and a typical receiver disregards it.

A SP_indicator field (1 bit) is a field representing service protection if the service protection applied to at least one of components necessary for providing meaningful presentation of a corresponding mobile service is set.

A CP_indicator field (1 bit) represents whether content protection of a corresponding NRT service is set. If the CP_indicator field value is 1, it means that the content protection is applied to at least one of components required to provide a meaningful presentation of a corresponding NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

A Short_NRT_service_name field (8*8 bits) displays a short name of the NRT service. If there is no short name of the NRT service, the field may be filled with a null value (for example, 0x00).

An NRT_service_category field (6 bits) identifies a type of service in the corresponding NRT service.

A num_components field (5 bits) displays the number of IP stream components in the NRT service.

If an IP_version_flag field (1 bit) is set with 0, it indicates that a source_IP_address field, an NRT_service_destination_IP_address field, and a component_destination_IP_address field are IPv4 addresses. If set with 1, a source_IP_address field, an NRT_service_destination_IP_address field, and a component_destination_IP_address field are IPv6 addresses.

A source_IP_address_flag field (1 bit) indicates when a flag is set that there is a source IP address value for corresponding NRT service to indicate source specific multicast.

An NRT_service_destination_IP_address_flag field (1 bit) indicates when a flag is set with 1 that there is an NRT_service_destination_IP_address field for providing a default IP address for components of a corresponding NRT service.

In relation to a source_IP_address field (128 bits), there is a corresponding field if source_IP_address_flag is set with 1, but there is no corresponding field if set with 0. If there is a corresponding field, the corresponding field includes a source IP address of all IP datagram transmitting components of the corresponding NRT service. A restricted use of a 128 bit long address of a corresponding field is for future use of IPv6, which is not currently used though. Source_IP_address becomes a source IP address of the same server transmitting all channels of a FLUTE session.

In relation to an NRT_service_destination_IP_address field (128 bits), if source_IP_address_flag is set with 1, there is a source_IP_address field, but if source_IP_address_flag is set with 0, there is no corresponding source_IP_address field. If there is no corresponding source_IP_address field, a component_destination_IP_address field exists for each component in a num_components loop. A restricted use of a 128 bit long address of a corresponding source_IP_address field is for future use of IPv6, which is not currently used though. NRT_service_destination_IP_Address is signaled if there is a destination IP address of a session level of the FLUTE session.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session. Firstly, the definitely necessary parameters include parameters such as a source IP address, the number of channels in the session, the destination IP address and port number for each channel in the session, the Transport Session Identifier (TSI) of the session, and the start time and end time of the session. The optional necessary parameters related to a corresponding FLUTE session include parameters such as FEC Object Transmission Information, some information that tells receiver in the first place, that the session contains files that are of interest and bandwidth specification.

The number of channels in the session may be explicitly provided, or may be obtained by adding up the number of streams constituting the session. Through the NST and component_descriptor, parameters such as start time and end time of the session, source IP address, destination IP address and port number for each channel in the session, Transport Session Identifier (TSI) of the session, and number of channels in the session may be signaled.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

Hereinafter, each field of NRT_component_data will be described as follows.

A TSI field (16 bits) represents TSI of a FLUTE session.

A session_start_time field indicates a start time of the FLUTE session. If all values of the corresponding fields are 0, it means that a session started already.

A session_end_time field indicates an end time of the FLUTE session. If all values of the corresponding fields are 0, it means that a session continues infinitely.

A tias_bandwidth_indicator field (1 bit) indicates flags including Transport Independent Application Specific (TIAS) bandwidth information. If it indicates that the TIAS bandwidth field exists, a corresponding bit is set with 1, and if it indicates that the TIAS bandwidth field does not exist, the corresponding bit is set with 0.

In relation to an as_bandwidth_indicator field (1 bit), flags include Application Specific (AS) bandwidth information. If it indicates that the AS bandwidth field exists, a corresponding bit is set with 1, and if it indicates that the AS bandwidth field does not exist, the corresponding bit is set with 0.

An FEC_OTI_indicator field (1 bit) represents whether FEC object transmission information (OTI) is provided.

A tias_bandwidth field represents a TIAS maximum bandwidth.

An as_bandwidth field has an AS maximum bandwidth value.

An FEC_encoding_id field represents FEC encoding ID used in the corresponding FLUTE session.

An FEC_instance_id field represents FEC instance ID used in the corresponding FLUTE session.

Provided is a method of providing all Information necessary for receiving the FLUTE session by signaling the same parameters as above through FLUTE component data bytes, and of receiving files by obtaining information on all the files delivered through the FLUTE session that uses FDT received through the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and stored in at least two sections.

The downloadable content item, which is more extended than a period that at least one NRT-IT instance takes, is the first of NRT-IT. The content item description is stored in NRT_information_table_section ( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A table_id field (8 bits) is set with 0xTBD to identify a table section that a corresponding table section constitutes NRT-IT.

A service_id field (16 bits) describes a service_id field related to NRT service showing a content item that the section describes.

An NRT_IT_version_number field (5 bits) is defined as a set in at least one NRT_content_table_section( ) having a common value with respect to service_id, current_next_indicator, protocol_version, and time_span_start fields. It identifies a version number of an NRT-IT instance. The version number is increased by 1 modulo 32 when a field of NRT-IT instance is changed.

A current_next_indicator field (1 bit) represents that a corresponding table section is applicable currently if set with 1.

A protocol_version field (8 bits) is set with 0. A function of protocol_version allows a table type having parameters in the future, which has a different structure than those defined in the current protocol. Currently, only one valid value of protocol_version is 0. A value other than in protocol_version is used for the future version of standard to recognize other tables having different structures.

A time_span_start field (32 bits) represents a start time of an instance period represented in GPS sec from 00:00:00 UTC, Jan. 6, 1980. A time of day of time_span_start is set to 00 min of the time. A value 0 of time_span_start represents a period of an NRT-IT instance starting from a negative past. A value of time_span is identical at each section of multi-sectioned NRT-IT instance. Values of time_span_start and time_span_length are set not to overlap another NRT-IT instance of an IP subnet at a specified period.

A time_span_length field (11 bits) identifies a number of min starting at the time recognized at time_span_start that the instance covers. Once it is set, a value of time_span_length does not change in a value of time_span_start. If a value of time_span_length is 0, an NRT-IT instance covers an entire time starting from time_span_start at the indefinite future. When a value of time_span_start is 0, there is no meaning in time_span_length.

A value of time_span_start is identical at each section of multi-sectioned NRT-IT instance. Values of time_span_start and time_span_length are set not to overlap another NRT-IT instance of an IP subnet at a specified period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragment in Text FragmentTable). A value of a content_linkage field corresponds to a value of an FDT-Cotent-Linkage element or a value of a File-Content-Linkage element in FLUTE FDT of each file related to a content item. A priority rule is applied when each content linkage value including a corresponding content linkage element in FLUTE FDT is matched.

A TF_available flag (Boolean flag) is set with 1 when Text Fragment exists in a Text Fragment Table of a service signaling channel. If Text Fragment is not included in a service signaling channel for the content item, a value of the TF_available field is set with 0.

If a low_lantency flag (Boolean flag) is set with 1, as a user waits, content is valid in a current digital transmission of sufficiently low delay time that collection attempts. If set with 0, a collection delay time becomes longer and a user interface suggests a post view to a user.

A playback_length_in_seconds (20 bits) is an integer representing a playing time of a content in sec. A content including texts and/or still images has a value of 0. In relation to a content including audio or audio/video content, playback_length_in_seconds represents a playing time of audio or audio/video content.

If a content_length_included flag (Boolean flag) is set with 1, a content_length field exists in the repetition in a 'for' loop. If set with 0, it indicates that the content_length field does not exist in the repetition in a 'for' loop.

If a playback_delay_included flag (Boolean flag) is set with 1, it indicates that a playback_delay field exists in the repetition in a 'for' loop. If set with 0, it indicates that the playback_delay field does not exist in the repetition in a 'for' loop.

If an expiration_included flag (Boolean flag) is set with 1, an expiration field exits in the repetition in a 'for' loop. If set with 0, it indicates that the expiration field does not exist in the repetition in a 'for' loop.

A duration (12 bits) field represents an expected cycle time of carousel including a referenced content item in a range of 1 to 2880 in min. A receiver uses a duration parameter determining a time taking for the referenced content capture.

playback_delay (20 bits) is represented with a number of the next sec of the first byte before playing a related content while incoming stream is buffered. A value of 0 represents playing starts immediately. When playback_delay is not set, a receiver collects a complete file or a file before playing.

An expiration field (32 bits) represents expiration time expressed in GPS sec from 00:00:00 UTC, Jan. 6, 1980. After expiration, the content is deleted from the memory. If it is not expired, the receiver uses a method that a company for managing a memory resource selects.

A content_name_length_field (8 bits) represents the length (byte unit) of content_name_text.

A content_name_text( ) field represents a content item title in a system having a plurality of string structures.

A content_descriptors_length field (12 bits) represents an entire length (byte unit) of content_descriptor providing additional information on a content level.

content_descriptor is a descriptor that is additionally applied to each content item.

descriptor_length (10 bits) represents an entire length (byte unit) of a descriptor.

A descriptor is generally applied to all content items described in the current NRT-IT section.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A section_syntax_indicator field (1 bit) is an indicator defining a section format of NCT.

A private_indicator field (1 bit) represents whether NCT follows a private section.

A section_length field (12 bits) represents the section length of NST.

An NRT_channel_id field (16 bits) represents a value uniquely identifying NRT service including content described in NCT.

A version_number field (5 bits) represents the version number of NCT.

A current_next_indicator field (1 bit) represents whether information in a corresponding NCT section is applicable currently or in the future.

A section_number field (8 bits) represents the section number of a current NCT section.

A last_section_number field (8 bits) represents the last section number of NCT.

A protocol_version field (8 bits) indicates a protocol version for allowing NCT, which transmits parameters having different structures then those defined in a current protocol. (An 8-bit unsigned integer field whose function is to allow, in the future, this NRT Content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents in the NCT. At this point, the number of contents represents the number of contents transmitted through a virtual channel that source_id specifies.

Later, a 'for' loop (or a content loop) is performed as many as the number of contents corresponding to the num_contents_in_section field value, to provide the detailed information of a corresponding content by each content.

A content_version field (32 bits) indicates the version number for content (or a file) having a specific content_id value. That is, let's assume that if content_id of a content that a receiver receives previously is 0x0010, the same content, i.e., its content_id value is 0x0010 is transmitted. At this point, if the content_version field value is different, the previously stored content is updated or replaced by receiving the newly announced content through the NCT. In this embodiment, the content_version field value means a series number representing a release version but may actually represent published (released) time directly. At this point, if the content_version field is difficult to represent publish time, a new field may be used to represent the published (released) time.

A content_id field (16 bits) indicates an identifier uniquely identifying the content (or file).

A content_available_start_time field (32 bits) and a content_available_end_time field (32 bits) represent a start time and end time of a FLUTE session transmitting the content.

An ETM_location field (2 bits) describes the existence and location of an extended text message (ETM).

A content_length_in_seconds field (30 bits) represents an actual play time of a corresponding content in sec unit when the content (or file) is an A/V file.

A content_size field (48 bits) represents the size of the content (or file) in byte unit.

A content_delivery_bit_rate field (32 bits) represents a bit rate at which the content (or file) is transmitted, and means a target bit rate. That is, when a service provider or broadcasting station transmits a corresponding content, the content_delivery_bit_rate field displays how wide a bandwidth is to be allocated. Accordingly, if a receiver uses content_size and content_delivery_bit_rate, the minimum time for receiving a corresponding content (or file) is obtained. That is, the time for receiving content is estimated and provided to a user. Also, the minimum receiving time is obtained by calculating (conent_size*8)/(content_delivery_bit_rate) and its unit is in sec.

A content_title_length field (8 bits) represents the length of content_title_text( ) in byte unit. If this field is used, the receiver knows how many bytes need to be read to obtain content_title_text ( ) information.

A content_title_text( ) field represents a content title in the format of a multiple string structure.

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted. In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT. (table_id: An 8-bit unsigned integer number that indicates the type of table section being defined in Service Map Table (SMT)).

A section_syntax_indicator field (1 bit) is an indicator defining a session format of SMT, and its session format may be a short-form syntax ('0') of MPEG (section_syntax_indicator: This 1-bit field shall be set to '0' to always indicate that this table is derived from the "short" form of the MPEG-2 private section table).

A private_indicator field (1 bit) indicates whether SMT follows a private section (private_indicator: This 1-bit field shall be set to '1').

A section_length field (12 bits) represents the remaining session length of SMT after a corresponding field (section_length: A 12-bit field. It specifies the number of remaining bytes this table section immediately following this field. The value in this field shall not exceed 4093 (0xFFD)).

A table_id_extension field (16 bits) is dependent on a table, and may be a logical part of a table_id field providing a range of the remaining fields (table_id_extension: This is a 16-bit field and is table-dependent. It shall be considered to be logically part of the table_id field providing the scope for the remaining fields).

Here, a table_id_extension field includes an SMT_protocol_version field.

The SMT_protocol_version field (8 bits) shows a protocol version that allows SMT transmitting parameters having a different structure than those defined in a current protocol (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) includes values of '0x00' to '0x3F', as an ID value related to corresponding Ensemble (ensemble_id: This 8-bit unsigned integer field in the range 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame).

A version_number field (5 bits) represents the version number of SMT. A current_next_indicator field (1 bit) indicates whether a transmitted SMT table session is applicable currently (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) represents a current SMT session number (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents the last session number constituting an SMT table.

(last_section_number: This 8-bit field shall give the number of the last section (i.e., the section with the highest section_number) of the Service Signaling table of which this section is a part).

A num_services field (8 bits) indicates the number of services in an SMT session. (num_services: This 8 bit field specifies the number of services in this SMT section.). At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section.). The service_id of a service shall not change throughout the life of the service.

To avoid confusion, it is recommended that if a service is terminated, then the service_id for the service should not be used for another service until after a suitable interval of time has elapsed. Here, if the service is NRT service, the service_id may identify the NRT service.

A Multi_ensemble_service field (2 bits) identifies whether a corresponding service is transmitted through at least one Ensemble.

Additionally, the corresponding field identifies whether service is rendered as a portion of the service transmitted through a corresponding Ensemble. That is, if the service is NRT service, the filed identifies whether NRT service is transmitted through at least one Ensemble (multi_ensemble_service: A two-bit enumerated field that shall identify whether the Service is carried across more than one Ensemble. Also, this field shall identify whether or not the Service can be rendered only with the portion of Service carried through this Ensemble.).

A service_status field (2 bits) identifies a state of a corresponding service. Here, MSB indicates whether a corresponding service is active (1) or inactive (0), and LSB indicates whether a corresponding service is hidden (1) or not (0). Here, when the service is NRT service, MSB of the service_status field indicates whether a corresponding NRT service is active (1) or inactive (0), and LSB indicates whether a corresponding NRT service is hidden (1) or not (0).

A SP_indicator field (1 bit) represents whether service protection of a corresponding service is set. If a SP_indicator field value is set to 1, service protection is applied to at least one of components need to provide meaningful presentation of a corresponding service.

A short_service_name_length field (3 bits) represents the length of a short service name in a short_service_name field in byte unit.

A short_service_name field represents a short name of a corresponding service (short_service_name: The short name of the Service, each character of which shall be encoded per UTF-8 [29]. When there is an odd number of bytes in the short name, the second byte of the last of the byte pair per the pair count indicated by the short_service_name_length field shall contain 0x00). For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

A num_services field (5 bits) indicates the number of IP stream components in this service.

IP_version_flag field (1 bit), when set to '0', shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1 bit) shall indicate, when set, that a source IP address value for this Service is present to indicate a source specific multicast.

When a service_destination_IP_address_flag field (1 bit) is set, it indicates that a corresponding IP stream component is transmitted through IP datagram having a different target IP address than service_destination_IP_address.

Accordingly, if the flat is set, a receiving system uses component_destination_IP_address as destination_IP_address, and disregards a service_destination_IP_address field in a num_channels loop (service_destination_IP_address_flag: A 1-bit Boolean flag that indicates, when set to '1', that a service_destination_IP_address value is present, to serve as the default IP address for the components of this Service).

In relation to the source_IP_address field (32 or 128 bits), if source_IP_address_flag is set with 1, interpretation is required, but if not set with 0, no interpretation is required.

When the source_IP_address_flag field is set with '1' and the IP_version_flag field is set with '0', this field indicates a 32 bit IPv4 address representing a source of a corresponding circuit channel. If the IP_version_flag field is set with '1', this field indicates a 32 bit IPv6 address representing a source of a corresponding virtual channel (source_IP_address: This field shall be present if the source_IP_address_flag is set to '1' and shall not be present if the source_IP_address_flag is set to '0'. If present, this field shall contain the source IP address of all the IP datagram carrying the components of this Service. The conditional use of the 128 bit-long address version of this field is to facilitate possible use of IPv6 in the future, although use of IPv6 is not currently defined).

If the service is NRT service, the Source_IP_address field becomes a source IP address of the same server transmitting all channels of the FLUTE session.

In relation to the service_destination_IP_address field (32 or 128 bits), if service_destination_IP_address_flag is set with 1, interpretation is required, but if set with 0, no interpretation is required. When the service_destination_IP_address_flag field is set with '1' and the IP_version_flag field is set with '0', this field indicates a 32 bit destination IPv4 address for a corresponding virtual channel.

When the service_destination_IP_address_flag field is set with '1' and the IP_version_flag field is set with '1', this field indicates a 64 bit destination IPv6 address for a corresponding virtual channel. If the corresponding service_destination_IP_address cannot be interpreted, a component_destination_IP_address field in a num_components loop needs to be interpreted, and a receiving system uses component_destination_IP_address to access an IP stream component (service_destination_IP_address: This field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). If the service is NRT service, the service_destination_IP_Address field is signaled with a destination IP address of a session level of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

An essential_component_indicator field (1 bit), when set to '1', shall indicate that this component is an essential component for the service. Otherwise, this field indicates that this component is an optional component).

A component_destination_IP_address_flag field (1 bit) shall indicate, when set to '1', that the component_destination_IP_address is present for this component.

A port_num_count field (6 bits) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_destination_UPD_port_num field and shall be incremented by two, to allow for the RTCP streams associated with the RTP streams.

A component_destination_UDP_port_num (16 bits) represents the destination UDP port number for this UDP/IP stream component. For RTP streams, the value of component_destination_UDP_port_num shall be even, and the next higher value shall represent the destination UDP port number of the associated RTCP stream).

A component_destination_IP_address field (32 or 128 bits) shall be present if the component_destination_IP_address_flag is set to '1' and shall not be present if the component_destination_IP_address_flag is set to '0'. When this field is present, the destination address of the IP datagram carrying this component of the M/H Service shall match the address in this field. When this field is not present, the destination address of the IP datagram carrying this component shall match the address in the M/H_service_destination_IP_address field. The conditional use of the 128 bit-long address version of this field is to facilitate possible use of IPv6 in the future, although use of IPv6 is not currently defined.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of component_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute. An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOT field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with 'true" and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
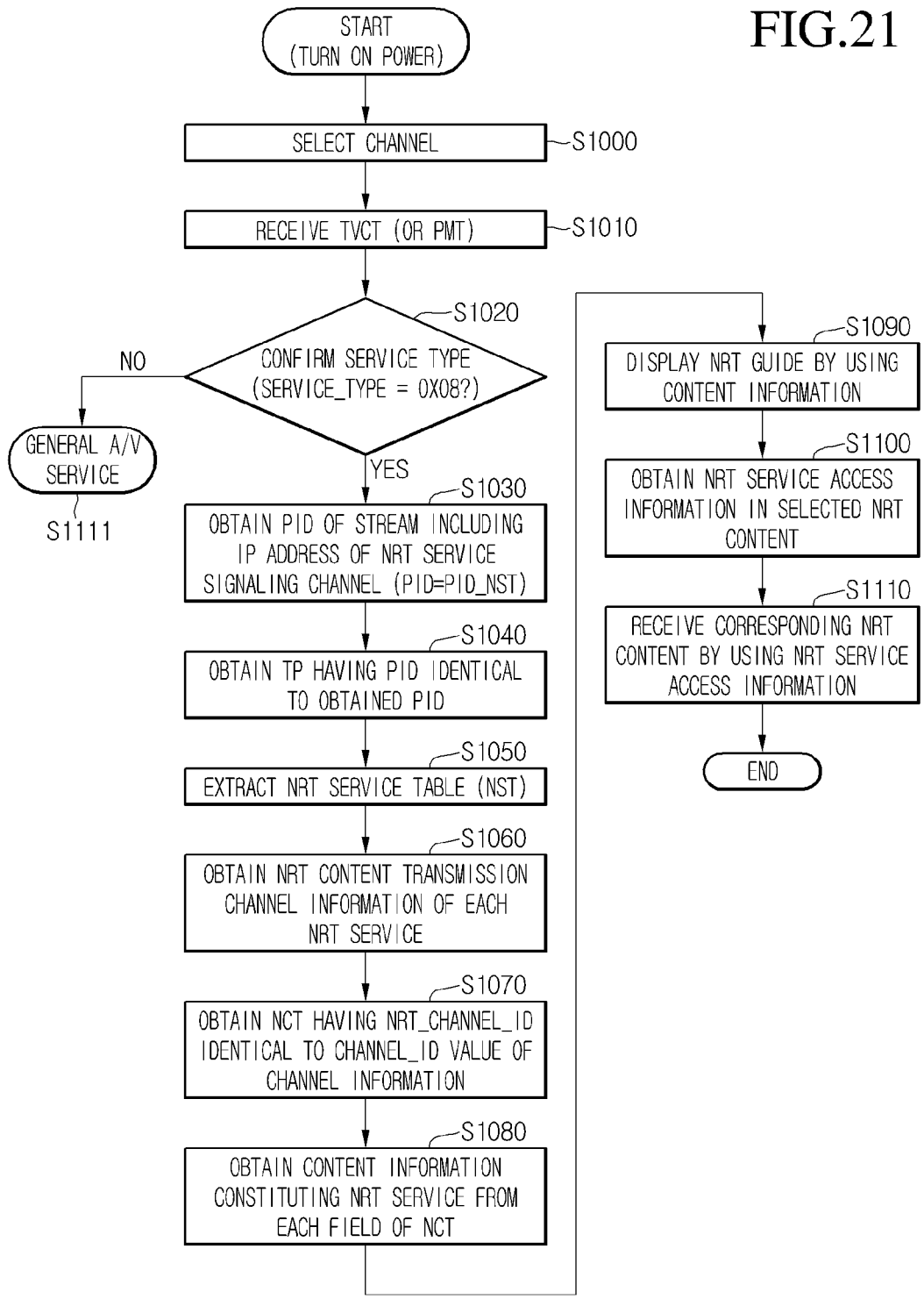
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S1111.

Moreover, if it is determined that there is NRT service, since a corresponding virtual channel transmits NRT service, PID(PID=PID_NST) matching to a specific PID (PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delivery_bit_rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information belonging to the selected NRT content from NST in operation S1100. The NRT service access information may include channel information or IP address information for receiving NRT service data, for example.

Moreover, the receiver accesses a channel or server for transmitting NRT service by using the obtained NRT service access information to receive a corresponding NRT content in operation S1110, and performs a proper operation according to the NRT content.

Figure 22:
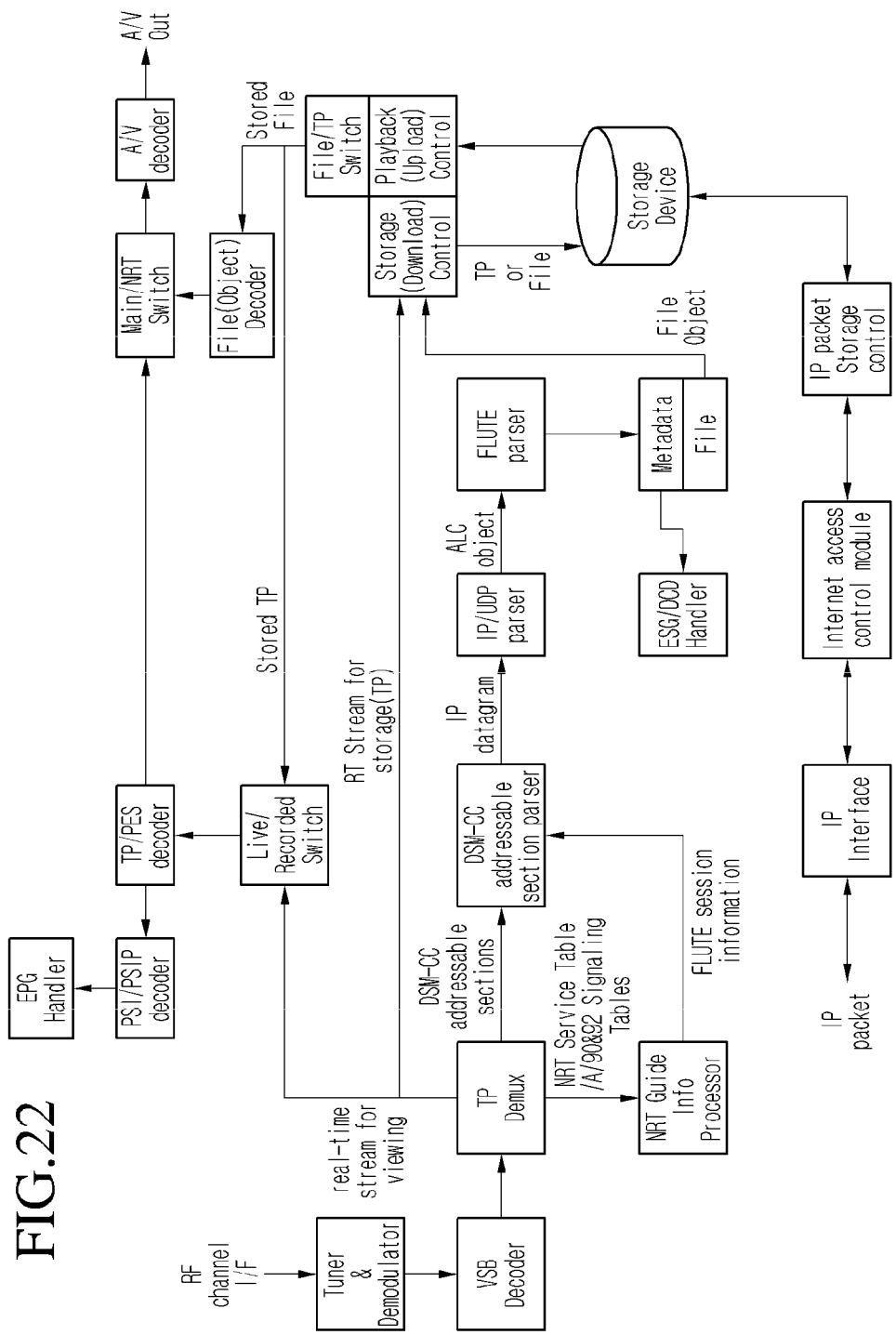
FIGS. 22 and 23 are views illustrating a receiving system receiving, storing, and playing NRT content for NRT service according to another embodiment.
Figure 23:
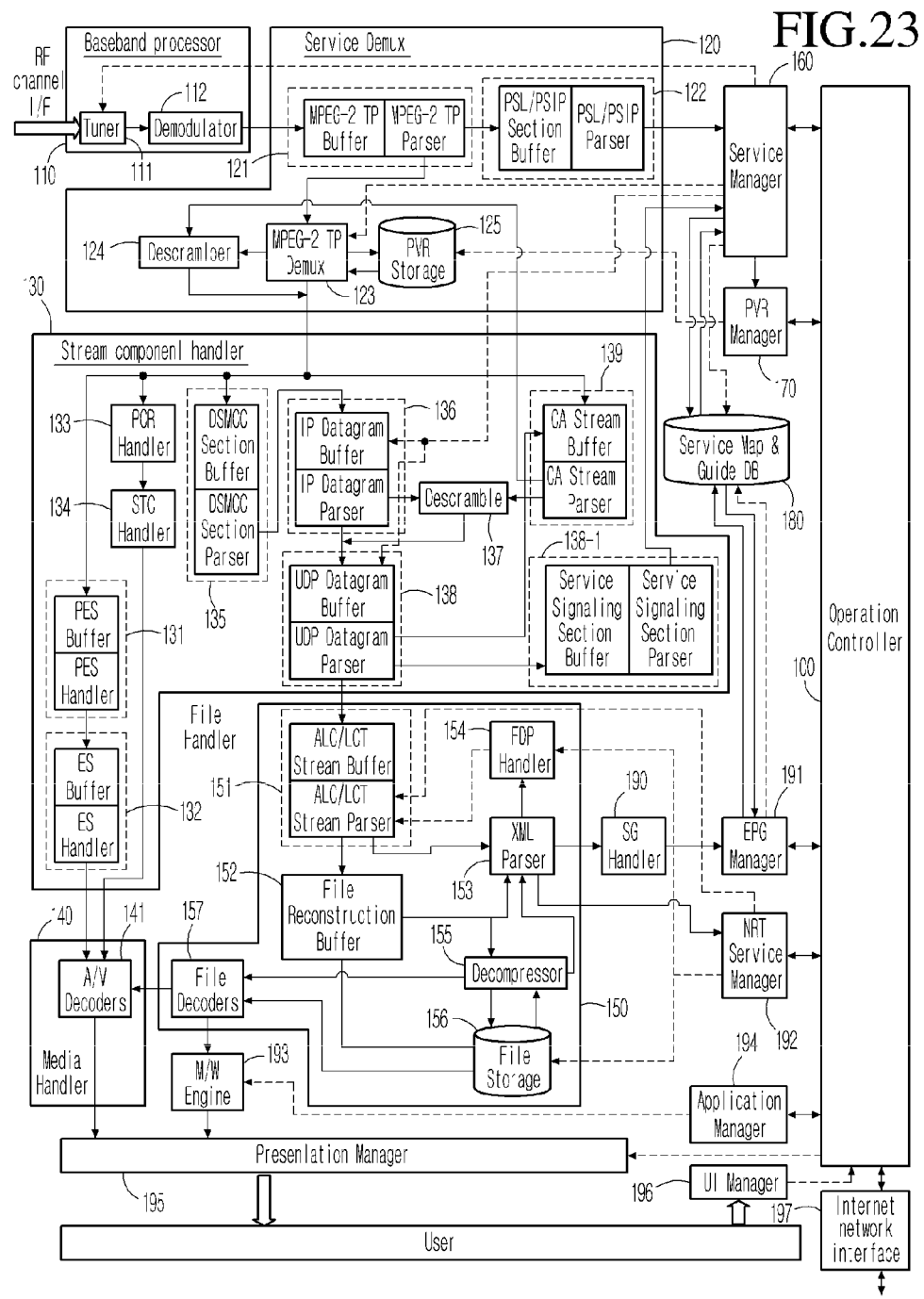

FIGS. 22 and 23 are views illustrating a receiving system receiving, storing, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily storing an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily storing a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be stored in the first storage unit 180. Table information such as VCT, PAT, PMT, and DST are stored in the first storage unit through the above processes. The service manager 160 stores the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135. Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 stores an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., storing) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and stores it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily storing an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily storing a TS packet outputted from the MPEG-2 TP handler or service protection data restored and outputted from a UDP datagram handler 138, restores information (for example, control words used for scramble) necessary for descramble from the stored TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily storing a TS packet outputted from the demultiplexer 123, restores an addressable section in the payload of the TS packet. After restoring IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, stored in the first storage unit

180. The service manager 160 stores the extracted information from the NST in the first storage unit 180 in a service map and guide data format. As another example, the NRT service manager 182 may serve as the service manager 160. That is, the parsed information from the NST is collected by the NRT service manager 192, and then, stored in the first storage unit 180.

The ALC/LCT stream hander 151 includes an ALC/LCT stream buffer and an ALC/LCT stream parser, and after buffering data having an ALC/LCT structure outputted from the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily stored in the file reconstruction buffer 152, it is outputted to the file decoder 157 or stored in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium storing a file such as NRT service data, may be shared with the second storage unit 125, or may be separately used.

Figure 24:
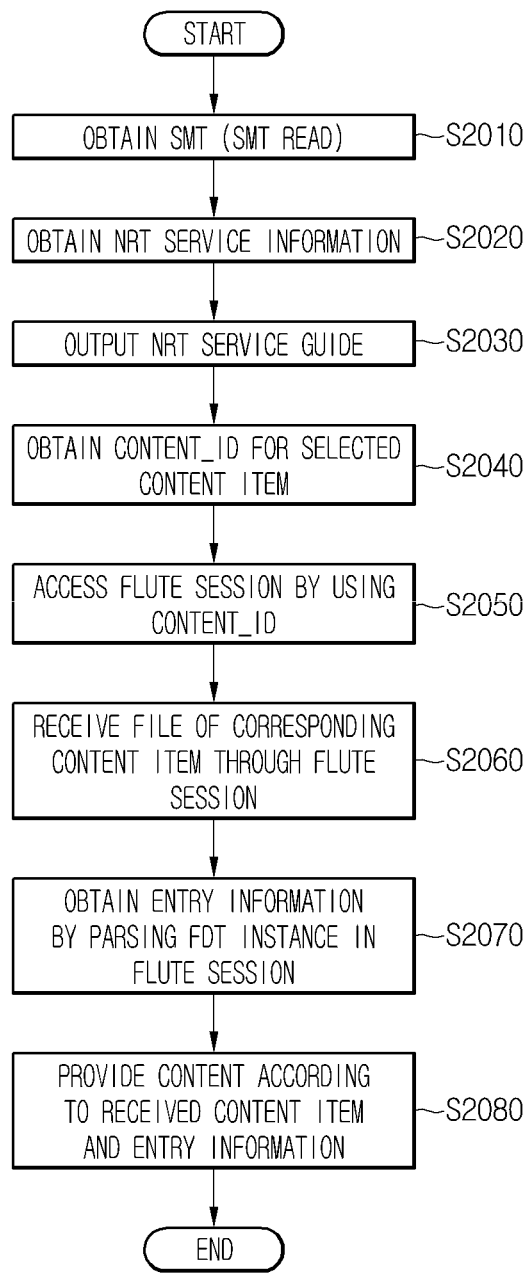
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage_requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and storing it in a receiver, a broadcasting station may designate a content item of the corresponding NRT service, which is executed at the timing of when a specific real-time broadcasting is transmitted or the NRT service is displayed. According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on trigging the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver. Additionally, if the action information includes the extension command of the target TDO, a trigger may notify the receiver that the target TDO would extend. Additionally, if the action information includes the termination command of the target TDO, a trigger may notify the receiver that the target TDO would terminate. Thus, the broadcasting station may control a TDO operation in the receiver according to a real-time content through trigger.

Moreover, a trigger time may mean a time designated for performing (triggering) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time.

FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with 0XTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself.

For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

Figure 26:
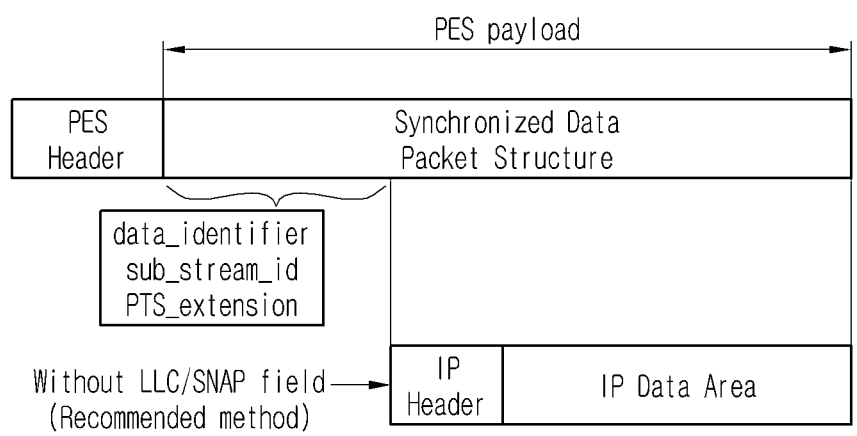
FIG. 26 is a view illustrating a PES structure according to a synchronized data stream method including a trigger according to an embodiment.

FIG. 26 is a view illustrating a PES structure according to a synchronized data stream method including a trigger according to an embodiment.

As shown in FIG. 26, PES of the synchronized data stream method may include a PES header and PES payload. The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0X22 according to a type.

A sub_stream_id field is an identifier (user private) settable by a user.

A PTS_extention_flag field indicates whether there is a PTS_extension field. If this field value is 1, the PTS_extension field may be in the PES_data_packet field. Additionally, this field may be 0 when there is no PTS_extension field.

An output data rate flag field may be set with 0.

A synchronized_data_packet_header_length field represents the length of an optical field in the PES packet header. This field may be included If the PTS_extention_flag field is 1, and represents the length including synchronized_data_private_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 µs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be triggered at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) are identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_id_description is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (service_id). Additionally, content items constituting NRT service may be identified through conent_length or a content identifier in NCT or NRT-IT. Accordingly, trigger service may be transmitted like NRT service by extending app_id_byte through DST. For example, app_id_byte may include data combining a service identifier (service id) field of trigger service and a content_linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentTypeDescriptor.

A descriptorLength field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementray_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and target_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
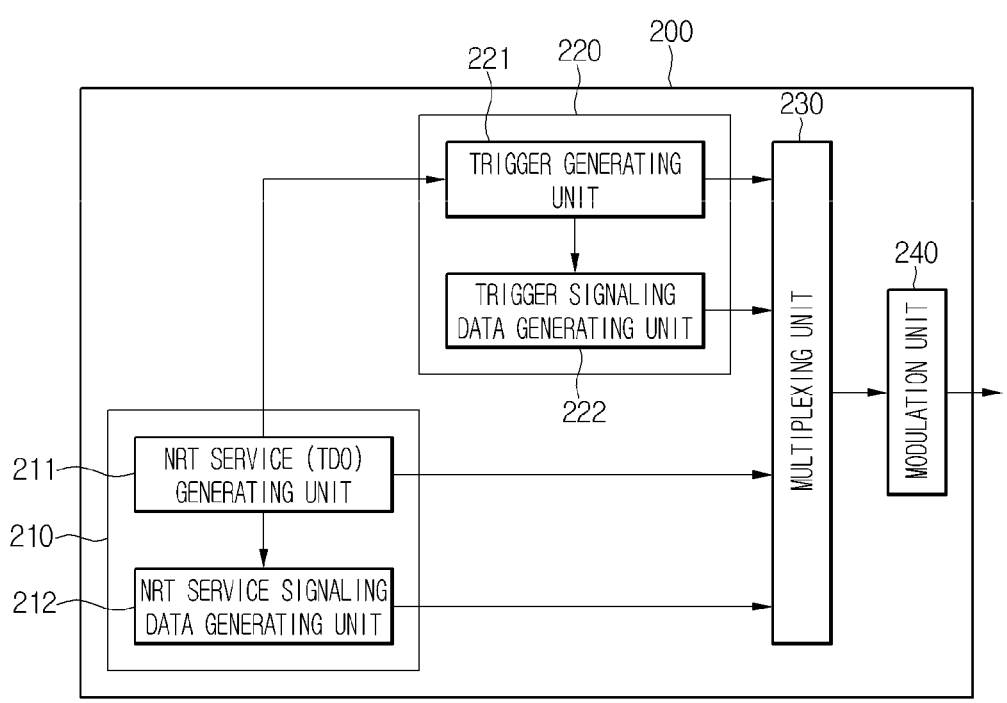
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 222.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
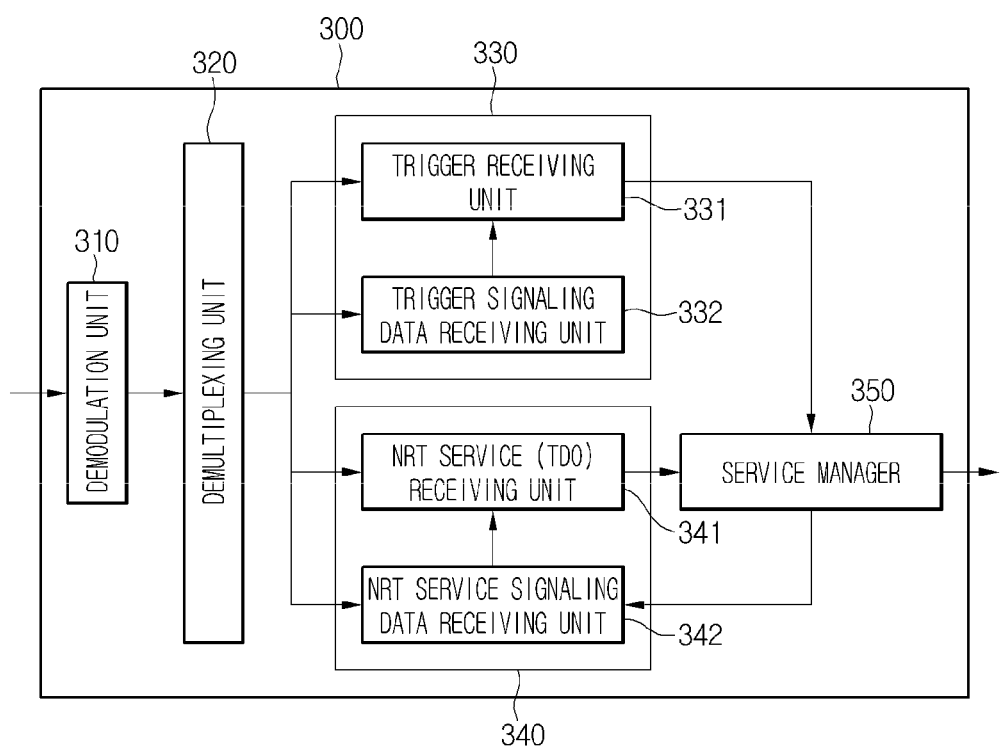
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310, a demultiplexing unit 320, a trigger processing unit 330, an NRT service processing unit 340, and a service manager 350. The trigger processing unit 330 includes a trigger receiving unit 331 and a trigger signaling data receiving unit 332. The NRT service processing unit 340 includes an NRT service (TDO) receiving unit 341 and an NRT service signaling data receiving unit 342.

The demodulation unit 310 receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330 or the NRT service processing unit 340.

The NRT service signaling data receiving unit 342 receives and restores the packetized NRT service signaling data from the multiplexing unit 320 to extract information on NRT service, and then transmits it to the NRT service (TDO) receiving unit 341. The NRT service (TDO) receiving unit 341 receives transmission packets of NRT service from the multiplexing unit 320 by using information on receiving NRT service, and restores it as service data to transmit it to the service manager 350.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350.

The service manager 350 receives at least one of trigger data or NRT service (TDO) data from the trigger processing unit 330 or the NRT processing unit 340. Moreover, the service manager 350 performs and applies a trigger action on a trigger target TDO at the trigger timing, so that a trigger action on TDO is performed.

Figure 35:
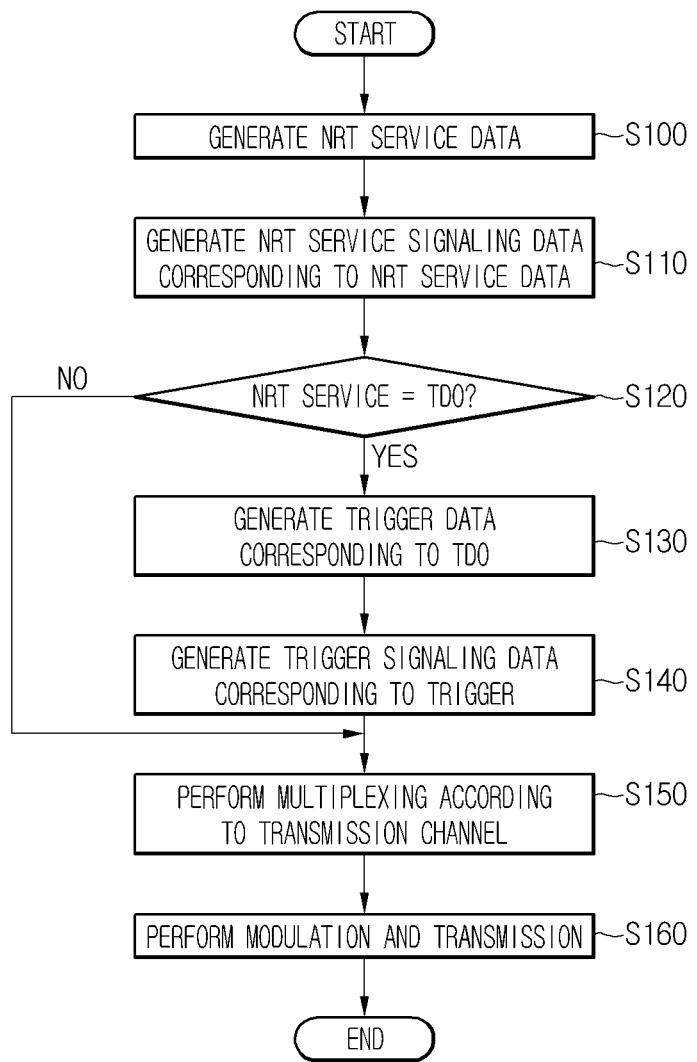
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation 5110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
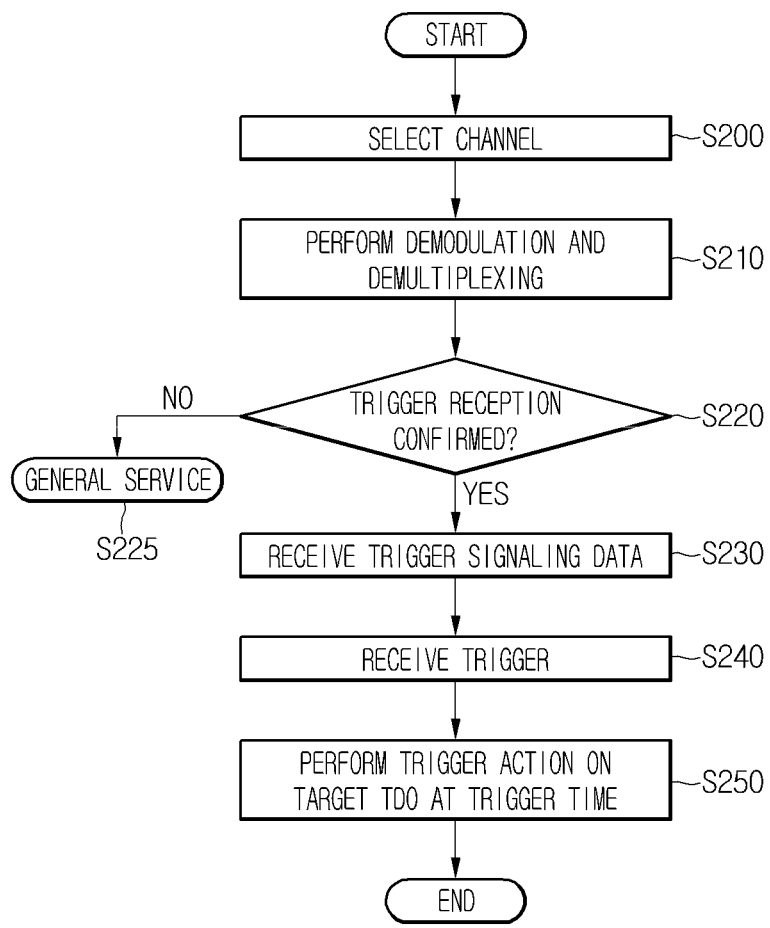
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310 demodulates the received signal from the selected channel, and the demultiplexing unit 320 demultiplexes the demodulated signal by each transmission channel. Also, the NRT service receiving unit 341 and the NRT service signaling data receiving unit 342 receive NRT service data and transmit it to the service manager 350 as described above.

Then, the trigger signaling data receiving unit 332 or the NRT service signaling data receiving unit 342 confirms whether trigger reception is possible in operation s220. The trigger reception confirmation may use one of the above-mentioned methods. That is, the trigger signaling data receiving unit 332 or the NRT service signaling data receiving unit 342 uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation 5230.

Later, the trigger receiving unit 331 extracts trigger data from the received transmission packet by using the trigger signaling data, and transmits it to the service manager 350 in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350. Additionally, if the received trigger stream is PES, PTS in the header of PES is extracted as a trigger time, and a target service identifier and trigger action in the payload of PES are extracted, in order to transmit them to the service manager 350.

Moreover, the service manager 350 performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
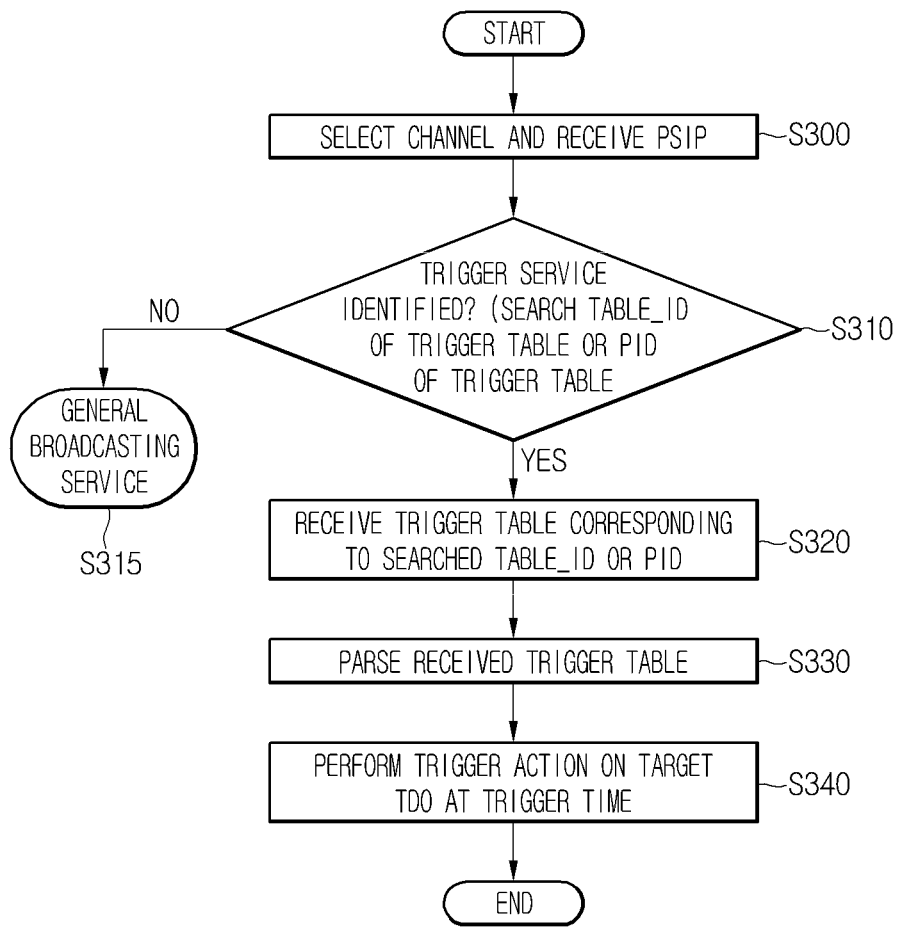
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310 receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350 receives trigger information including trigger time, trigger action, and target TDO identification information parsed in the trigger table, and performs a corresponding trigger action on a corresponding TDO at the corresponding trigger timing in operation S340.

Figure 38:
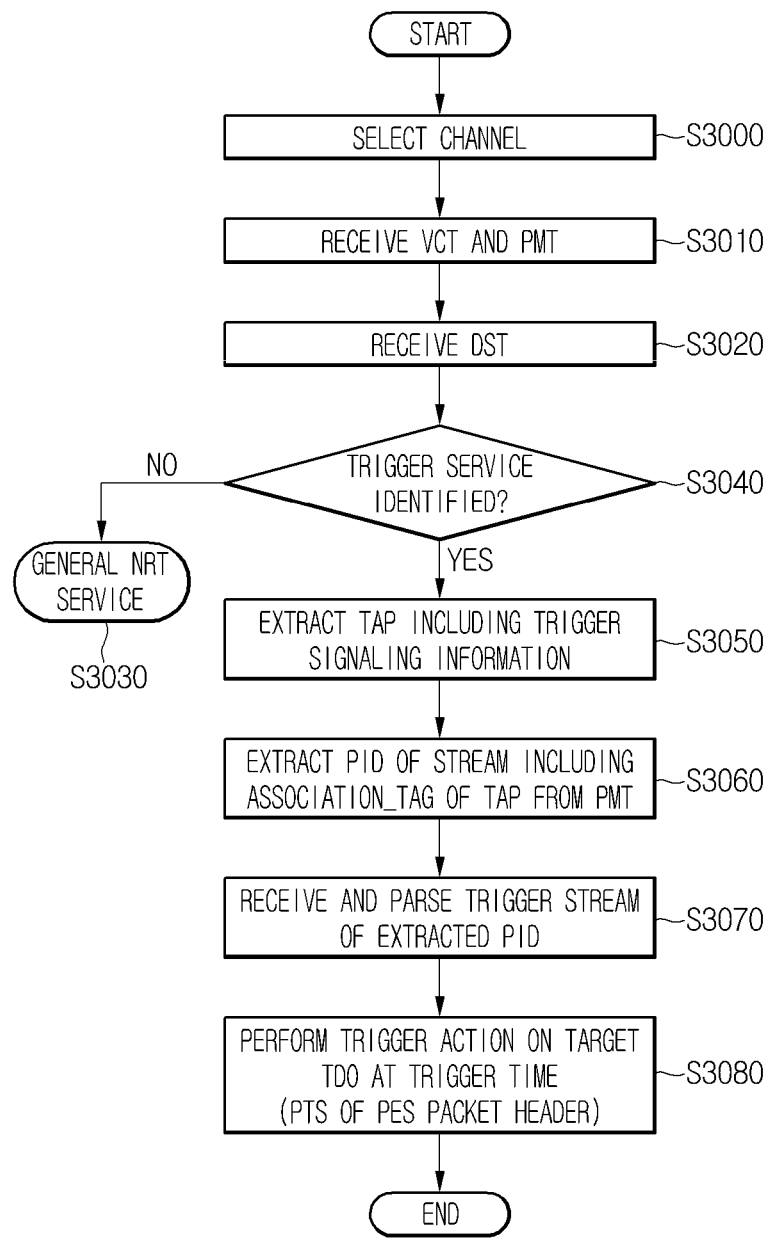
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S3010. Then, the PSI/PSIP section handler or the trigger signaling data receiving unit 332 or the NRT service signaling data receiving unit 342 parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342 or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350.

Also, the trigger signaling data receiving unit 342 identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association_tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350 performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
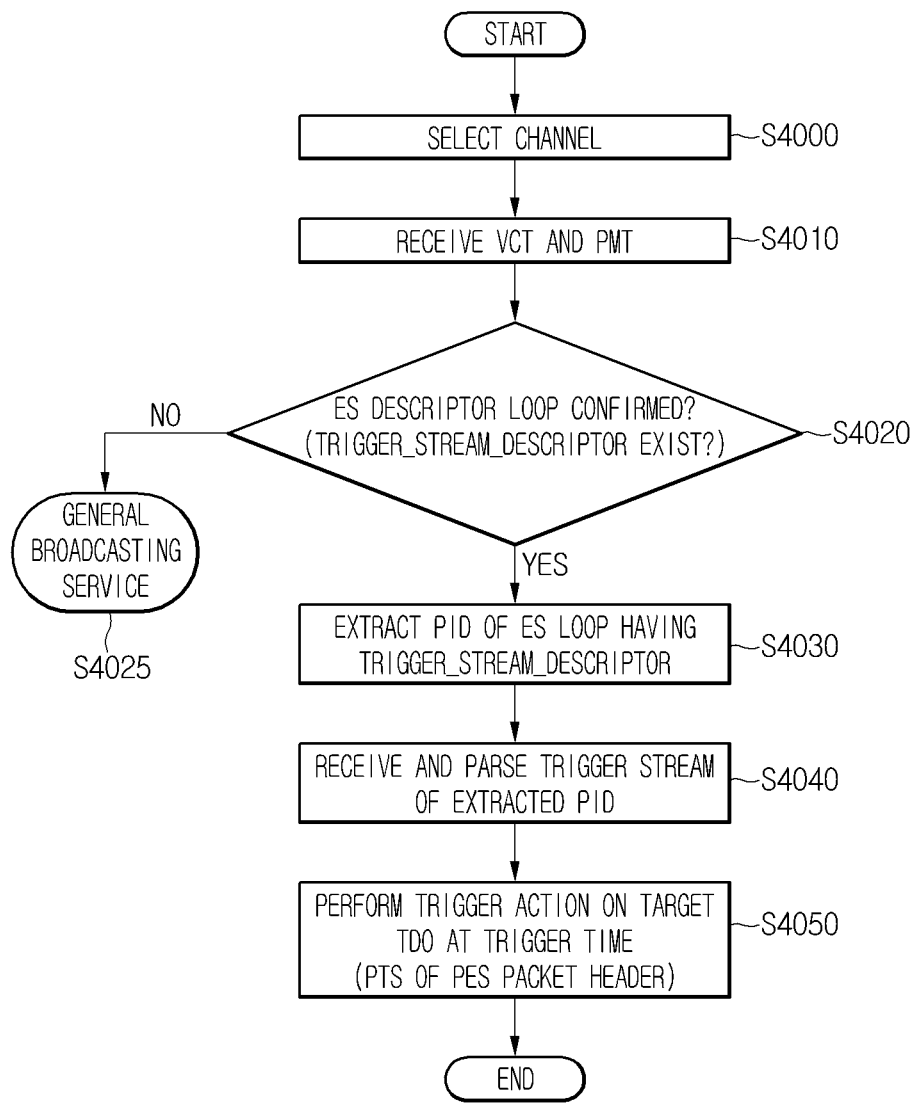
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350 performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
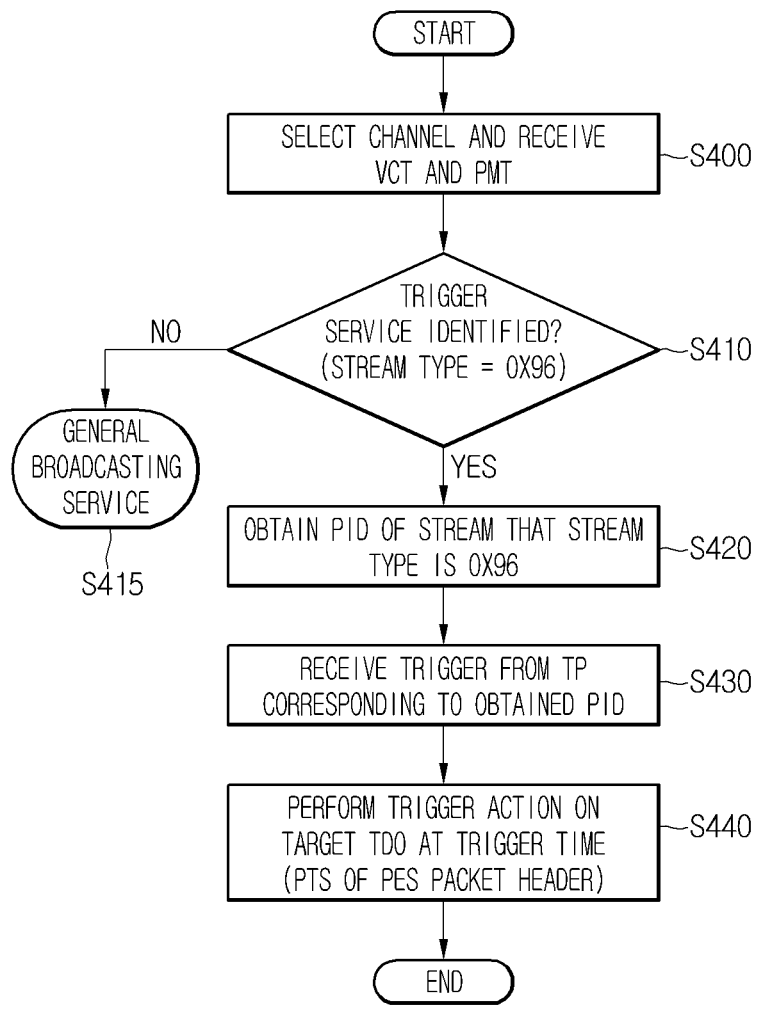
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310 and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350 performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
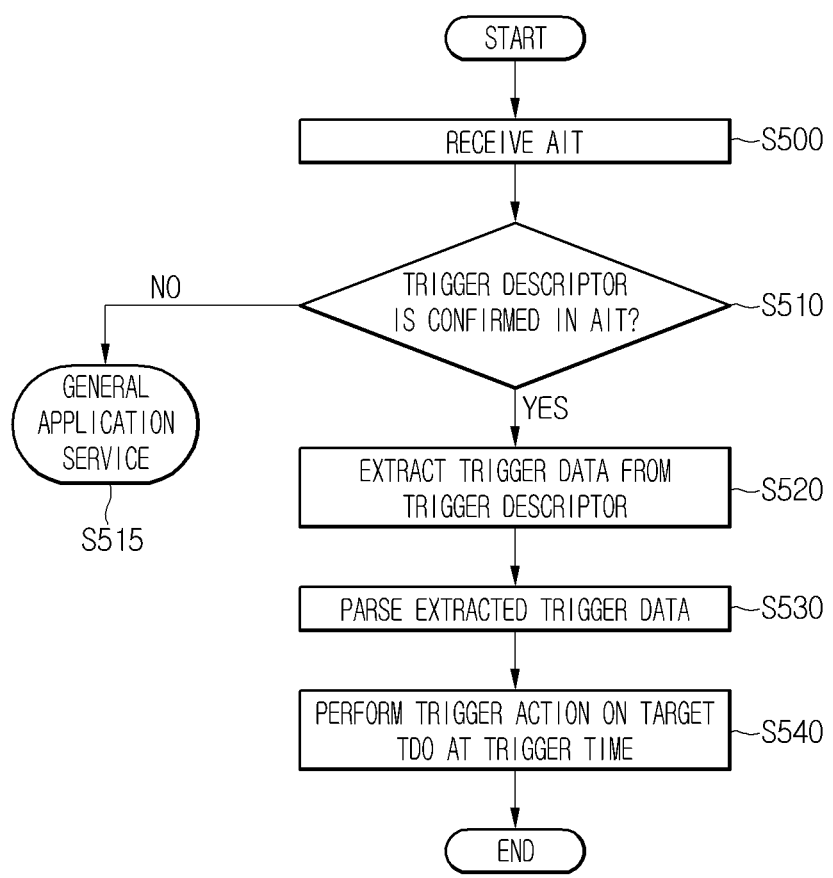
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310 and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350 in operation S530.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 42:
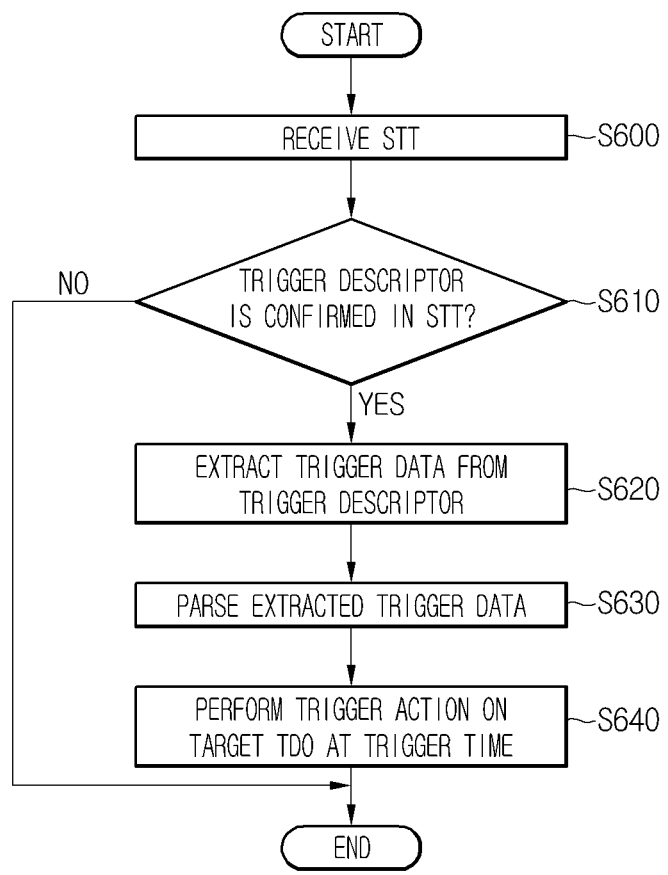
FIG. 42 is a flowchart illustrating an operation of a receiver when a trigger is transmitted using STT according to an embodiment.

FIG. 42 is a flowchart illustrating an operation of a receiver when a trigger is transmitted using STT according to an embodiment.

The trigger signaling data receiving unit 332 receives STT by using the demodulation unit 310 and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350 in operation S630.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

In the following, how to provide information on a non-real-time service will be described in association with a non-real-time service, a real time broadcast, and an internet network according to an embodiment.

As described above, one broadcast program in an actual broadcast system may include at least one application that is linked to the program, and such an application may be stored and executed in a receiver 300 through a method of receiving an NRT service as described above.

However, since a PSIP table does not include information on an NRT service associated with a broadcast program, an NRT-IT in a channel to which a specific broadcast program belongs needs to be entirely parsed so as to receive the NRT service associated with the broadcast program at a receiver 300. In addition, even if the receiver 300 first receives the NRT-IT and then receives a content item of the NRT service, it is difficult to identify an associated broadcast program. Moreover, since the PSIP table does not include information on an internet network, it is difficult for the receiver 300 to recognize a related service transmitted to the internet network on the basis of only a received real time broadcast program. Moreover, for the above reason, it is difficult for the receiver 300 to receive, for a specific real time broadcast program, an extended EPG that is transmitted to the internet network. Thus, an organic link among a real time broadcast program, an NRT service, and an internet network is needed.

In an embodiment, the transmitter 200 may transmit non-real-time service information such as an NRT or a TDO or information for linking to an internet network along with a PSIP table that corresponds to a specific channel or program. Moreover, PSIP table information corresponding to specific real time broadcast channel information or program information may be transmitted along with a non-real-time service.

Thus, the receiver 300 may receive a real time broadcast channel or program, parse a PSIP table, and selectively receive a non-real-time service associated with a specific broadcast program. Moreover, the receiver 300 may receive a real time broadcast channel or program, parse a PSIP table, and receive a non-real-time service associated with a specific broadcast channel or program through an internet network. In addition, the receiver 300 may receive a non-real-time service, obtain PSIP table information on a broadcast program that may be linked to the non-real time service, and provide the obtained PSIP table information to a user.

In an embodiment, a descriptor for providing information associated with a real time broadcast, for example, any one of an NRT service, preview information, extended EPG information, highlight information, and related internet information may be transmitted along with one of PSIP tables. In an embodiment, such a descriptor may be referred to as a link descriptor.

Moreover, in an embodiment, information on a broadcast program that may be linked to a non-real-time service, for example, broadcast channel information or program information may be transmitted along with any one of NRT tables including an SMT or an NRT-IT. In an embodiment, such a descriptor may be referred to as an event descriptor.

FIG. 43 is a diagram illustrating syntax of link_descriptor according to an embodiment, and FIGS. 44 and 45 are diagrams illustrating the content of fields that may be included in the link_descriptor.

As shown in FIG. 43, the link_descriptor according to an embodiment includes a descriptor_tag field, a descriptor_length field, a number_of_links field, and a plurality of link data items. The plurality of link data items includes a link_type field, a link_media field, an MIME type length (mime_type_length) field, an MIME type (mime_type) field, a description_length field, a description field, a link_length field, and a link_byte field.

The descriptor_tag field may be an 8-bit unsigned integer for identifying this descriptor as a link descriptor. For example, this field may have a value of 0xe8.

The descriptor_length field may be an 8-bit unsigned integer that regulates a length of a field immediately following this field to the end of a link descriptor.

The number_of_links field may be an 8-bit unsigned integer that represents the number of the plurality link data items.

The link_type field represents a type of a related service that may be received on the basis of the link_byte field in the link data items. For example, as shown in FIG. 44, the link_type field may represent information on a type of a specific service that may be received on the basis of the link_byte field in the link data items.

For example, a link data item having a link type field of 0X01 may be related to an HTML page of a broadcast program portal. A link data item having a link type field of 0X02 may be related to a thumbnail service of a broadcast program. A link data item having a link type field of 0X03 may be related to a preview clip of a broadcast program. A link data item having a link type field of 0X04 may be related to an extended EPG of a broadcast program. A link data item having a link type field of 0X05 may be related to a highlight service of a broadcast program. A link data item having a link type field of 0X06 may be related to a multiview service of a broadcast program. A link data item having a link type field of 0X07 may be related to a TDO service that may be linked to a broadcast program.

The link_media field may be an 8-bit unsigned integer that represents a transmission medium for receiving a related service on the basis of a link data item. For example, as shown in FIG. 45, when the link_media field is 0x02, it may represent that a related service that may be received on the basis of a link data item may be received through an NRT service. Moreover, when the link_media field is 0X03, it may represent that a related service may be received through an internet service.

The mime_type_length field may be an 8-bit unsigned integer that represents a length of MIME type information representing an MIME protocol type of the link_byte field.

The mime_type field may represent a protocol type of the link_byte field. The MIME type may represent any one of text, multipart, massage, application, image, audio, video types, for example.

The descriptrion_length field may be an 8-bit unsigned integer that represents a length of the description field that represents the detailed information on a corresponding link.

The description field may represent the detailed information on a corresponding link.

The link_length field may be an unsigned integer that represents a length of the link_byte field.

The link_byte field may be a field that represents data for receiving the above-described broadcast program related service. The link_byte field may include identification information on content that may be received through a link medium. For example, as shown in FIG. 45, when the link medium is an NRT service, the link_byte field may include service_id and content_linkage for receiving the NRT service. Moreover, when the link_medium is an internet service, the link_byte field may include uniform resource identifier (RRI) or URL information that is internet address information.

Figure 46:
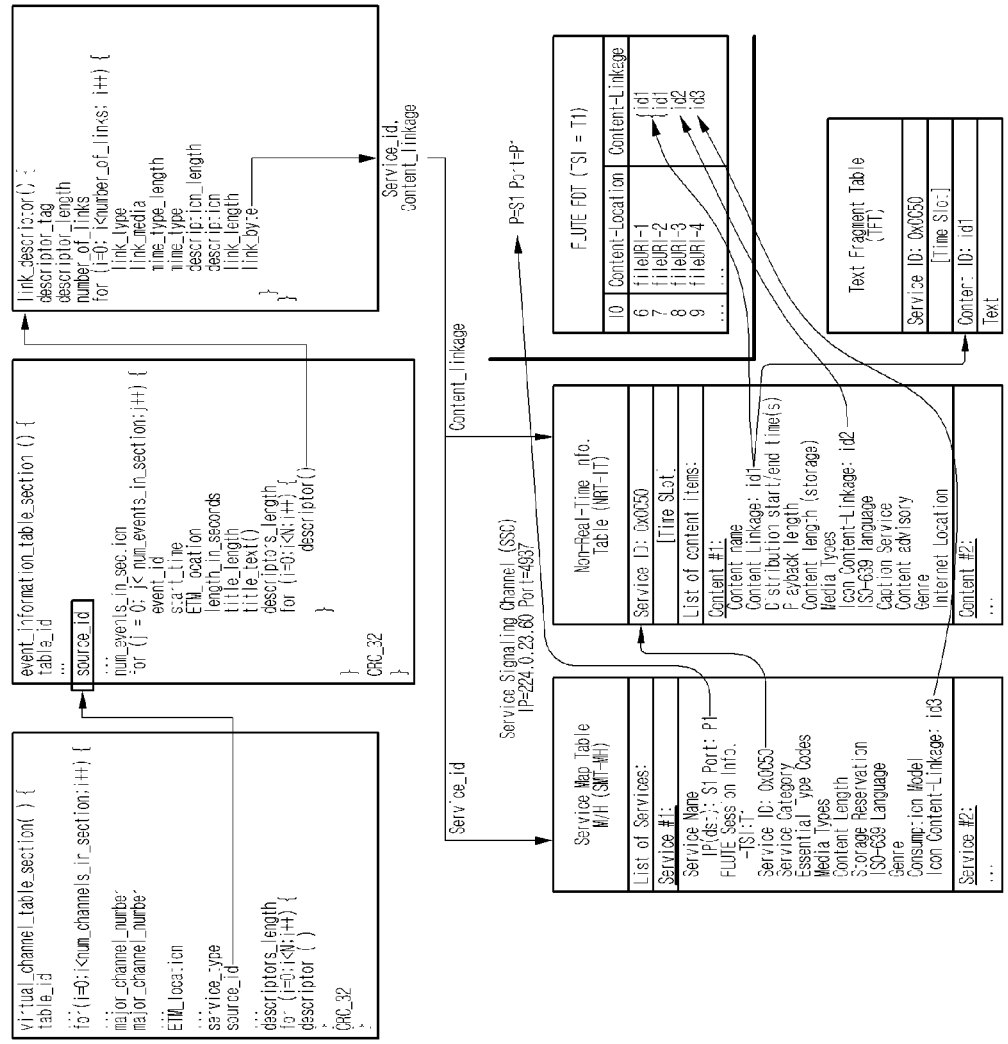

FIGS. 46 and 47 are diagrams illustrating the relation between tables when link_descriptor shown in FIG. 43 belongs to a descriptor of an event information table (EIT) among PSIP tables according to an embodiment.

As shown in FIG. 46, the link_descriptor may be transmitted along with a descriptor loop of the EIT that represents broadcast program information.

The EIT is transmitted along with PSIP along with a virtual channel table (VCT). Since the VCT includes source_id corresponding to selected channel_number, the receiver 300 may parse the EIT including the same source_id as the VCT and obtain information each broadcast program that is provided over a corresponding virtual channel. Each broadcast program may be identified by using event_id.

Thus, the receiver 300 may extract the link_descriptor from a loop that includes the event_id of a specific broadcast program in an event loop from a parsed EIT, and receive information associated with the specific broadcast program through the extracted link_descriptor or through an internet network.

For example, as shown in FIG. 46, the link_descriptor may include content_linkage and service_id of an NRT service associated with a specific broadcast program. In this case, the receiver 300 may recognize content item location information on an associated NRT service through an SMT, an NRT-IT, and an FDT, and download the content item through the recognized location information.

In particular, the receiver 300 may obtain, from an SMT, service signaling channel information corresponding to a service identifier that is included in the link_byte field of the link_descriptor. In this case, the service signaling channel information may include an IP address and a port number. Moreover, the receiver 300 may obtain, from an NRT_IT, a list of content linkages belonging to a service that corresponds to a service identifier in the link_byte field of the link_descriptor. The receiver 300 may recognize an identifier of a content item to be downloaded that corresponds to a service identifier in an NRT-IT through the content_linkage field in the link_byte field of the link_descriptor. In addition, the receiver 300 may recognize the locations of content item files corresponding to the content identifiers in an NRT-IT from a FLUTE FDT that is received through the IP address and port number of an SMT. Thus, the receiver 300 may receive files that configure the content item of an NRT service associated with a corresponding broadcast program through a FLUTE session by using a FLUTE FDT. Moreover, the receiver 300 may extract, from an internet location descriptor to be described that is included in an NRT-IT, URL information on content items associated with a broadcast program, for example, a list of URLs of files, and receive files that configure the content item of an NRT service associated with a broadcast program through a network on the basis of the extracted list.

On the other hand, in addition to NRT service information associated with a broadcast program, the link_descriptor may include at least one of portal HTML page link information associated with a broadcast program, thumbnail reception information, preview clip reception information, extended EPG reception information, highlight reception information, multiview reception information, and linkable TDO reception information. The link_descriptor may include information for receiving such reception information through an NRT service or an internet network.

Moreover, as shown in FIG. 47, the link_byte field of the link data item in the link_descriptor may include URL through which a service associated with a specific broadcast program may be received. In this case, the receiver 300 may access an internet site according to URL in the link_byte field, and receive a service related to a broadcast program through an internet network. A broadcast program related service that is received through an internet network may include at least one of NRT, thumbnail, preview clip, extended EPG, highlight, multiview, and TDO services.

In particular, receiver 300 may obtain an EIT corresponding to a selected virtual channel, obtain a link descriptor from a descriptor loop in an event loop (in a 'for' phrase to which event_id belongs) that corresponds to a selected broadcast program among obtained EITs, extract an internet address from the obtained link descriptor, access an internet network according to the extracted internet address, and receive a service associated with the selected broadcast program. Thus, a broadcast service provider may provide a service associated with a specific broadcast program through a real time broadcast. Moreover, the receiver 300 may access an internet network by using URL, and receive from the internet network a service associated with a corresponding broadcast program.

FIG. 48 is a diagram showing syntax of Event_descriptor and the content of fields capable of being included in Event_descriptor according to an embodiment.

As shown in FIG. 48, the event descriptor according to an embodiment includes a descriptor_tag field, a descriptor_length field and an event text message identifier (ETM_id) field.

The descriptor_tag field may be an 8-bit unsigned integer for identifying this descriptor as a link descriptor. For example, this field may have a value of 0xe8.

The descriptor_length field may be an 8-bit unsigned integer that regulates a length of a field immediately following this field to the end of the link descriptor.

The ETM_id field may be a 32-bit variable that represents broadcast channel information or broadcast program information associated with an NRT service in which an event descriptor is included. The transmitter 200 may insert specific channel and program information in an event descriptor by using the ETM_id field, and transmit the event descriptor along with an NRT table that signals an NRT service. Moreover, the ETM_id field corresponds to ETM_id in an extended text table (ETT) that provides additional information on a broadcast program, and may thus be used for providing additional information on the broadcast program.

In particular, as shown in FIG. 48, when the ETM_id field includes broadcast channel information, it may be identified by using Channel ETM_id. In this case, the first 16 bits from the most significant bit (MSB) may correspond to the source_id of a corresponding virtual channel for identifying a broadcast channel and the remaining bits may all be 0. Thus, the receiver 300 may match the source_id with the VCT of PSIP to be able to identify a link channel of an NRT service in which this event descriptor is included.

Moreover, when the ETM_id field includes both broadcast program information and broadcast channel information, least signification bit (LSB) may consist of 1 0, the first 16 bits from the MSB may correspond to the source_id of corresponding channels, and the following 14 bits may correspond to the event_id of corresponding programs. Thus, the receiver 300 may identify a link channel of an NRT service in which this event descriptor is include, and match the event_id with the EIT of PSIP to be able to identify a broadcast program linked with the NRT service.

Figure 49:
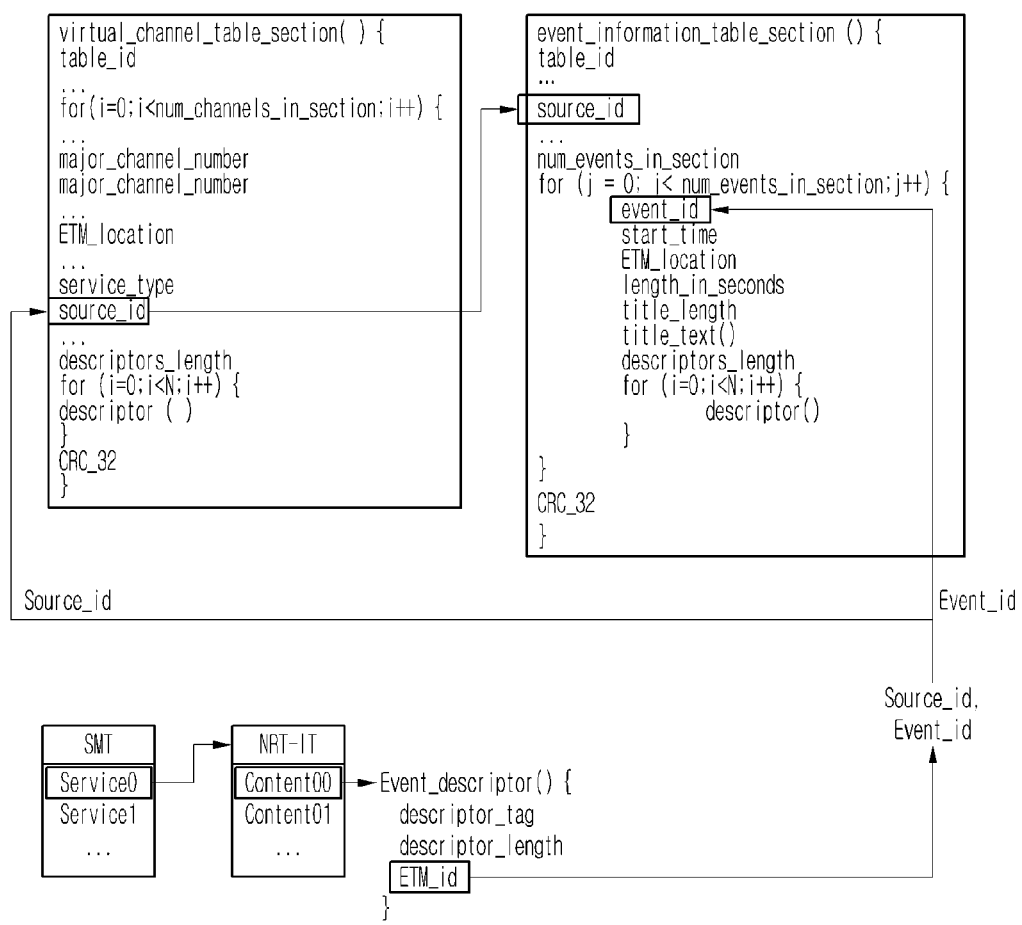
FIG. 49 is a diagram for explaining how to identifying a link program through Event_descriptor according to an embodiment.

FIG. 49 is a diagram for explaining how to identifying a link program through Event_descriptor according to an embodiment.

For example, as shown in FIG. 49, the service manager 350 of the receiver 300 may identify Service_id through an SMT, receive and parse a content item of an NRT service corresponding to the identified Service_id through an NRT-IT.

In addition, if the service manager 350 of the receiver 300 discovers the above-described Event_descriptor in a specific part of the parsed NRT-IT, for example, in a content loop, it may obtain ETM_id from the discovered Event_descriptor, the ETM_id including broadcast program information associated with an NRT service.

In an embodiment, the service manager 350 of the receiver 300 may obtain, from the ETM_id, the source_id of a channel in which a broadcast program is included, and the event_id of the broadcast program. The receiver 300 may match the first 16 bits of the EMT_id with the source_id as described above, and then match the following 14 bits with the event_id to obtain the source_id and the event_id.

In addition, the service manager 350 of the receiver 300 may identify, from a VCT, a virtual channel of which source_id matches, and identify, from an EIT in the virtual channel, an event loop of a broadcast program of which event_id matches. The service manager 350 of the receiver 300 may receive broadcast program information associated with an NRT service from the identified event loop, and provide the broadcast program information to a user. The broadcast program information may include at least one of the start time, ETT location, running time, title information, and description information of a corresponding broadcast program in the event loop of an EIT, for example. Thus, the service manager 350 of the receiver 300 may provide, to a user, information on a broadcast program associated with a received NRT service on the basis of the received broadcast program information.

Figure 50:
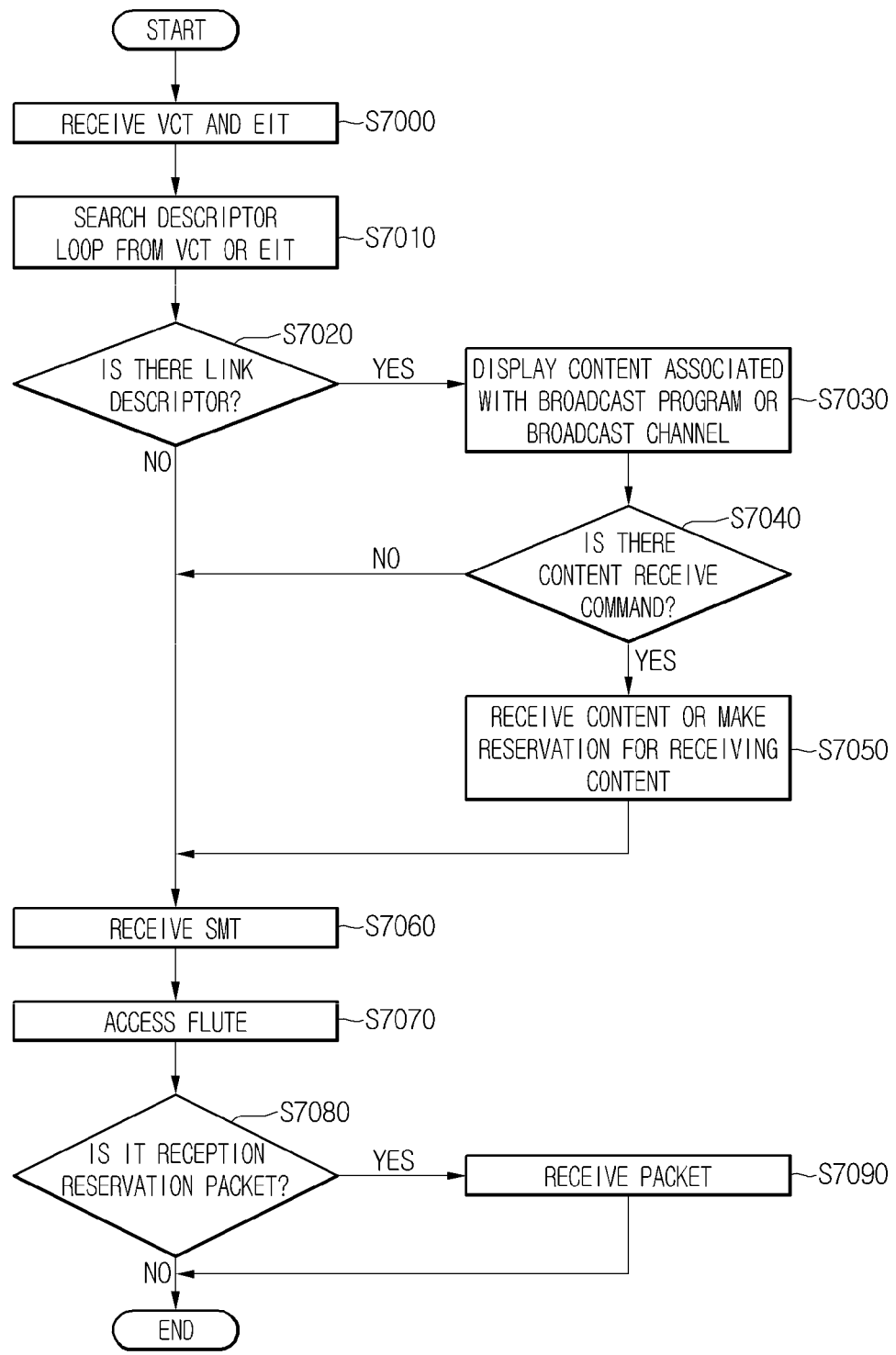
FIG. 50 is a flowchart illustrating the process of receiving, by a receiver 300, content associated with a broadcast program or a broadcast channel by using link_descriptor according to an embodiment.

FIG. 50 is a flowchart illustrating the process of receiving, by a receiver 300, content associated with a broadcast program or a broadcast channel by using link_descriptor according to an embodiment.

Referring to FIG. 50, if the power of the receiver 300 is on, a VCT or an EIT is received by receiving a PSIP table through a PSIP/PSI handler or a service manager in step S7000. The PSIP/PSI handler or the service manager 350 may parse each of PSIP tables and obtain the VCT or EIT from the parsed tables.

In addition, the service manager 350 of the receiver 300 searches a descriptor loop from the received VCT or EIT in step S7010. Subsequently, the service manager 350 of the receiver 300 determines through the search whether there is a link descriptor, in step S7020. After the service manager

350 of the receiver 300 searches descriptors in the descriptor loop, it may determine that there is a link descriptor if a value of a descriptor_tag field is the same as a preset value of a descriptor_tag field of a link descriptor.

In addition, if it is determined that there is a link descriptor, the service manager 350 of the receiver 300 extracts link information from the link descriptor, and displays, on the basis of the extracted link information, a list of content items associated with a broadcast program or a broadcast channel in which the link descriptor is included, in step S7030. The link information may include at least one of the link_type, the link_media, the mime_type, the description and the link_byte fields that are included in the link descriptor. The service manager 350 of the receiver 300 may create a list of content items associated with a specific broadcast channel or broadcast program on the basis of the extracted link information, for example, at least one of an internet site address, thumbnail, a preview clip, extended EPG information, highlight information, multiview information, and TDO information, and may display the list to a user. Thus, the user may select content which he/she desires to receive from the displayed content item list associated with a broadcast channel or broadcast program.

Subsequently, the service manager 350 of the receiver 300 determines whether content is selected and there is a receive command, in step S7040. The content may be selected by the user or by a preset process. The selected content may be any one of the content items displayed in the list of content items associated with the broadcast channel or broadcast program as described above. Moreover, the user may input a receive command on the selected content as well as a receive command on the selected content may be performed by a preset process.

Subsequently, if the receive command on the selected content is input, the service manager 350 of the receiver 300 immediately receive corresponding content or performs reception reservation, in step S7050. The reception reservation may be performed when an SMT is not received and thus it is difficult to receive an NRT service, when a setting is made so that a user receives after a certain time, or when an NRT service to be received is a TDO service that is real-time associated with a broadcast program, for example.

On the other hand, when link information on the content on which the receive command is executed includes a site address accessible through the internet, the service manager 350 may access a corresponding site and display a homepage that is associated with a broadcast channel or program. Moreover, when the content on which the receive command will be executed is any one of thumbnail, preview clip, extended EPG information, and multiview information, the service manager 350 of the receiver 300 may download and display it through the internet or another path.

In addition, if the content on which reception reservation has been made (hereinafter, referred to as reception reservation content) is an NRT service, the service manager 350 of the receiver 300 receives an SMT so as to identify a corresponding NRT service, in step S7060. In addition, the service manager 350 of the receiver 300 accesses a FLUTE session in the above-described way in step S7070, and identifies a packet for the receive reserved content, among packets in a content item file that configures an NRT service, in step S7080. In addition, the service manager 350 of the receiver 300 receives packets for the identified receive reserved content through FLUTE or an internet network in step S7090.

In particular, since link information extracted from a link descriptor may include the service_id and content_linkage information of an NRT service, the service manager 350 of the receiver 300 may identify and receive the receive reserved content such as a packetized content item of a reserved NRT service from a FLUTE session on the basis of the service_id and content_linkage information. The service manager 350 of the receiver 300 may extract, for example, NRT service identification information from a link byte in a link descriptor as shown in FIG. 46, and receive an NRT service linked with a corresponding program through an NRT-IT and FLUTE. Thus, the service manager 350 of the receiver 300 may provide information on content associated with a broadcast channel or broadcast program to be broadcast at present or in the future through a VCT or an EIT. Moreover, the service manager 350 of the receiver 300 may receive selected content immediately through an internet network or an NRT service or receive the reception reservation content after a certain time. For example, the receiver 300 may obtain URL information on content items on the basis of an NRT-IT as described above, and receive, through an internet network on the basis of the obtained URL information, files that configure the content item of a selected NRT service.

Figure 51:
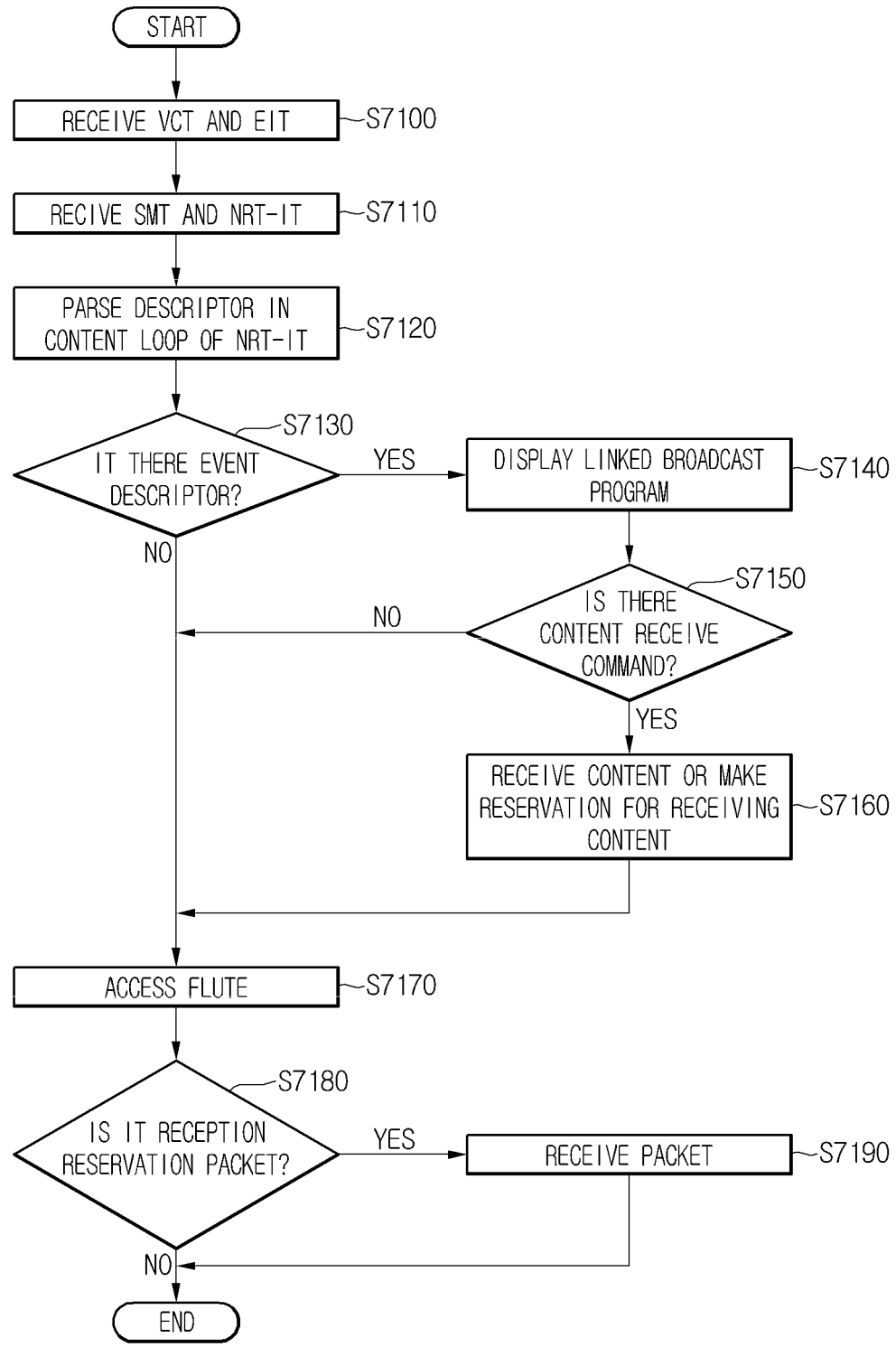
FIG. 51 is a flowchart illustrating the process of providing, by a receiver 300, content linked with a broadcast program by using Event_descriptor according to an embodiment.

FIG. 51 is a flowchart illustrating the process of providing, by a receiver 300, content linked with a broadcast program by using Event_descriptor according to an embodiment.

In an embodiment of FIG. 51, the transmitter 200 may insert broadcast program information linked to an NRT service into an event descriptor, insert the event descriptor into a content loop of an NRT-IT, and transmit the event descriptor to the receiver 300 through a broadcast channel or an NRT service signaling channel.

If an NRT-IT including an event descriptor is transmitted in this way, the PSIP/PSI handler or service manager 350 of the receiver 300 parses a PSIP table and obtains a VCT and an EIT, in step S7100. The receiver 300 may provide information on a selected broadcast channel and a selected broadcast program to a user through the VCT and the EIT.

In addition, the service manager 350 of the receiver 300 determines whether an NRT service is transmitted through an NRT service signaling channel or an internet network, and receives an SMT and an NRT-IT if the NRT service is transmitted, in step S7120.

Subsequently, the service manager 350 of the receiver 300 searches a content loop of an NRT-IT, parses the descriptor_tag of each descriptor, and identifies descriptors in the content loop, in step S7120. In addition, the service manager 350 of the receiver 300 determines whether there is an event descriptor among the parsed descriptors, in step S7130.

If there is an event descriptor, the service manager 350 of the receiver 300 may display broadcast channel information or broadcast program information (for example, a broadcast channel number based on source_id, EPG information on a broadcast program based on event_id, etc.) in the event descriptor in step S7140 and represent that it is linked to a receivable NRT service.

Subsequently, the service manager 350 of the receiver 300 determines whether the content of an NRT service linked to a broadcast program is selected and there is a receive command, in step S7150. Content may be selected by a user or may be selected by a preset process. For example, if a user selects a broadcast program which he/she desires to view, a content receive command on an NRT service linked to the broadcast program may be provided. Moreover, if a user selects an NRT service which he/she desires to receive, a content receive command may be provided.

In addition, if the receive command on the selected content is provided, the service manager 350 of the receiver 300 immediately receives the selected content or performs reception reservation according to a setting, in step S7160. According to an embodiment, the selected content may be an NRT service. Thus, the service manager 350 of the receiver 300 accesses a FLUTE session or an internet network on the basis of a received SMT and a received NRT-IT so as to receive selected content such as an NRT service, in step S7170. For example, the receiver 300 may obtain URL information on content items on the basis of an NRT-IT and check packets in a selected content item file.

In addition, the service manager 350 of the receiver 300 identifies a packet for receive reserved content among packets in a content item file configuring an NRT service as shown in FIG. 50, in step S7180. In addition, the service manager 350 of the receiver 300 receives packets for the identified receive reserved content through FLUTE or an internet network, in step S7190.

The transmitter 200 may insert an event descriptor into a content loop of an NRT-IT in this way, and transmit information on a broadcast program linked to an NRT service along with the event descriptor. Moreover, the service manager 350 of the receiver 300 may provide, to a user, information on a broadcast channel or a broadcast program associated with the NRT service being currently transmitted on the basis of an event descriptor of an NRT-IT.

On the other hand, an NRT service such as a TDO may be signaled through an SMT and an NRT-IT as described above. In particular, when a service_category field of an SMT has a specific value such as 0x0E, it may represent that a service signaled through an SMT is an NRT service. Moreover, an SMT may include a service level descriptor for representing an attribute of a transmitted NRT service. The service level descriptor in the SMT may be in plural, and for example, may be at least one of a Protocol Version Descriptor, an NRT Service Descriptor, a Capabilities Descriptor, an Icon Descriptor, an ISO-639 Language Descriptor, a Receiver Targeting Descriptor, a Genre Descriptor, and an ATSC Private information Descriptor. By using such a service level descriptor, the transmitter 200 may transmit information on an NRT service and the receiver 300 may operate according to received NRT service information. However, the service level descriptor being currently used may not include information specific to a TDO proposed in embodiments. Thus, a service level descriptor for delivering information on the TDO is needed.

FIG. 52 is a diagram for explaining syntax of NRT_service_descriptor that is a service level descriptor.

As shown in FIG. 52, an NRT service descriptor among service level descriptors may include information on a transmitted NRT service. Information on the NRT service may include auto update, a length of content, storage reservation information or consumption_model information.

In particular, a consumption_model field indicated by a box may include information on a method of providing a transmitted NRT service. Thus, the service manager 350 of the receiver 300 may determine a proper processing method according to each NRT service on the basis of the consumption_model field, and provide an NRT service according to the determined method.

In an embodiment, the transmitter 200 may preset a method of providing an NRT service applicable to a TDO and assign a specific value to a consumption model field to correspond to the TDO. Thus, the transmitter 200 may assign and transmit a value corresponding to the TDO to the above-described consumption model field.

In addition, the service manager 350 of the receiver 300 may receive a consumption model field, then determine whether the TDO is transited, receive the TDO according to a present service providing method and then provide a TDO service.

Thus, in an embodiment, if a consumption model field represents a value corresponding to a TDO, such as 0x04, the service manager 350 of the receiver 300 may determine that an NRT service is a TDO service, and operate according to a corresponding service providing method. A TDO consumption model dependent service providing method will be described below.

FIG. 53 illustrates the meaning of each value of a consumption_model field that is included in NRT_service_descriptor according to an embodiment.

The consumption_model field is included in an NRT_service_descriptor as described above, and is a field representing what consumption model an NRT service represented by an NRT service descriptor uses. The NRT service may be provided according to a consumption model related to any one of a browse & download service, a portal service, and a push service. Moreover, the NRT service may also be provided according to a TDO consumption model according to an embodiment. Thus, the meaning of a value of the consumption_model field proposed in embodiments and the operation of the receiver will be described below.

Firstly, when a value of a consumption_model field is 0x00, it may represent that an NRT service is forbidden.

In addition, when a value of the consumption_model field is 0x01, it may represent that a corresponding NRT service is provided by a Browse & Download method. In this case, the service manager 350 of the receiver 300 may browse a corresponding NRT service and if content is selected, the service manager 350 of the receiver 300 may download the selected content.

If a value of the consumption_model field is 0x02, it may represent that a corresponding NRT service is provided by a Portal method. In this case, the corresponding NRT service may be provided by a method similar to accessing a web browser. Thus, files transmitted/received through a FLUTE session associated with the corresponding NRT service may include text files or graphic rendering files.

If a value of the consumption_model field is 0x03, it may represent that a corresponding NRT service is provided by a Push method. In this case, the corresponding NRT service may provide content in response to a request of a user or the receiver 300. Moreover, the service manager 350 of the receiver 300 may allow a user to select auto update on content associated with the corresponding NRT service. If the user selects the auto update, the service manager 350 of the receiver 300 may store the content associated with the corresponding service in cache and allow files to be automatically updated to a new version. In addition, if the user returns to the requested Push service, the service manager 350 of the receiver 300 may display preloaded content.

On the other hand, if a value of the consumption_model field is 0x04, it may represent that a corresponding NRT service is provided according to a TDO consumption model. In this case, the service manager 350 of the receiver 300 may determine on the basis of the consumption_model field whether an NRT service such as a TDO is transmitted, and perform an operation in association with a real time broadcast.

In particular, if the consumption_model field is a TDO consumption model, the service manager 350 of the receiver 300 may receive a corresponding NRT service (TDO) and obtain real time broadcast channel or program information associated with the NRT service by using at least one of a link descriptor and an event descriptor as described above. Moreover, the service manager 350 of the receiver 300 may receive a trigger included in a real time broadcast and operate a TDO at a specific timing, or previously download a content item.

Moreover, in the case of the TDO consumption model, each content item may be immediately downloaded if being represented in the currently selected NRT service. When an update version of each content item is represented in the currently selected NRT service, each content item may be immediately updated. In addition, each content item may be executed or terminated by a trigger.

FIG. 54 is a flowchart illustrating the operation of a receiver 300 when a TDO is transmitted by using a TDO consumption model according to an embodiment.

Firstly, the receiver 300 receives an SMT in step S8000 and parses a service level descriptor in the SMT in step S8010. The receiver 300 may receive the SMT through a service signaling channel by using the service manager 350 and parse service level descriptors including an NRT service descriptor in a service level descriptor loop in each NRT service loop from the received SMT.

In addition, the receiver 300 checks NRT_service_descriptor of a parsed each service level descriptor, and determines whether a value of the consumption_model field of the NRT_service_descriptor is 0x04 that is corresponds to a TDO consumption model, in step S8030. If the value is not 0x04, the receiver 300 performs an operation according to another NRT service consumption model.

However, if the value is 0x04, the receiver 300 may determine that the NRT service designated as the TDO consumption model is transmitted. In this case, the receiver 300 determines whether TDO auto reception is set, in step S8040. If auto reception is not set, the receiver 300 displays a TDO service and a list of content items in the TDO service, and also displays a screen for selecting TDO reception, in step S8405. In the receiver 300 receives a TDO service selected according to user selection in step S8047.

On the other hand, if auto reception is set, the receiver 300 receives a TDO without user selection in step S8050. Here, the receiver 300 may receive the TDO at a specific timing regardless of user selection. For example, while the receiver 300 does not display a user that the TDO is being received, the receiver 300 may automatically receive and store the TDO through the background without user selection. The reason is that whether to execute the TDO may be determined by user input but the receiver 300 may previously receive it before triggering the TDO. Moreover, the receiver 300 performs the reception of the TDO without user selection and thus may naturally operate in association with a real time broadcast when executing the TDO.

In addition, the receiver 300 receives the TDO and then determines whether a trigger is received, in step S8060. The receiver 300 may determine whether the trigger corresponding to the TDO that is prepared through the trigger receiving unit 331 is received. In addition, if the trigger is received, the receiver 300 extracts a trigger time and a trigger action from the trigger through the service manager 350, and applies the trigger action to the prepared TDO at the trigger time, in step S8070. For example, a trigger target TDO may be transited from any one of a non-ready state, a released state, a ready state, an active state, and a suspended state to another. Thus, the receiver 300 may perform a transition operation according to the state of the TDO at the trigger time on the basis of the trigger action. As described above, since the TDO is automatically received without user selection and the trigger action may be performed at the trigger time, the receiver 300 may receive the TDO before the trigger time and allow the TDO to be previously executed and prepared on the background before the trigger time.

On the other hand, the receiver 300 may store and manage an NRT service selected by a user through the service manager 350 in a storage unit. However, since a TDO service is linked to a real time broadcast and is operated by a trigger, the storage and management of the TDO service needs to follow real time broadcast service provider's intention.

Thus, in the case of a TDO consumption model according to an embodiment in which a TDO service is transmitted, the receiver 300 may assign a certain area of its storage unit as a TDO storage area, receive, store and manage a TDO service in the assigned area. Moreover, the TOD storage area may be designated by the transmitter 200 and transmitted to the receiver 300. In this case, the receiver 300 may receive, store and manage the TDO service in the designated area.

Figure 55:
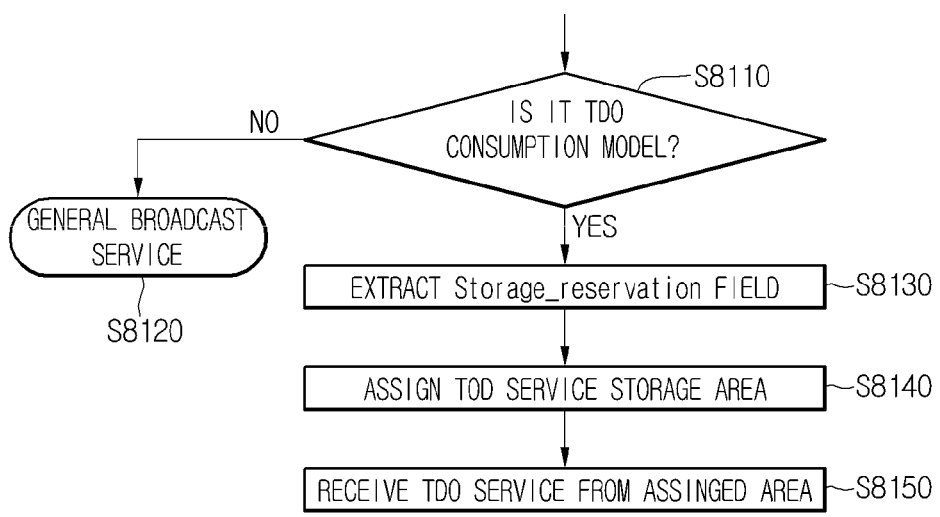
FIG. 55 is a flowchart illustrating how to assign and manage a TDO storage area according to a TDO consumption model in an embodiment.

FIG. 55 is a flowchart illustrating how the receiver 300 assigns and manages a TDO storage area according to a TDO consumption model.

Referring to FIG. 55, the receiver 300 firstly performs steps S8000 to S8020 of FIG. 54 and determines a consumption model of a transmitted NRT service. In addition, the receiver 300 determines on the basis of a consumption model field whether an NRT service of a TDO consumption model type such as a TDO service is transmitted, in step S8110.

If the consumption model field represents the TDO consumption model, the receiver 300 extracts a storage_reservation field of NRT_service_descriptor in step S8130. The storage_reservation field may be a value that corresponds to a storage space necessarily required for a corresponding TDO service. The transmitter 200 may designate and transmit a space value for the TDO storage area to the storage_reservation field.

In addition, the receiver 300 assigns, to a storage unit, a storage area for TDO service reception and operation on the basis of a value of the storage_reservation field in step S8140. The receiver 300 may assign an area designated in the storage_reservation field or a preset TDO service receiving area to a storage area for a TDO service, and manage it separately from other areas of a storage unit. Moreover, the receiver 300 may continue to maintain a storage-space size of an assigned area. Thus, a broadcast service provider may continue to provide an extended NRT service such as a TDO.

Subsequently, the receiver 300 receives, stores, and manages a TDO service in an area assigned as a TDO service storage area, in step S8150.

As such, the receiver 300 may assign and manage a storage area for a TDO service on the basis of a consumption model field and a storage reservation field of an NRT service. However, the above-described method is an embodiment and is not limited to storage based on each value of the consumption model field and the storage reservation field. Thus, the receiver 300 may determine on the basis of a consumption model field value and a storage reservation field value whether to store a TDO service, or determine on the basis of the current storage reservation field value and the remaining space size of a storage unit whether to receive the TDO service. In addition, if receiving a plurality of TDOs, the receiver 300 may designate and manage a certain area of the storage unit according to each TDO, or assign a general area for the TDO service to the storage unit and receive the plurality of TDOs.

On the other hand, a TDO may mean an NRT service that provides a trigger declarative object, and mean content items that configure a TDO service. Each content item is signaled through an NRT-IT, and the receiver 300 may receive data signaled through the NRT-IT and grasp information on a TDO. However, the NRT-IT does not include information for a TDO, such as a trigger time, an end time, a priority and a additional data receiving path, except for information that is provided for a general NRT service. Thus, the receiver 300 has a difficulty in grasping attributes of the TDO in detail and operating it smoothly. In particular, when the receiver 300 manages a storage space, manages TDO services in a case where a plurality of TDOs are provided, or manages additional data for a TDO service, there is a lack of information on a TDO.

Thus, an embodiment proposes a method of transmitting such particular characteristic information of a TDO along with TDO metadata and the corresponding operation of the receiver 300.

FIG. 56 is a diagram showing a TDO metadata descriptor according to an embodiment.

Referring to FIG. 56, TDO metadata includes a descriptor_tag field, a descriptor_length field, a scheduled_activation_start_time field, a scheduled_activation_end_time field, a priority field, an activation_repeat_flag field, and a repeat_interval field.

The descriptor_tag field may have a value for identifying this descriptor as a TDO metadata descriptor.

The descriptor_length field may be an 8-bit unsigned integer that regulates a length of a field immediately following this field to the end of the TDO metadata descriptor.

The scheduled_activation_start_time field may be a 32-bit unsigned integer that represents the fastest scheduled_activation_start_time calculated in GPS seconds from 00:00:00 UTC time, Jan. 6, 1980. When a value of the scheduled_activation_start_time field is 0, it may represent that an activation start time of a TDO already has passed.

The scheduled_activation_end_time may be a 32-bit unsigned integer that represents the fastest scheduled_activation_end_time calculated in GPS seconds from 00:00:00 UTC time, Jan. 6, 1980. When a value of the scheduled_activation_end_time field is 0, it may represent that an end time of a TDO is not designated. Thus, if the scheduled_activation_end_time field is 0, the receiver 300 may continue to provide a service since the scheduled_activation_start_time.

The scheduled_activation_start_time field and the scheduled_activation_end_time field may be used so that the receiver 300 operates a TDO in accurate synchronization with a real time broadcast. Moreover, the receiver 300 may selectively download a TDO on the basis of the scheduled_activation_start_time field and the scheduled_activation_end_time field and determines the downloading order of the TDO. Moreover, the receiver 300 may determine the deleting order of the TDO on the basis of the scheduled_activation_start_time field and the scheduled_activation_end_time field. In particular, the receiver 300 may identify a TDO (which is first activated) of which the scheduled_activation_start_time field value is closest to the current time, preferentially download and store the identified TDO. Moreover, in the case of a lack of a storage space, the receiver 300 may preferentially delete a TOD of which the scheduled_activation_start_time field value is farthest to the current time.

On the other hand, the priority field may be an 8-bit unsigned integer that represents a priority of a TDO service or a content item. The receiver 300 may determine that the service or item has a higher priority as a value of the priority field is higher or lower. Moreover, the receiver 300 may sequentially receive or store a plurality of TDOs on the basis of the priority field assigned to each TDO. Moreover, the receiver 300 may execute at least one the plurality of TDOs on the basis of the priority field assigned to each TDO.

In addition, since a target TDO that is performed by a trigger at a trigger time may be one but TDO that may be performed at a timing point may be plural, designating a priority for each of TDOs is needed. Thus, the transmitter 200 may designate the priority of each of TDOs by using the above-described priority field if TDO (service or content item) is plural.

Moreover, the receiver 300 may sequentially download TDOs on the basis of the priority field. Moreover, the receiver 300 may display, on the basis of the above-described priority field, a plurality of TDOs that may be performed at a specific timing point. For example, the receiver 300 may display the plurality of TDOs that may be performed at a specific timing point, and in particular, place a TDO having a higher priority in the upper part in a list for display. Thus, a user may grasp priority information through the displayed list and it is possible to efficiently select a TDO according to priority information.

In addition, the receiver 300 may automatically execute a TDO on the basis of such a priority field. For example, if there is a plurality of TDOs to be executed within a specific time range, the receiver 300 may select and automatically execute a TDO having a higher or lower priority field on the basis of a priority field corresponding to each TDO.

The activation_repeat_flag field may be a 1-bit Boolean flag that represents whether a repeat_interval field is included in this descriptor.

The repeat_interval field may be an 8-bit unsigned integer that represents a repeat_interval of scheduled activation times. The repeat_interval field may represent an execution period of a TDO. Thus, the receiver 300 may receive the TDO or manage a storage unit on the basis of the repeat_interval field. The repeat_interval field may mean an execution period of a TDO according to each value as represented in Table 4, for example.

TABLE 4

| VALUE | MEANING |
| --- | --- |
| 0 | Reserved |
| 1 | Daily |
| 2 | Four to six times per one week |
| 3 | Two to three times per one week |
| 4 | Weekly |
| 5 | Once per two week |
| 6 | Monthly |
| 7 | Once per two months |
| 8 | Once per a quarter |
| 9 | Once per six months |
| 10 | Yearly |
| 11-255 | Reserved |

As such, the transmitter 200 may transmit a TDO metadata descriptor through an NRT service signaling channel or an internet network. Moreover, the transmitter 200 may also insert the TDO metadata descriptor into a content_level_descriptor loop in an NRT-IT and then transmit additional information on a corresponding TDO.

On the other hand, the receiver 300 may receive TDO metadata through the NRT service signaling channel or the internet network and thus obtain information on a TDO. The receiver 300 may receive the NRT-IT, search a content level descriptor loop in the NRT-IT, and obtain TDO metadata.

Moreover, if the TDO metadata is transmitted through the internet network, the receiver 300 may access a FLUTE session for receiving a corresponding TDO service, receive an FDT, and receive TDO metadata from the internet network through the URL information of a content location field for each file on the FDT.

Figure 57:
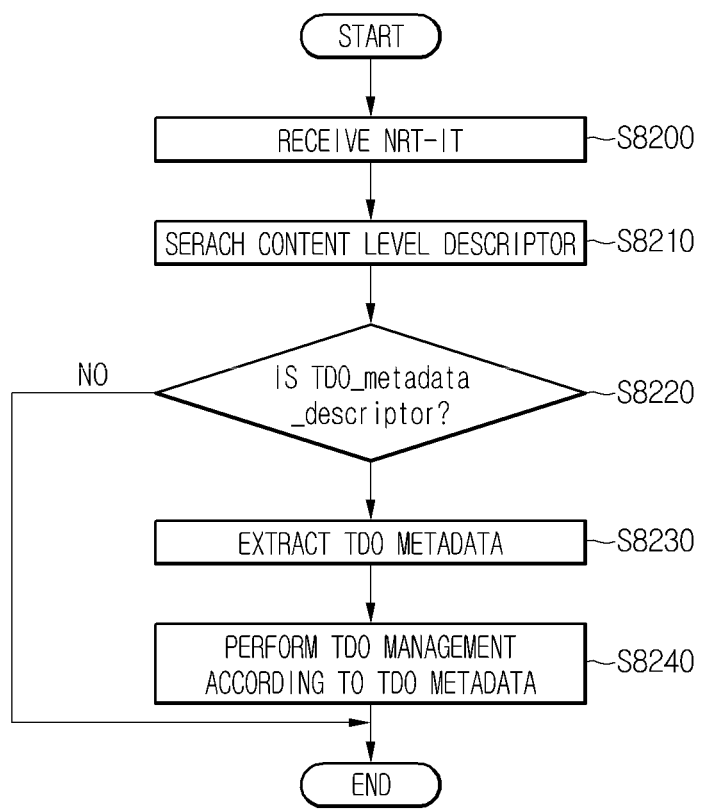
FIG. 57 is a flowchart illustrating the process of receiving, by a receiver 300, TDO metadata according to an embodiment.

FIG. 57 is a flowchart illustrating the process of receiving, by a receiver 300, TDO metadata according to an embodiment.

Referring to FIG. 57, the receiver 300 receives an SMT and an NRT-IT that are transmitted through a service signaling channel, in operation S8200.

In an embodiment, the transmitter 200 may transmit a TDO metadata descriptor along with a content level descriptor loop in the NRT-IT. Thus, the receiver 300 searches the received content level descriptor loop in the NRT-IT in operation S8210, and determines whether there is a TDO metadata descriptor, in operation S8220. The receiver 300 determines whether a value of a descriptor tag field of each descriptor corresponds to TDO_metadata_descriptor and thus it is possible to determine whether there is a TDO metadata descriptor.

In addition, if there is a TDO metadata descriptor, the receiver 300 extracts TDO metadata from the TDO metadata descriptor in operation S8230. As described above, TDO metadata may include at least one of scheduled activation start or end time information, priority information, related data receiving information, and repeat interval information. Moreover, the related data receiving information may include additional data for a corresponding TDO or receiving path information on the additional data.

Subsequently, the receiver 300 obtains necessary information from the extracted TDO metadata, and manages a TDO on the basis of the obtained information, in operation S8240. The receiver 300 may manage the TDO by receiving, storing or deleting the TDO according to a certain condition on the basis of TDO metadata. Moreover, the receiver 300 may receive related data that a service provider further provides for a corresponding TDO on the basis of TDO metadata. For example, while a TDO is performed, the receiver 300 may extract related data receiving information from the TDO metadata, receive additional action information on the TDO in operation through a broadcast channel or an internet network on the basis of the related data receiving information, and apply the received additional action to the TDO in operation.

Figure 58:
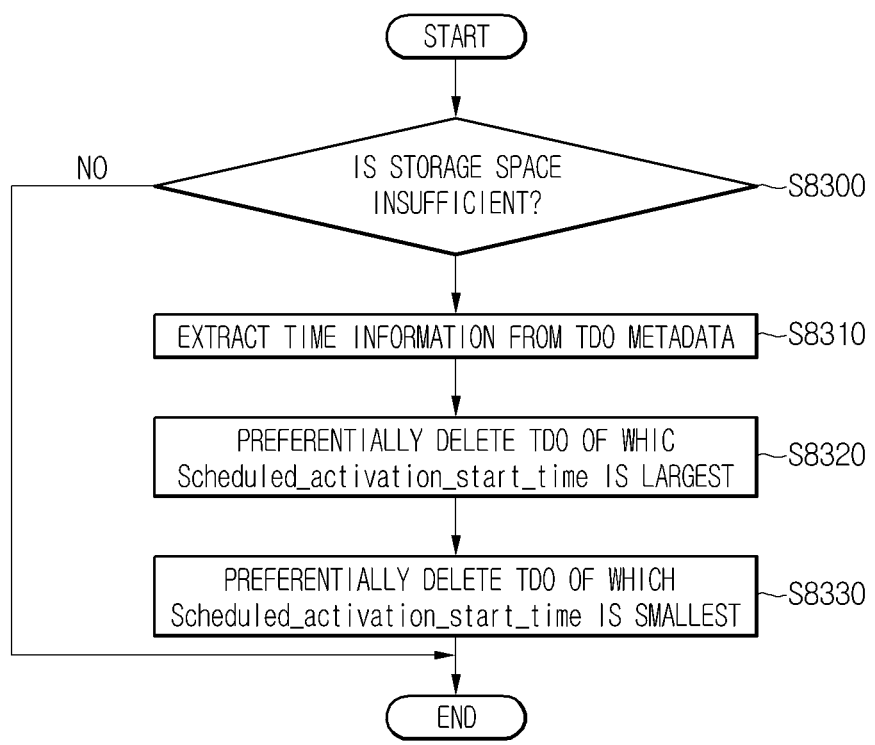
FIG. 58 is a flowchart illustrating how a receiver 300 manages a TDO according to time information in TDO metadata according to an embodiment.

FIG. 58 is a flowchart illustrating how a receiver 300 manages a TDO according to time information in TDO metadata according to an embodiment.

Referring to FIG. 58, the receiver 300 firstly determines whether there is a lack of a storage space for a TDO in a storage unit, in operation S8300. The storage space may be a certain area of the storage unit for storing the TDO as described above. Moreover, the receiver 300 may determine a storage space required for receiving the TDO on the basis of an NRT service descriptor before receiving the TDO, compare the required space with the remaining space in the current storage unit and determine whether there is a lack of a storage space.

In addition, it is determined that there is a lack of a storage space, the receiver 300 extracts time information from TDO metadata from each TDO, in operation S8310. The time information may include the scheduled activation start or end time field of a TDO metadata descriptor. Moreover, the receiver 300 may obtain TDO metadata for each TDO from a content level descriptor loop in an NRT-IT as described above, and extract time information from the obtained TDO metadata.

Subsequently, the receiver 300 preferentially deletes a TDO of which the scheduled activation start time field value is largest, on the basis of a scheduled activation start time for each TDO, in operation S8320. As the scheduled activation start time has a larger value, the current necessity may decrease. Thus, the receiver 300 may preferentially delete a TDO to be executed after a time farthest from the current time, and thus obtain a storage space.

In addition, the receiver 300 preferentially receives a TDO of which the scheduled activation start time field value is smallest, on the basis of the scheduled activation start time for each TDO, in operation S8330. As a TDO has a smaller scheduled activation start time value, it may be soon executed. Thus, if there is a lack of a storage space, the receiver 300 may preferentially receive a TDO of which the activation start time arrives earliest, and thus complete reception within a trigger time.

On the other hand, time information in TDO metadata may be a scheduled activation start time field and a scheduled activation end time field and include a time slot descriptor for providing activation time information on a TDO. A time in which a TDO is performed is considered as one slot and the time slot descriptor may include a slot start time, a slot length, and repeat information. Thus, the receiver 300 may extract a time slot at which a TDO is activated and predict the repetitive execution and end times of the TDO.

Figure 59:
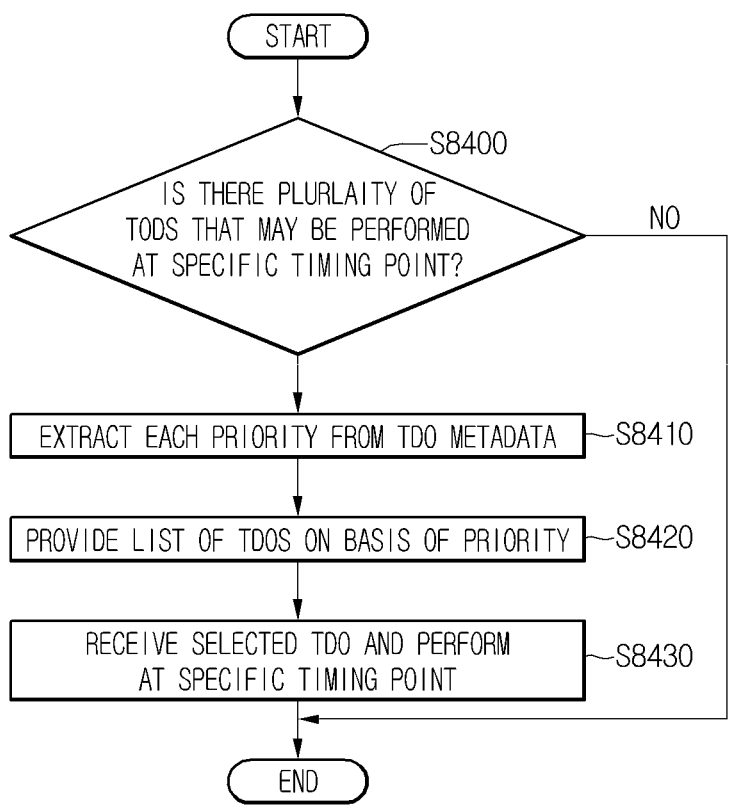
FIG. 59 is a flowchart illustrating how a receiver 300 manages a TDO based on time information and priority information in TDO metadata according to another embodiment.

FIG. 59 is a flowchart illustrating how a receiver 300 manages a TDO based on time information and priority information in TDO metadata according to another embodiment.

Referring to FIG. 59, the receiver 300 first receives TDO metadata and determines whether there is a plurality of TDOs that may be performed at a specific timing point in operation S. The receiver 300 may extract TDO metadata in a content descriptor loop in an NRT-IT through a service signaling channel and receive TDO metadata corresponding to each TDO as described above. In addition, the receiver 300 may determine on the basis of a scheduled activation start time field of each of pieces of TDO metadata extracted whether there is a plurality of TDOs that may be performed at the same timing point. If there is a plurality of TDOs of which the scheduled activation start time field values are the same or if there is a plurality of TDOs of which the scheduled activation start time field values are in a certain time range, the receiver 300 may determine that there is a plurality of TDOs that may be performed at the same timing point.

In addition, if it is determined that there is a plurality of TDOs, the receiver 300 extracts priority values for each TDO from TDO metadata in operation S8410. The priority value may be extracted from the priority field in the above-described TDO metadata descriptor. Moreover, the receiver 300 may match the priorities in the TDO metadata with the plurality of TDOs that may be performed at the same timing point, and then store them.

Subsequently, the receiver 300 provides to a user a list of TDOs that may be performed at a specific timing point on the basis of the extracted priority, in operation S8420. The receiver 300 may display to a user the list of TDOs that may be performed at a specific timing point or after a certain time, along with the priorities to induce user selection. Moreover, the receiver 300 may place a TDO having a higher priority on the upper part in the list of TDOs for display and thus priority information on each TDO may be together provided. Thus, a user may set with reference to the list of TDOs which TDO will be selected and performed at a specific timing point, and may select which TDO will be received and stored.

Subsequently, if a TDO is selected by a user, the receiver 300 receives the selected TDO, and performs a trigger action on the selected TDO at a specific timing point such as a trigger time. The receiver 300 may skip the process of receiving the selected TDO if a selected TDO is already received and stored. Moreover, the receiver 300 may delete unselected TDOs from a storage unit to secure a storage space.

In an embodiment, the receiver 300 may receive and store a TDO, and perform a trigger action on the basis of priority information without user selection according to a setting. Moreover, if there is a plurality of TDOs that may be performed at the same timing point, the receiver 300 may receive and store first a TDO having a higher priority, and perform a trigger action on the TDO having the higher priority at a corresponding timing point.

On the other hand, in an embodiment, the transmitter 200 may transmit files configuring a content item of an NRT service through an internet network. In particular, the transmitter 200 may create an FDT by including URL information on each of files configuring the content item in a content location attribute, and transmit the created FDT through a FLUTE session. Moreover, the transmitter 200 may designate URLs for content item files transmitted through a broadcast network and an IP network by using an internet location descriptor. The internet location descriptor may be included in a content level descriptor loop in an NRT-IT. Thus, the transmitter 200 may transmit, along with the internet location descriptor, URL information on the internet where each file is located.

An example of such an internet location descriptor will be described with reference to FIG. 60.

FIG. 60 shows syntax of an internet location descriptor according to an embodiment.

As shown in FIG. 60, the internet location descriptor includes a descriptor_tag field, a descriptor_length field, an URL_count field, an URL_length field, and an URL ( ) field.

The descriptor_tag may be an 8-bit unsigned integer for identifying this descriptor as an internet location descriptor. For example, this field may have a value of 0xC9.

The descriptor_length field may be an 8-bit unsigned integer that regulates a length of a field immediately following this field to the end of an internet location descriptor.

The URL_count field may be a 5-bit unsigned integer that represents the number of URL_length field and URL field pairs in the internet location descriptor. That is, the internet location descriptor includes a plurality of URL_length fields as many as a number corresponding to the URL_count field value and a plurality of URL fields as many as a number corresponding to the URL_count field value.

The URL_length field is an 8-bit unsigned integer that represents a length of the URL ( ) field that immediately follows the URL_length field.

The URL ( ) field is a character string that represents uniform reference locator (URL). When the URL ( ) field represents relative URL or absolute tag URI, a corresponding URL may be considered as content that is transmitted only through the FLUTE of an NRT. In other cases, a corresponding URL may be considered as content that is transmitted through a broadcast network, through an IP network, or through both the broadcast network and the IP network.

When transmitting URLs for files configuring a content item by using such an internet location descriptor, designating URL corresponding to each file is needed and the designated URL needs to be included in the internet location descriptor. However, if the number of files increases, the number of URLs to be designated increases and thus transmission efficiency may decrease. Moreover, as the number of URLs increases, the management may become complex.

Thus, the transmitter 200 according to an embodiment may include information on a list of URLs corresponding files in a FLUTE file description table (FDT) for example, and transmit the FDT through an internet network instead of a FLUTE session. The transmitter 200 may transmit information on a list of URLs or an FDT by using the above-described internet location descriptor and also transmit information on a list of URLs or an FDT by using the above-described link descriptor.

In addition, the associated information between each file and a content item may be designated by a content linkage field in an FDT. Moreover, since a list of files configuring a content item is included in an FDT when the URL of an FDT is transmitted through an internet location descriptor, the receiver 300 may determine the associated information between a content item and each file even without a content linkage field. For example, the receiver 300 may parse a content level descriptor loop of a content item to be received on the basis of an NRT-IT, extract the URL of an FDT from an internet location descriptor in the content level descriptor loop, receive an FDT through an internet network and thus obtain a list of files that configure a content item to be received.

The receiver 300 may receive URL information on an FDT through a link descriptor or an internet location descriptor, and receive an FDT through the internet network on the basis of the received URL information. In addition, the receiver 300 may receive files configuring a content item on the basis of URL information on each file in the FDT. By transmitting the URL of the FDT in this way, there is no need for designating and transmitting URLs respectively for a plurality of files and thus transmission efficiency may increase.

Figure 61:
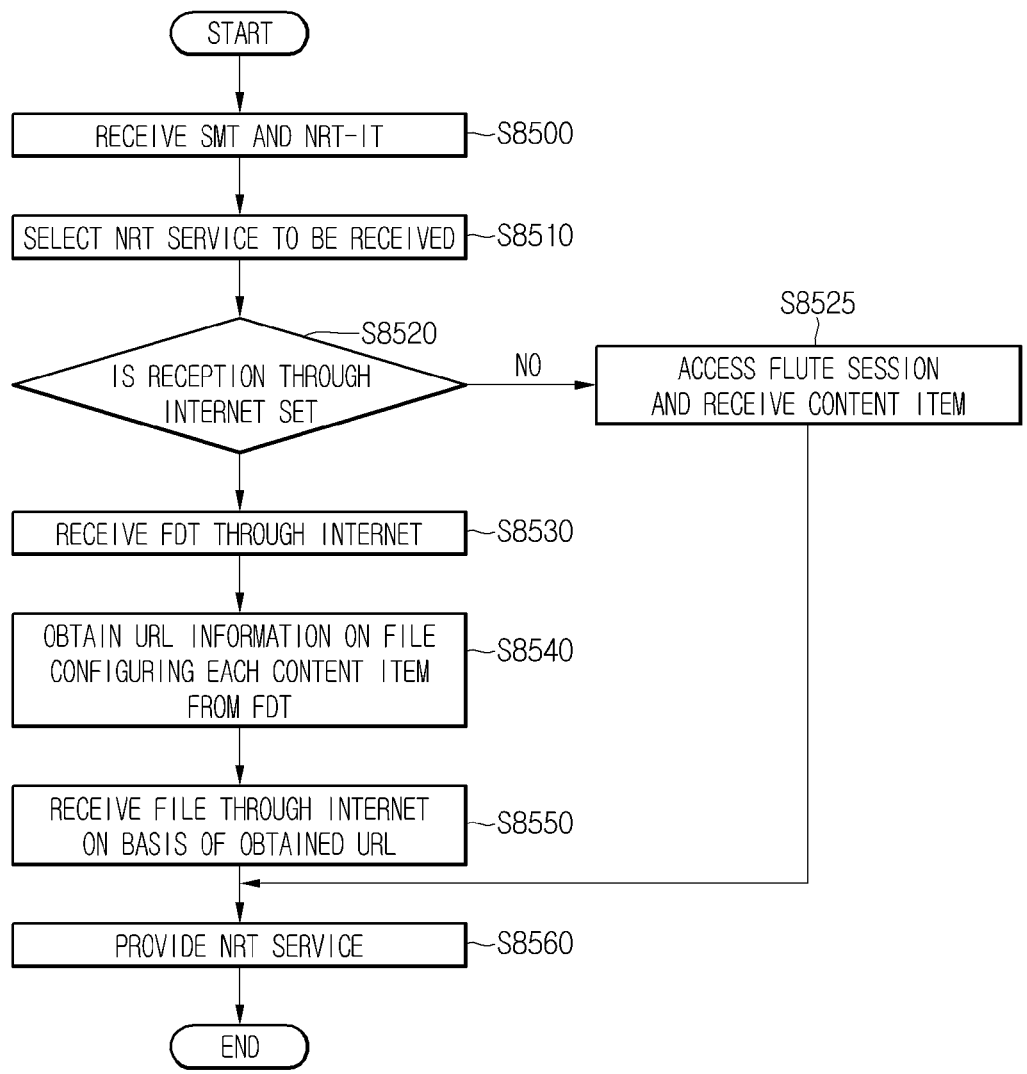
FIG. 61 is a flowchart illustrating the operation of a receiver 300 when transmitting an FDT through an internet network according to an embodiment.

FIG. 61 is a flowchart illustrating the operation of a receiver 300 when transmitting an FDT through an internet network according to an embodiment.

Referring to FIG. 61, the receiver 300 firstly receives an SMT and an NRT-IT through a service manager 350.

In addition, the service manager 350 of the receiver 300 selects an NRT service or a content item to be received, in operation 8510. The service manager 350 of the receiver 300 may select an NRT service to be received according to a preset condition. Moreover, the service manager 350 of the receiver 300 may also select an NRT service to be received on the basis of user input.

Subsequently, the service manager 350 of the receiver 300 determines whether to receive files configuring a content item of the selected NRT service through the internet, in operation S8520. The service manager 350 of the receiver 300 may determine whether to receive through the internet on the basis of the connection state of an internet network. Moreover, the service manager 350 of the receiver 300 may determine whether to receive through the internet according to user setting.

In addition, if it is determined that reception is not performed through the internet, the service manager 350 of the receiver 300 accesses a FLUTE session through an NRT service signaling channel, and receives files configuring a content item of a selected NRT service, in operation S8525.

The process of receiving an NRT service through the FLUTE session has been described above.

However, if it is determined that reception will be performed through the internet, the service manager 350 of the receiver 300 receives an FDT through the internet in operation S8530. The service manager 350 of the receiver 300 may receive URL information on the FDT through any one of a link descriptor or an internet location descriptor and receive the FDT located at an internet network on the basis of the received URL information on the FDT.

Here, an FDT may include an index for a list of files configuring a content item in a FLUTE session. It may be needed to designate an MIME type so as to separately transmit the FDT through an internet network. The MIME type means a specific type for representing a type of content that is transmitted through an internet network. Various file formats are registered as the MIME type and are being used in an internet protocol such as HTTP or SIP. IANA is in charge of registering the MIME type. MIME may define a message type of a tree structure. In an embodiment, an MIME type corresponding to an FDT may be defined as application/nrt-flute-fdt+xml, for example. Moreover, the receiver 300 may parse a URL having the above-described MIME type and receive an FDT accordingly.

After receiving the FDT, the service manager 350 of the receiver 300 obtains URL information on files configuring each content item from the FDT, in operation S8540. In addition, files are received through the internet on the basis of the obtained URL information in operation S8550. The service manager 350 of the receiver 300 may link the received files on the basis of a content linkage field in the FDT and thus obtain a content item.

In addition, the service manager 350 of the receiver 300 provides an NRT service through the received content item in operation S8560.

As such, since the receiver 300 receives the FTD through the internet, there is no need to receive URL information on each file and it is possible to efficiently receive the NRT service through an internet network. Moreover, in an embodiment, it is also possible to transmit any file including a file list (index) instead of the FDT.

Figure 62:
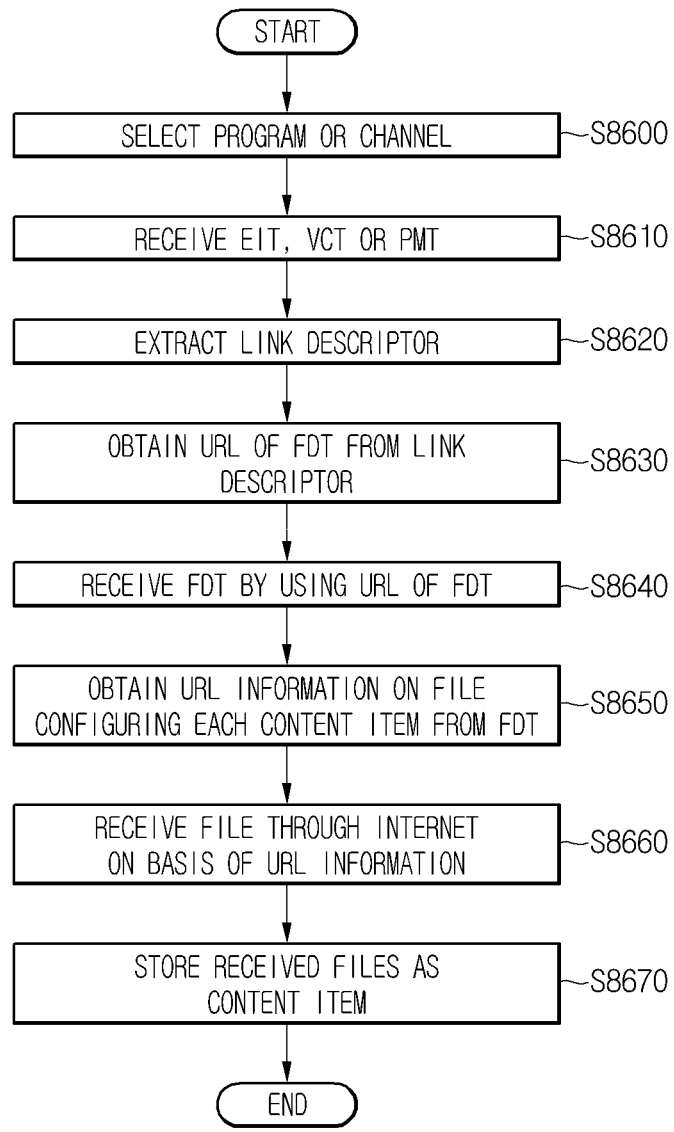
FIG. 62 is a flowchart illustrating the operation of a receiver 300 when URL of an FDT is transmitted through a link descriptor according to an embodiment.

FIG. 62 is a flowchart illustrating the operation of a receiver 300 when the URL of an FDT is transmitted through a link descriptor according to an embodiment.

In an embodiment, the transmitter 200 may transmit the above-described descriptor along with any one of an EIT, a VCT, and a PMT, and the link descriptor may include URL information through which an FDT may be obtained.

Firstly, if the receiver 300 is turned on, a broadcast channel or a broadcast program is selected, in operation S8600.

In addition, the receiver 300 receives at least one of an EIT, a VCT, and a PMT through the service manager 350 or a PSIP/PSI handler in operation S8610, and extracts a link descriptor in operation S8620, and obtains URL information on an FDT from the link descriptor in operation S8630.

Here, the link descriptor may be transmitted along with the EIT as represented in FIG. 46. In this case, the link descriptor may include information associated with a specific broadcast program. Moreover, the link descriptor may include URL information on an FDT for receiving an NRT service associated with a selected broadcast program through the internet. Thus, the receiver 300 may extract the link descriptor from an event descriptor loop of an EIT corresponding to the selected broadcast program and obtain URL information on the FDT in the link descriptor. In particular, when an MIME type field in the link descriptor represents the MIME type of the FDT, the receiver 300 may determine that information represented by a link byte field is the URL of an FDT file.

Moreover, the link descriptor may be transmitted along with a VCT or a PMT. In particular, the link descriptor may be include in a descriptor loop in the VCT or a program descriptor loop in the PMT, and include information on content that is associated to a specific channel or service. The receiver 300 may extract a link descriptor from the VCT or PMT and obtain URL information on an FDT file that is included in the link descriptor in the way similar to a case where the link descriptor is included in an EIT.

Subsequently, the service manager 350 of the receiver 300 receives an FDT file through the internet by using the obtained URL information on the FDT, in operation S8640.

In addition, the service manager 350 of the receiver 300 obtains URL information on each file in the FDT in operation S8650. URL information on each file in the FDT may include internet location information on files that configure a content item of an NRT service.

Subsequently, the service manager 350 of the receiver 300 receives designated files through the internet according to the obtained URL information in operation S8660, and stores the received files as a content item in operation S8670. The service manager 350 of the receiver 300 may store each file as a content item of an NRT service on the basis of a content linkage filed of the FDT. Moreover, the service manager 350 of the receiver 300 may provide an NRT service to a user on the basis of the stored content item.

Through these processes, the receiver 300 may receive an FDT including a list of files configuring a content item of an NRT service through an internet network. Moreover, since it is possible to receive each file through the internet on the basis of the FDT, efficient transmission is possible.

Figure 63:
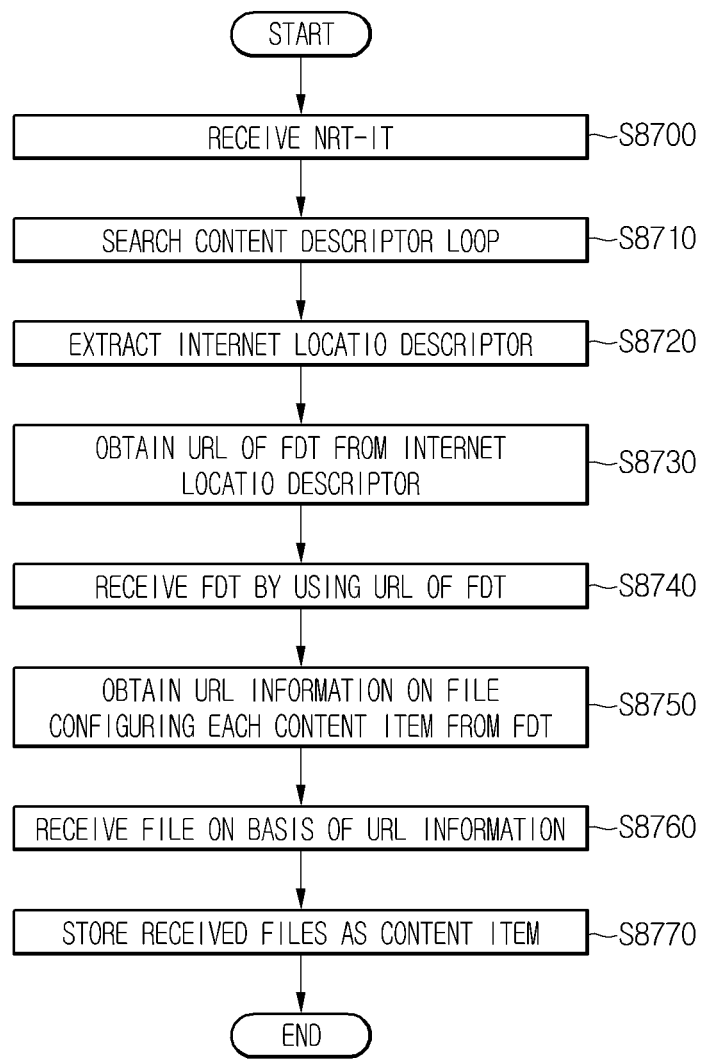
FIG. 63 is a flowchart illustrating the operation of a receiver 300 when URL of an FDT is transmitted through an NRT-IT according to an embodiment.

FIG. 63 is a flowchart illustrating the operation of a receiver 300 when the URL of an FDT is transmitted through an NRT-IT according to an embodiment.

In an embodiment, the transmitter 200 may transmit the above-described internet location descriptor along with a content descriptor loop of an NRT-IT, and the internet location descriptor may include URL information through which an FDT may be obtained.

Firstly, the receiver 300 receives an NRT-IT through the service manager 350 in operation S8700.

In addition, the receiver 300 extracts an internet location descriptor from a content_descriptor ( ) loop of the NRT-IT in operation S8610, obtains URL information on an FDT from the internet location descriptor in operation S8630, receives the FDT through the internet by using the URL information on the FDT in operation S8740, and obtains URL information on a file configuring each content item from the FDT in operation S8750.

Here, the receiver 300 may receive the URL information on the FDT through the internet location descriptor and furthermore, may access a FLUTE session through an SMT and an NRT-IT and receive the FDT. Moreover, the URL of each file in the FDT may represent the address of an internet network or may represent a file location in the FLUTE session. Thus, the receiver 300 may determine the URL type of each file from the FDT and selectively receive each file through any one of the FLUTE session or the internet network according to the determined type.

Moreover, the receiver 300 may receive the FDT through the internet network and access the FLUTE session on the basis of the received FDT to receive files configuring a content item.

On the other hand, when each file may be transmitted through both the FLUTE session and the internet network, the transmitter 200 may designate a preferred transmission path. The preferred transmission path may be designated as an attribute of a complex file type by using an xml schema. For example, it may be designated as <xs:attribute name="Internet_preferred" type="s:boolean" use="optional" default="false"/> for example. Here, internet_preferred means a preferred transmission through the internet network, and when a type value is true, it means a preferred transmission through the internet network. Moreover, default is defined as false and it may represent that a preferred transmission through the FLUTE session is basically performed. Thus, the receiver 300 may check the attribute of each file type and thus selectively receive each file through any one of the internet network or the FLUTE session.

Subsequently, the service manager 350 of the receiver 300 stores designated files from the FLUTE session or the internet network according to URL information on files obtained in this way in operation S8760 and stores the received files as a content item in operation S8670.

The service manager 350 of the receiver 300 may store each file as a content item of an RNT service on the basis of a content linkage field of an FDT as described above. Moreover, the service manager 350 of the receiver 300 may provide an NRT service to a user on the basis of the stored content item.

On the other hand, the receiver 300 may receive and store a TDO, receive a trigger transmitted in association with a real time broadcast, and perform a trigger action on a stored target TDO at a trigger time as described above. Here, when the receiver 300 performs a trigger action on the target TDO, it needs to be performed in an appropriate way according to a property of the TDO. For example, when the target TDO necessarily needs a network connection of a certain speed, the receiver 300 needs to determine the current network state and then determine whether to receive the TDO or whether to perform a trigger action on the TDO. Moreover, the receiver 300 needs to previously notify a user of such a property of the TDO before applying the trigger action to the TDO.

Thus, in an embodiment, the transmitter 200 transmits a TDO descriptor including property information on a TDO, and the receiver 300 determines property information on the TDO on the basis of the TDO descriptor and proposes a method of performing an appropriate operation according to the property of the TDO. In particular, in the embodiment, property information on the TDO is transmitted along with a network connectivity property, and the receiver 300 may perform an appropriate operation on the TDO on the basis of the network connectivity property to be able to efficiently provide a TDO service.

Figure 64:
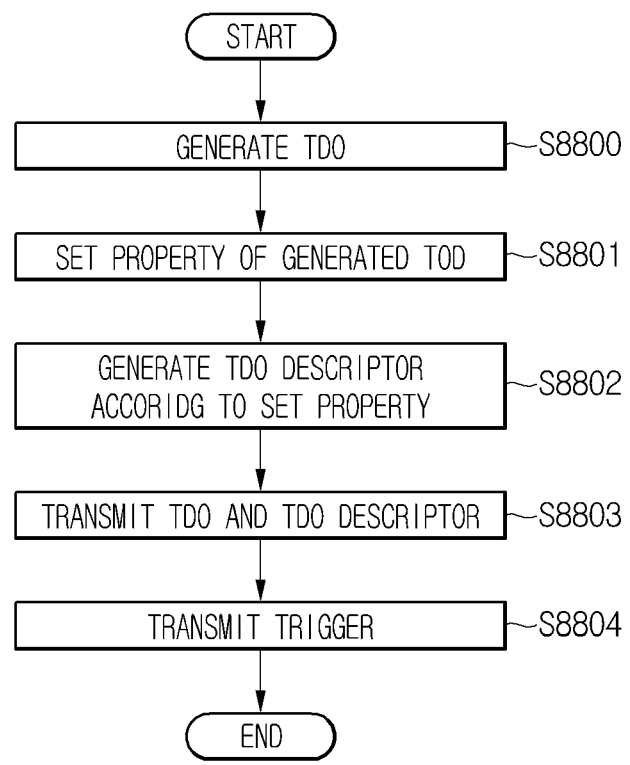
FIG. 64 is a flowchart of a TDO descriptor transmission process according to an embodiment.

FIG. 64 is a flowchart of a TDO descriptor transmission process according to an embodiment.

Firstly, the NRT service (TDO) generating unit 211 of the transmitter 200 generates a TDO in step S8800. The generated TDO may need various pieces of property information according to use or usage environment. Thus, the NRT service (TDO) generating unit 211 sets property information on the basis of use or usage environment for the generated TDO, in operation S8801. In addition, the NRT service (TDO) generating unit 211 generates a TDO descriptor on the basis of the set property information in operation S8802.

In an embodiment, the TDO descriptor generated in this way may have a form of a file and may be described as a form of text. Moreover, an extension of a file including the TDO descriptor may be defined as "*.df" (descriptor file), for example. Moreover, the TDO descriptor may include a plurality of property items according to the set property information of a TDO, and the plurality of property items may include a plurality of description items. Each property item and description item in a TDO descriptor may be defined through the following text-type syntax for example.

DF Property 1: "Item 1", "Item 2", . . . , "Item N";
DF Property 2: "Item 1", "Item 2", . . . , "Item N";

Here, the DF property 1 and the DF property 2 may mean each property item. In addition, description items for each property may be included in the symbol " ". The property item and the description items may be separated by using ":" and the description items may be separated by using ",".

The NRT service (TDO) generating unit 211 of the transmitter 200 transmits the generated TDO and the generated TDO descriptor to a broadcast channel or an internet network through the multiplexing unit 230 and the modulation unit 240, in operation S8803. In addition, the trigger generating unit 221 generates a trigger that includes a trigger time and a trigger action, and transmits the generated trigger to a broadcast channel or an internet network through the multiplexing unit 230 and the modulation unit 240, in operation S8804. Here, the TDO descriptor may be included in the generated TDO itself and may be transmitted. Moreover, the TDO descriptor may also be transmitted separately from the generated TDO. When the TDO descriptor is transmitted separately from the TDO, the transmitter 200 may schedule a transmission process so that the receiver 300 may receive more preferentially the TDO descriptor than the TDO. Moreover, the transmitter 200 may generate the TDO and TDO descriptor so that they 1:1 correspond. To this end, names of a TDO identifier and a TDO descriptor file may be equally set. A detailed method of transmitting a TDO descriptor file will be described below.

According to an embodiment, the TDO descriptor may include network property items. The network property items may include a plurality of property descriptor items for network states which a TDO need. Thus, the receiver 300 may extract a property descriptor item of a network property item to determine whether a TDO needs an internet access. Moreover, the receiver 300 may determine a minimum network state required for receiving or executing the TDO by using property descriptor items of the network property item. In addition, a network may include accessible various networks and in particular mean an internet network in this embodiment. The configuration of property descriptor items of such a network property item is as follows:

Item 1: mandatory, optional or unused
Item 2: N
Item 3: notification(notify), no notification(not notify) or determination by receiver (by receiver)

Here, the item 1 may be a property descriptor item that represents whether to use a network. The item 1 may represent whether using a network is mandatory, optional or not needed in performing a TDO corresponding to a TDO descriptor.

In addition, the item 2 may mean a network speed that is at least required when a TDO uses a network mandatorily or optionally. If a value of the item 2 is N, it may represent that a network speed of at least N Mbps that is a constant is needed.

Moreover, the item 3 may be a descriptor item that represents whether to notify a user of a network property. Thus, the item 3 may represent any one of "user notification", "not notify", and "determination by receiver".

In addition, a network connectivity property item (internet connectivity property item) in a TDO descriptor will be described below as a text type according to syntax by using the above-described items.

Internet connectivity: "mandatory", "10", "Notify"

According to the above-described network connectivity property item, a TDO corresponding to a TDO descriptor is mandatory in internet connectivity, a network speed of at least 10 Mbps is needed, and such a network property needs to be notified to a user in performing a TDO.

As such, an embodiment may provide TDO property information through a TDO descriptor. Moreover, by defining its analysis criterion, it is possible to efficiently manage a TDO in all receivers 300 regardless of a type of the receiver 300. In particular, the receiver 300 may efficiently manage (receive, reception reservation, store, delete or execute) a TDO according to the current network connectivity state on the basis of a network connectivity property of a TDO.

Figure 65:
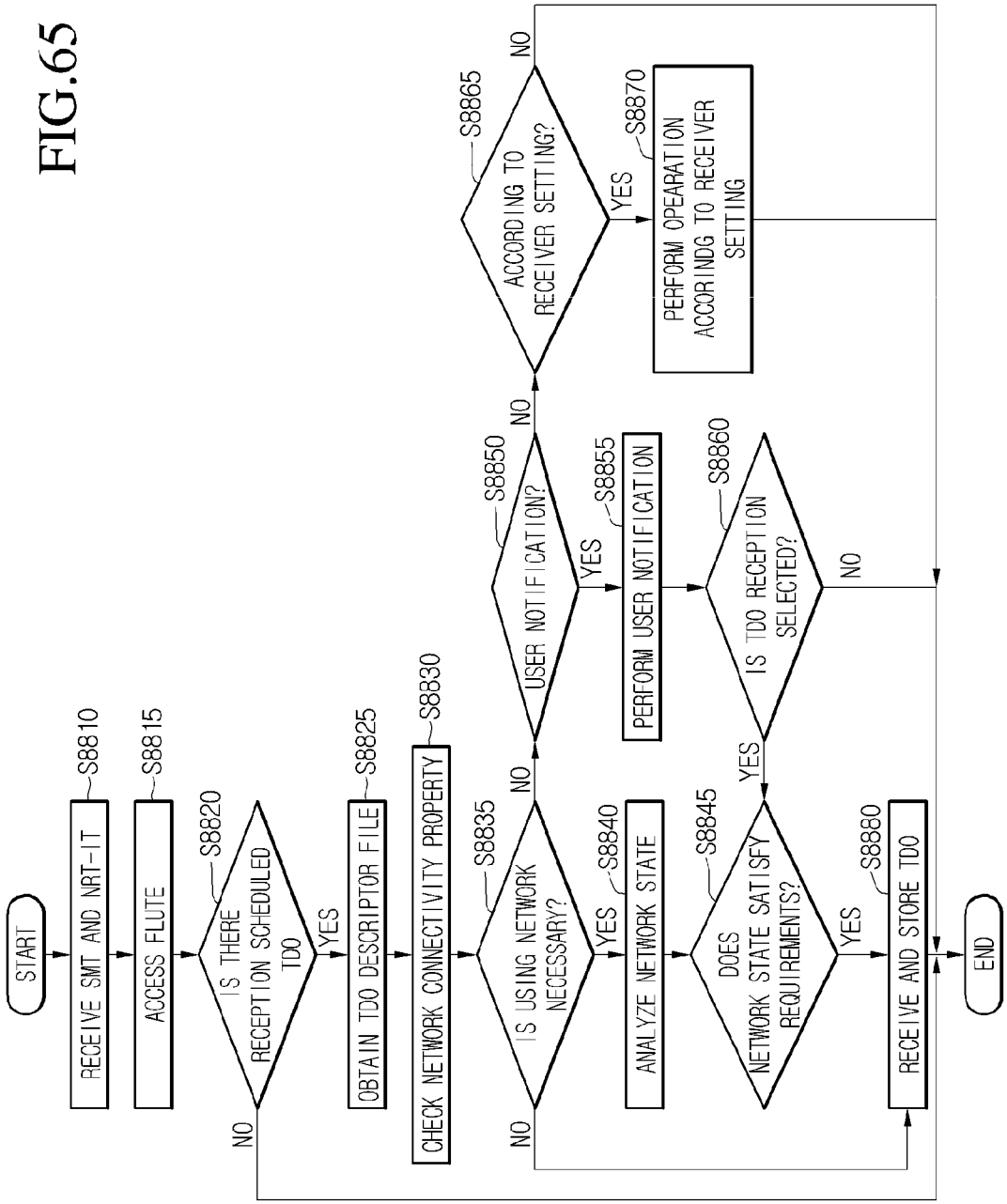
FIG. 65 is a flowchart of a method for receiving a TDO according to a network state of a receiver that receives a TDO descriptor according to an embodiment.

FIG. 65 is a flowchart of a TDO receiving method according to a network state of the receiver 300 that receives a TDO descriptor according to an embodiment.

Referring to FIG. 65, firstly, the receiver 300 receives an SMT and an NRT-IT through the above-described method in operation S8810, and accesses a FLUTE session on the basis of the SMT and the NRT-IT in operation S8815. In addition, the receiver 300 determines whether there is a reception scheduled TDO, in operation S8820. The receiver 300 may determine on the basis of the above-described event descriptor or link descriptor whether there is the reception scheduled TDO. For example, the receiver 300 may extract a link descriptor from a VCT or an EIT as described with respect to FIG. 50, and determine whether there is a TDO if a link type in a specific link data item of the link descriptor is 0X07, and determine whether there is the reception scheduled TDO. Moreover, the receiver 300 may also determine whether there is a TDO as an NRT service to be received on the basis of the SMT and the NRT-IT. In addition, the receiver 300 may determine by a preparation trigger whether there is the reception scheduled TDO.

In addition, when there is the reception scheduled TDO, the receiver obtains a TDO descriptor file in operation S8825. As described above, when the TDO descriptor file is in a TDO, it is possible to receive the TDO and obtain a TDO descriptor. However, when the TDO descriptor file is separately transmitted, it is possible to obtain a TDO descriptor by parsing and receiving a separate transmitted TDO descriptor or extracting The TDO descriptor from already received service signaling data or NRT service data.

In addition, the receiver 300 checks a network connectivity property on the basis of the obtained TDO descriptor in operation S8830. The network connectivity property of the TDO descriptor may include a plurality of property descriptor items as described above. Thus, the receiver 300 may check a network connectivity property on whether to use a network, a required lowest speed, and whether to notify a user from property descriptor items, for example, items 1 to 3.

Subsequently, the receiver 300 determines, according to the checked network connectivity property, whether using a network is necessarily required for the reception scheduled TDO, in operation S8835. For example, the receiver 300 may determine that the reception scheduled TDO necessarily needs to use a network when the checked item 1 is set to "mandatory".

In addition, the receiver 300 analyzes the current network connectivity state of the receiver 300 when using the network is necessarily needed. The receiver may determine the connectivity state of a network connected through a network interface, measure the type and connectivity speed of the currently connected network, and analyze the network connectivity state. Moreover, the network connectivity state may be pre-analyzed according to a certain period and pre-stored in a storage unit, and may also be analyzed by the real-time analysis request of the service manager 350.

If the network state is analyzed, the receiver 300 determines whether the analyzed network state satisfies a network state condition that is required by the reception scheduled TDO, in operation S8845. For example, the receiver 300 may extract the lowest speed of a network required by the reception scheduled TDO on the basis of the network connectivity property item descriptor of the network connectivity property in the TDO descriptor, measure the connectivity speed of the currently connected network, compare it with the lowest speed, and thus determine whether the network state satisfies the requirement.

Moreover, although this embodiment exemplifies the connectivity speed of a network among network requirements, various conditions may be included including a network connection type, a connection scheme, a connection protocol, and accessibility to a server to be connected in addition to the connectivity speed. Thus, the receiver 300 may determine on the basis of various network connectivity properties in the TDO descriptor whether a network state satisfies requirements for a TDO.

On the other hand, if the network state does not satisfy a network requirement in a descriptor of a reception scheduled TDO, the receiver 300 determines whether it is set to the notify property if the network condition of the reception scheduled TDO is not satisfied, in operation S8850.

The receiver 300 may determine, on the basis of the user notification property of the network connectivity property descriptor for the user notification of the TDO descriptor, whether it is set to the "user notification" if the network requirement of the reception scheduled TDO is not satisfied.

In addition, if the user notification property is set to the "notify", the receiver 300 performs network requirement notification required for a reception scheduled TDO, in operation S8855. The receiver 300 may display network requirements including the lowest speed of a network required for performing a TDO on the basis of the TDO descriptor so as to perform the "notify". Moreover, by notifying a user of the above-described network requirements with voice or images, the receiver 300 may allow a user to select the actual reception of the reception scheduled TDO. Thus, even if the current network connectivity state is unsuitable for performing a TDO, the receiver 300 may receive the reception scheduled TDO if it desires to receive the TDO.

In addition, after operation S8855, the receiver 300 determines whether a user selects the reception of the TDO, in operation S8860. If the user does not select the reception of the TDO, the receiver 300 does not receive the TDO. However, if the reception of the TDO is selected, the receiver 300 receives and stores the content items of the reception scheduled TDO in operation S8880 if the network state satisfies network requirements in the descriptor of the reception scheduled TDO in operation S8845 or if it is determined that using a network is not necessary in operation S8835. The receiver 300 may receive and store files forming the content items of a TDO through FLUTE or an internet network.

On the other hand, if the reception scheduled TDO is not set to "user notification", it may be set to "not notify" or "according to receiver setting". Thus, the receiver 300 analyzes the TDO descriptor and determines whether it is set to "according to receiver setting", in operation S8865.

In addition, if it is set to "according to receiver setting", the receiver 300 operates according to its own setting in operation S8870. The receiver 300 may receive and store or not store a TDO on the basis of a TDO descriptor file. For example, the receiver 300 may receive and store a TDO if it is determined that a network state satisfies requirements after a certain time. However, the receiver 300 may do not receive a TDO if it is determined that a network state is unsuitable for receiving the TDO.

In addition, in a case where it is not set to "according to receiver setting", the receiver does not receive the TDO and stops without notifying a user because it is set to "not notify".

By utilizing a TDO descriptor in this way, the receiver 300 may determine a network connectivity property required for providing a TDO service and determine whether to receive and store a TDO. Moreover, in an embodiment, by defining, the notify property when being not satisfied with network connectivity, as a descriptor item in a TDO descriptor, it is possible to ensure the accurate operation and quality of a TDO in association with a real time broadcast.

Figure 66:
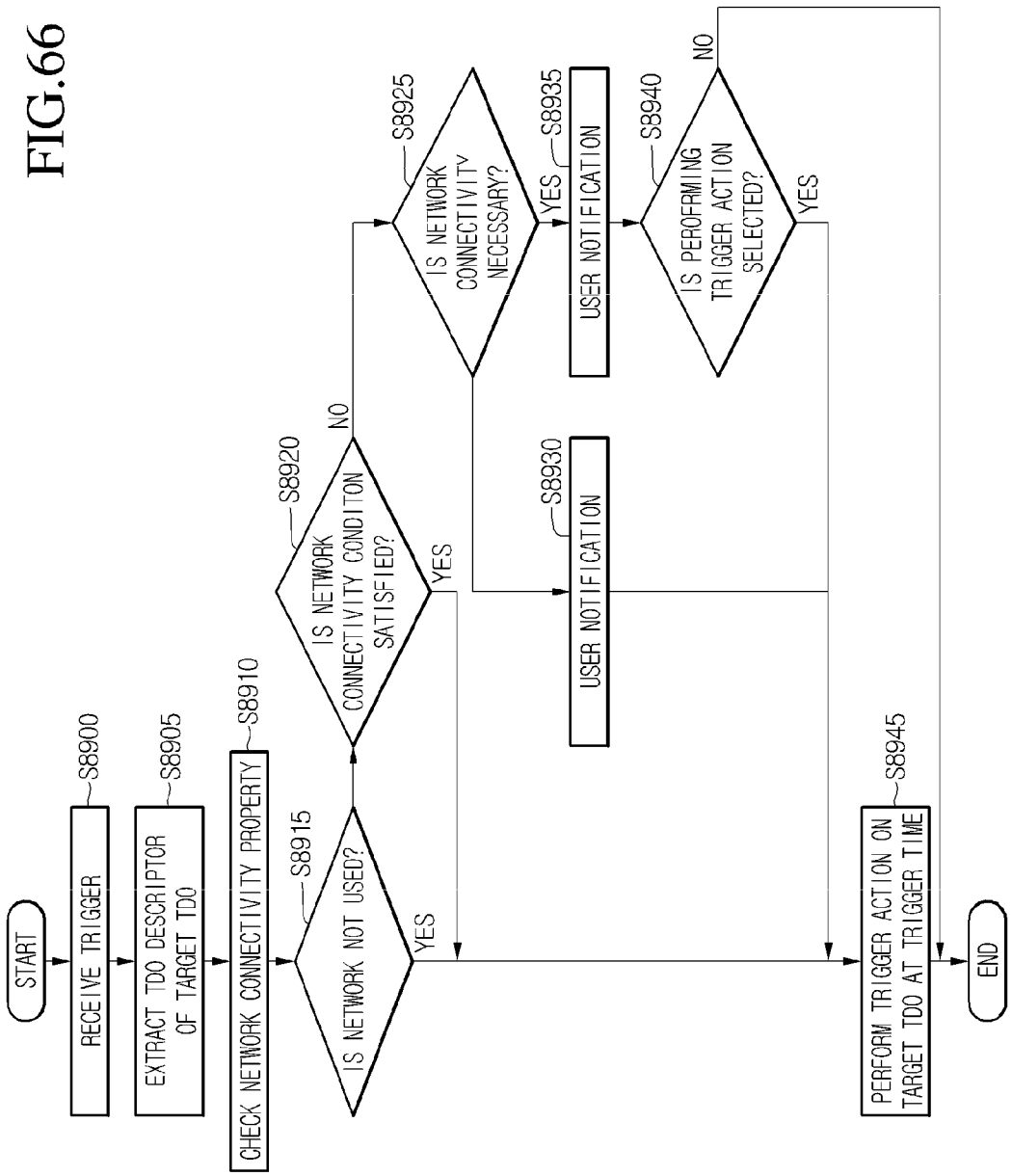
FIG. 66 is a flowchart representing the operation of a receiver according to a TDO descriptor when receiving a trigger according to another embodiment.

On the other hand, the TDO descriptor may also be used when being applied to a trigger action by a trigger. FIG. 66 is a flowchart of the operation of the receiver 300 according to a TDO descriptor when receiving a trigger according to another embodiment.

Referring to FIG. 66, firstly, the receiver 300 receives a trigger in operation S8900. The receiver 300 may receive a trigger including a trigger time, a target TDO, and trigger action as described above, on the basis of the trigger signaling data received from the trigger signaling data receiving unit 332 through the trigger receiving unit 331.

In addition, the receiver 300 extracts a TDO descriptor corresponding to a target TDO in operation S8905, and checks a network connectivity property of the target TDO on the basis of a TDO descriptor in operation S8910. The TDO descriptor may be included in a content item of a pre-stored TDO. Moreover, the TDO descriptor may be separately received and stored. In addition, the receiver 300 may extract a TDO descriptor and analyze property information on the target TDO. Moreover, the receiver 300 may analyze the TDO descriptor for example and determine whether the target TDO has a property to have to access a specific external server through a network.

Subsequently, the receiver 300 determines on the basis of a network connectivity property of the TDO descriptor whether the target TDO does not need network connectivity, in operation S8915.

In addition, if the target TDO uses a network, the receiver 300 analyzes the current network connectivity state, and determines whether the network state satisfies network connectivity requirements in the TDO descriptor in the target TDO, in operation S8920. For example, the receiver 300 may determine on the basis of a network speed property descriptor item in the TDO descriptor in the target TDO what Mbps is the required lowest speed, compare it with the currently connected network speed, and determine whether network connectivity requirements are satisfied.

Subsequently, if the network connectivity conditions are not satisfied, it is determined from the TDO descriptor whether the target TDO necessarily needs network connectivity, in operation S8925.

If the target TDO does not necessarily need the network connectivity, the receiver 300 performs "notify" that the network connectivity condition is not satisfied, in operation S8930. The "notify" may be performed through a voice or image display. Moreover, the receiver 300 may skip "notify" if the notify property in the TDO descriptor is set to "not notify", and also operate according to the setting of the receiver 300 itself if the notify property is set to "not notify".

In addition, if it is determined that the target TDO necessarily needs network connectivity, "notify" is performed in operation S8935. In this case, the "notify" may include the current network connectivity state, and network connectivity state information notification that the target TDO needs. Moreover, the "notify" may include a selection screen display to select whether to perform execution even if the network connectivity state is unsuitable for requirements. Moreover, as described above, when property information in the TDO descriptor of the target TDO is set to "not notify", the "notify" may be skipped, and when the property information is set to "according to receiver setting", the receiver 300 may operate according to the setting of the receiver 300 itself.

Subsequently, the receiver 300 determines whether a user performs a trigger action on the target TDO or selects the execution of a TDO, in operation S8940. If not selected, the trigger action is not performed and ends.

However, if the trigger action is performed in operation S8940, after operation S8930, if a network connectivity condition is satisfied in operation S8920, or if it is determined in operation S8915 that a network is not used, the trigger action is performed on the target TDO at a trigger time, in operation S8945.

As such, the receiver 300 according to an embodiment determines whether to perform a trigger action according to the network connectivity property and current network connectivity state of a TDO and thus it is possible to ensure the efficient performance of the TDO. Moreover, the receiver 300 may determine the network requirements of the TDO, notify a user thereof, determine whether to execute a TDO according to a network state, and thus prevent unnecessary error due to network failure from occurring In addition, in an embodiment, a TDO that needs network connectivity may be a TDO that accesses a specific server and provides video streaming. Moreover, the TDO that needs network connectivity may be a TDO such as a poll TDO that needs to upload information input from a user on an external server. In addition, the TDO that needs network connectivity may be at least one of a TDO that has a payment function, a TDO that has a social network function, and a TDO that has a chatting function. In the case of such a TDO, a TDO descriptor may include network requirements that are needed to smoothly operate the functions of the TDO.

Figure 67:
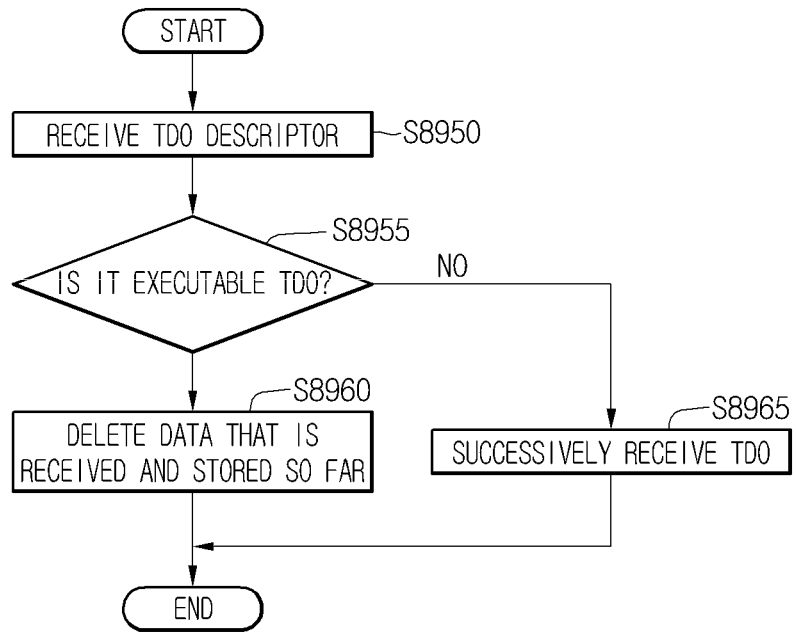
FIG. 67 is a flowchart of a TDO descriptor receiving method according to another embodiment and the corresponding operation of a receiver.

FIG. 67 is a flowchart of a TDO descriptor receiving method according to another embodiment and the corresponding operation of the receiver 300.

Firstly, the receiver 300 receives a TDO descriptor in operation S8950.

In an embodiment, a content item that configures an NRT service such as a TDO service may include one or more files. In addition, the transmitter 200 may transmit, through a FLUTE session, a TDO descriptor along with one or more files that configure a content item. Moreover, the transmitter 200 may configure the TDO descriptor as a separate file and transmit it through a FLUTE session.

Here, the receiver 300 may receive a TDO descriptor, first determine whether it is possible to execute a TDO, and then determine whether to receive a TDO. Thus, the TDO descriptor may be received earlier than content items of the corresponding TDO.

To that end, in an embodiment, the transmitter 200 may insert and transmit a TDO descriptor into a file 0 of a content item 0 of an NRT service (TDO service) as shown in FIG. 2. In addition, content items of the corresponding TDO may be inserted and transmitted sequentially from a file 1 or a content item 1. In addition, the transmitter 200 may match and transmit an NRT_channel_id field of an NRT-IT (or an NCT) in service signaling data corresponding to such a content item, with an NRT_service_id field corresponding to a TDO service to be able to represent that the item is a content item of the TDO service.

Moreover, the transmitter 200 may match and insert a content_id field of a FLUTE FDT including a list of files that belong to a content item, with a content_id field of the NRT-IT (or the NCT) to be able to represent in which content item each file is included.

In this case, the receiver 300 may receive a file 0 of a content item 0 and extract a TDO descriptor. Thus, the receiver 300 may pre-analyze the TDO descriptor before receiving a TDO, and determine a property of a reception scheduled TDO.

On the other hand, the transmitter 200 may define a TDO descriptor file type and transmit the TDO descriptor file along with a list of files of a FLUTE FDT so that the receiver 300 may preferentially receive the TDO descriptor. In order to receive files in this way, the TDO descriptor file may be defined as an MIME type such as application/nrt-tdo-DF+txt.

In this case, the receiver 300 may receive a FLUTE FDT for receiving a content item of a TDO and preferentially receive a file having a MIME type of application/nrt-tdo-DF+txt from a list of files in the FDT so that the TDO descriptor may be preferentially received. Thus, the receiver 300 may pre-analyze the TDO descriptor before receiving a TDO and determine a property of a reception scheduled TDO.

Moreover, an FDT file may be transmitted through FLUTE as described above and also be transmitted through an internet network. Thus, the receiver 300 may receive the FDT file through the internet network and preferentially receive the TDO descriptor from the received FDT file through the FLUTE session or the internet network.

If receiving the TDO descriptor, the receiver 300 determines on the basis of the property of a TDO and the state of the receiver 300 whether the TDO is executable, in operation S8955. In addition, if the TDO is executable, a TDO corresponding to the TDO descriptor is successively received and stored in operation S8965. However, if the TDO is not executable, data for a TDO that has been stored and stored so far including the TDO descriptor is deleted in operation S8960.

The above-described network connectivity property necessarily needs network connectivity when performing a TDO but if the receiver 300 is not connected to a network, the receiver 300 does not need to receive and store the TDO. Thus, the receiver 300 may preferentially receive the TDO descriptor and then determine whether to store remaining TDO data to be able to efficiently perform storage capacity management.

Broadcast service receiving and transmitting methods according to embodiments may be stored in the computer readable recording medium that includes read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the methods can be easily construed by programmers skilled in the art to which the present invention pertains.

Moreover, although exemplary embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

The invention claimed is:

1. A method for a broadcast receiving device to receive a broadcast, comprising:
   receiving a broadcast stream including audio or video;
   receiving triggered declarative object (TDO) metadata for a TDO, wherein the TDO metadata includes first information representing an acquisition path of the TDO being one of broadcast and internet, and second information representing an appearance frequency of a time slot that contains the TDO;
   downloading the TDO over the internet when the first information represents that the TDO is available for downloading over the internet; and
   managing a storage based on the second information,
   wherein the TDO metadata includes network characteristic information for a downloading scheduled TDO,
   wherein the downloading the TDO comprises,
   determining internet network connecting state and internet network speed when the network characteristic information indicates that the downloading scheduled TDO necessarily needs to use an internet network,
   determining current network state information including the internet network connecting state information and internet network speed information satisfies the network characteristic information, and
   notifying a viewer of the network characteristic information for the downloading scheduled TDO, when the current network state information does not satisfy the network characteristic information.

2. The method of claim 1, wherein the TDO metadata further includes third information which represents an end time of the TDO and which is used for the broadcast receiving device to delete the TDO,
   wherein the method further comprising:
   deleting the TDO based on the second information.

3. The method of claim 1, wherein a form of the TDO metadata is a file,
   wherein the TDO metadata includes a plurality of characteristic items for the TDO, and
   wherein the plurality of characteristic items include the first information, the second information, and the third information.

4. The method of claim 1, wherein values which the second information can represent include Daily, Weekly, and Monthly.

5. The method of claim 1, further comprising:
   receiving a trigger action for a trigger for the TDO, and the trigger including a trigger time and an identifier for identifying the TDO;

extracting the identifier and the trigger time from the trigger; and performing the trigger action in the trigger time for the TDO identified by the identifier.

6. The method of claim 5, wherein the broadcast stream further includes trigger signaling information, wherein receiving the trigger comprises:

receiving the trigger based on the trigger signaling information.

7. The method of claim 6, wherein the trigger signaling information includes an internet protocol (IP) address, wherein receiving the trigger based on the trigger signaling information comprises:

receiving the trigger through the IP address.

8. The method of claim 5, wherein the trigger time is synchronized with the audio or video.

9. The method of claim 5, wherein values which can be represented by the trigger action include a preparation, an execution, and a termination.

10. An apparatus for receiving a broadcast service, comprising:

a broadcast receiver for receiving a broadcast stream including audio or video;

a triggered declarative object (TDO) metadata receiver for receiving TDO metadata for a TDO, wherein the TDO metadata includes first information representing an acquisition path of the TDO being one of broadcast and internet, and second information representing an appearance frequency of a time slot that contains the TDO;

a TDO downloader for downloading the TDO over the internet when the first information represents that the TDO is available for downloading over the internet; and a service manager managing the TDO based on the second information, wherein the TDO metadata includes network characteristic information for a downloading scheduled TDO, wherein service manager determining internet network connecting state and internet network speed when the network characteristic information indicates that the downloading scheduled TDO necessarily needs to use an internet network, determining current network state information including the internet network connecting state information and internet network speed information satisfies the network characteristic information, and notifying a viewer of the network characteristic information for the downloading scheduled TDO, when the current network state information does not satisfy the network characteristic information.

11. The apparatus of claim 10, further comprising:

a trigger receiver for receiving a trigger action for a trigger, and the trigger including a trigger time and an identifier for identifying the TDO;

a trigger processor for extracting the identifier and the trigger time from the trigger; and a service manager for performing the trigger action in the trigger time for the TDO identified by the identifier.

* * * * *